(12) United States Patent
Bitar

(10) Patent No.: US 12,145,753 B2
(45) Date of Patent: Nov. 19, 2024

(54) COMPACT AND LIGHTWEIGHT DRONE DELIVERY DEVICE CALLED AN ARCSPEAR ELECTRIC JET DRONE SYSTEM HAVING AN ELECTRIC DUCTED AIR PROPULSION SYSTEM AND BEING RELATIVELY DIFFICULT TO TRACK IN FLIGHT

(71) Applicant: Pete Bitar, Anderson, IN (US)

(72) Inventor: Pete Bitar, Anderson, IN (US)

( * ) Notice: Subject to any disclaimer, the term of this patent is extended or adjusted under 35 U.S.C. 154(b) by 0 days.

(21) Appl. No.: 18/231,588

(22) Filed: Aug. 8, 2023

(65) Prior Publication Data

US 2024/0239531 A1 Jul. 18, 2024

Related U.S. Application Data

(60) Provisional application No. 63/396,253, filed on Aug. 9, 2022.

(51) Int. Cl.
| | |
|---|---|
| *B64U 50/30* | (2023.01) |
| *B60L 50/60* | (2019.01) |
| *B64U 10/14* | (2023.01) |
| *B64U 30/26* | (2023.01) |
| *B64U 50/19* | (2023.01) |
| *H01M 50/204* | (2021.01) |
| *H01M 50/249* | (2021.01) |
| *B64U 101/18* | (2023.01) |

(52) U.S. Cl.
CPC ............. *B64U 50/30* (2023.01); *B60L 50/60* (2019.02); *B64U 10/14* (2023.01); *B64U 30/26* (2023.01); *B64U 50/19* (2023.01); *H01M 50/204* (2021.01); *H01M 50/249* (2021.01); *B60L 2200/10* (2013.01); *B64U 2101/18* (2023.01); *H01M 2220/20* (2013.01)

(58) Field of Classification Search
CPC ........ B64U 50/30; B64U 10/14; B64U 30/26; B64U 50/19; B64U 2101/18; B60L 50/60; B60L 2200/10; H01M 50/204; H01M 50/249; H01M 2220/20
See application file for complete search history.

(56) References Cited

U.S. PATENT DOCUMENTS

| | | | | |
|---|---|---|---|---|
| 968,339 | A * | 8/1910 | Geraldson | B64F 1/06 254/386 |
| 1,144,505 | A * | 6/1915 | Stefan | B64F 1/06 244/110 F |
| 1,306,860 | A * | 6/1919 | Smith | B64F 1/027 244/110 E |

(Continued)

*Primary Examiner* — Medhat Badawi
(74) *Attorney, Agent, or Firm* — Ritchison Law Offices PC; John D Ritchison

(57) ABSTRACT

A compact and lightweight, drone delivery device propelled by an electric ducted air propulsion system. The device is called an ArcSpear Electric Jet Drone System and is relatively difficult to track in flight (stealth), relatively fast, able to maneuver quickly, and able to be re-deployed after recharging and replenishing the payload. The system includes a frame carrying the propulsion system, payload, and controls. The frame structure supports a flight controller and a ducted turbine system with at least one and preferably four turbines the blades/impellers being secured inside a protection shroud/duct and individual electric motors that are powered by rechargeable batteries.

15 Claims, 9 Drawing Sheets

(56) References Cited

U.S. PATENT DOCUMENTS

Figure 1A:
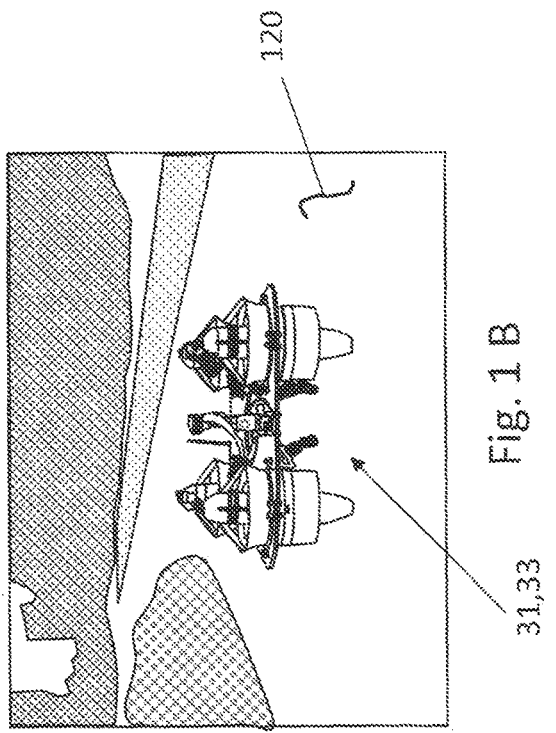

| Patent No. | | Date | Inventor | Classification |
|---|---|---|---|---|
| 1,349,035 A | * | 8/1920 | Alder | B60B 9/26 301/104 |
| 1,375,267 A | * | 4/1921 | Weil | B60B 1/0207 301/56 |
| 1,383,595 A | * | 7/1921 | Black | B64F 1/04 244/110 F |
| 1,386,713 A | * | 8/1921 | Leinweber | B64D 27/00 244/76 R |
| 1,400,032 A | * | 12/1921 | Dickey | B64C 11/04 416/214 R |
| 1,499,472 A | * | 7/1924 | Pratt | B64F 1/029 244/110 G |
| 1,523,926 A | * | 1/1925 | Ypma | B64C 39/022 416/120 |
| 1,582,188 A | * | 4/1926 | Mummert | B64F 1/0299 244/110 R |
| 1,625,020 A | * | 4/1927 | Diago | B64F 1/36 244/114 R |
| 1,671,865 A | * | 5/1928 | Karish | B64C 23/005 244/7 R |
| 1,686,298 A | * | 5/1928 | Uhl | B64F 1/04 472/27 |
| 1,716,670 A | * | 6/1929 | Sperry | B64D 5/00 258/1.2 |
| 1,731,091 A | * | 10/1929 | Belleville | B64F 1/0295 244/110 F |
| 1,794,202 A | * | 2/1931 | Pickard | B64C 29/0033 244/66 |
| 1,836,010 A | * | 12/1931 | Audrain | B64F 1/04 244/110 F |
| 1,848,828 A | * | 3/1932 | Griffin | B64F 1/14 244/116 |
| 1,912,723 A | * | 6/1933 | Perkins | B64F 1/04 244/114 R |
| 1,919,121 A | * | 7/1933 | Oehmichen | B64B 1/30 244/26 |
| 2,330,204 A | * | 9/1943 | Campbell | B64C 27/82 244/17.23 |
| 2,344,967 A | * | 3/1944 | Allan | B64C 27/04 244/17.23 |
| 2,369,276 A | * | 2/1945 | Cameron | B64C 11/28 416/131 |
| 2,415,071 A | * | 2/1947 | Reginald | B64F 1/04 244/110 E |
| 2,417,896 A | * | 3/1947 | Zimmerman | B64C 39/026 244/17.15 |
| 2,420,796 A | * | 5/1947 | Raschke | B64C 27/52 416/130 |
| 2,427,936 A | * | 9/1947 | Wales, Jr. | B64C 27/54 416/115 |
| 2,435,197 A | * | 2/1948 | Brodie | B64F 1/04 114/261 |
| 2,440,574 A | * | 4/1948 | Cotton | B64F 1/027 49/9 |
| 2,448,209 A | * | 8/1948 | Boyer | B64F 1/029 188/110 |
| 2,478,847 A | * | 8/1949 | Stuart | B64C 29/0033 244/233 |
| 2,488,050 A | * | 11/1949 | Brodie | B64C 25/68 244/110 F |
| 2,488,051 A | * | 11/1949 | Brodie | B64F 1/029 104/94 |
| 2,539,489 A | * | 1/1951 | Smith | B64C 37/00 244/49 |
| 2,540,404 A | * | 2/1951 | Neale | B64C 27/08 244/17.11 |
| 2,552,115 A | * | 5/1951 | Replogle | B64C 29/0091 244/110 G |
| 2,563,020 A | * | 8/1951 | Gemeinhardt | A63H 27/02 416/208 |
| 2,629,567 A | * | 2/1953 | Papadakos | B64C 27/12 244/81 |
| 2,629,568 A | * | 2/1953 | Wood | B64C 27/08 244/17.23 |
| 2,651,480 A | * | 9/1953 | Pullin | B64C 27/08 244/17.23 |
| 2,659,551 A | * | 11/1953 | Campbell | B64C 27/80 244/17.23 |
| 2,659,553 A | * | 11/1953 | Wallis | B64F 1/10 244/63 |
| 2,707,008 A | * | 4/1955 | Bannister | A01G 23/00 83/788 |
| 2,738,939 A | * | 3/1956 | Johnson | B64D 1/22 441/83 |
| 2,753,132 A | * | 7/1956 | Gley | B64C 29/00 244/6 |
| 2,779,421 A | * | 1/1957 | Rust | B64D 1/16 169/53 |
| 2,807,429 A | * | 9/1957 | Hawkins, Jr. | B63B 35/50 244/116 |
| 2,843,337 A | * | 7/1958 | Bennett | F16C 11/069 244/2 |
| 2,847,173 A | * | 8/1958 | McCarty, Jr. | B64C 39/026 244/17.11 |
| 2,862,680 A | * | 12/1958 | Berger | B64C 27/18 416/22 |
| 2,927,747 A | * | 3/1960 | Bennie | B64C 25/52 244/17.17 |
| 2,944,815 A | * | 7/1960 | Moyer | A63B 71/023 473/481 |
| 2,953,321 A | * | 9/1960 | Robertson | B64C 39/026 180/117 |
| 2,955,780 A | * | 10/1960 | Hulbert | B64C 27/20 180/117 |
| 3,002,712 A | * | 10/1961 | Beckwith | B64C 27/20 244/17.23 |
| 3,017,138 A | * | 1/1962 | Flint | B64B 1/40 244/3 |
| 3,029,047 A | * | 4/1962 | Jacobsen | B64C 39/026 244/17.11 |
| 3,029,049 A | * | 4/1962 | Walker | B64F 1/0299 244/110 D |
| 3,036,315 A | * | 5/1962 | Karnow | B63C 9/26 441/83 |
| 3,053,480 A | * | 9/1962 | Vanderlip | B64U 30/293 244/17.13 |
| 3,081,964 A | * | 3/1963 | Quenzler | B64C 29/0033 244/54 |
| 3,128,062 A | * | 4/1964 | Marie | B64C 27/20 244/23 C |
| 3,135,481 A | * | 6/1964 | Sudrow | B64C 29/0033 244/23 C |
| 3,146,974 A | * | 9/1964 | Petoia | B64F 1/029 244/110 C |
| 3,181,810 A | * | 5/1965 | Olson | B64C 29/0033 244/66 |
| 3,184,183 A | * | 5/1965 | Piasecki | B64C 27/20 244/23 R |
| 3,185,409 A | * | 5/1965 | Jacobsen | B64C 25/52 244/17.11 |
| 3,228,044 A | * | 1/1966 | Mattenson | B63C 9/26 441/83 |
| 3,241,791 A | * | 3/1966 | Piasecki | B64C 27/82 244/6 |
| 3,245,476 A | * | 4/1966 | Rodwick | B63H 23/34 416/241 A |
| 3,253,806 A | * | 5/1966 | Eickmann | B64C 27/12 244/17.23 |
| 3,265,329 A | * | 8/1966 | Postelson | B64D 17/00 180/128 |
| 3,273,651 A | * | 9/1966 | Andrews | A62C 3/0235 169/53 |
| 3,318,554 A | * | 5/1967 | Mullins | B64D 27/04 60/797 |
| 3,351,325 A | * | 11/1967 | Cotton | B64D 1/00 244/137.1 |
| 3,368,778 A | * | 2/1968 | Wilde | B64C 27/12 244/6 |

(56) References Cited

U.S. PATENT DOCUMENTS

| | | | | |
|---|---|---|---|---|
| 3,381,922 A | * | 5/1968 | Laing | B64U 10/60 244/17.17 |
| 3,410,506 A | * | 11/1968 | Hayes | B64C 27/26 244/17.23 |
| 3,485,302 A | * | 12/1969 | Thorpe | A62C 3/0242 169/53 |
| 3,539,070 A | * | 11/1970 | Dunlea, Jr. | B64D 1/22 220/8 |
| 3,556,438 A | * | 1/1971 | Ludwig et al. | B64C 39/026 244/17.23 |
| 3,559,930 A | * | 2/1971 | Sellards | B64D 1/16 239/171 |
| 3,578,263 A | * | 5/1971 | Gunter | B64C 29/0033 244/7 A |
| 3,669,564 A | * | 6/1972 | Garfinkle | B64C 27/52 416/129 |
| 3,700,172 A | * | 10/1972 | Gallegos, Sr. | A63H 27/06 239/722 |
| 3,722,830 A | * | 3/1973 | Barber | B64C 27/10 244/17.23 |
| 3,759,330 A | * | 9/1973 | Rainey | B64D 1/16 169/53 |
| 3,785,316 A | * | 1/1974 | Leming | B64F 1/24 74/89.32 |
| 3,787,862 A | * | 1/1974 | Jacobson | G01S 3/52 342/418 |
| 3,837,452 A | * | 9/1974 | Schuricht | B65G 11/203 193/25 FT |
| 3,873,049 A | * | 3/1975 | Horsdal | B64C 27/08 244/6 |
| 3,889,902 A | * | 6/1975 | Madet | B64C 27/04 244/23 B |
| 3,894,613 A | * | 7/1975 | Elizondo | A62B 1/00 182/75 |
| 3,904,301 A | * | 9/1975 | Schroeder | F16D 1/06 416/186 A |
| 3,914,067 A | * | 10/1975 | Leto | F01D 5/026 415/60 |
| 3,934,847 A | * | 1/1976 | Bentivegna | B64D 1/22 441/83 |
| 3,979,658 A | * | 9/1976 | Foster | H02J 7/007184 320/DIG. 5 |
| 3,980,259 A | * | 9/1976 | Greenhalgh | B64C 39/024 244/116 |
| 3,991,333 A | * | 11/1976 | Laskaris | H02K 55/04 310/216.127 |
| 3,997,131 A | * | 12/1976 | Kling | B64C 27/10 416/129 |
| 4,037,807 A | * | 7/1977 | Johnston | B64C 39/024 244/34 A |
| 4,046,339 A | * | 9/1977 | Stancliffe | B64C 25/36 301/16 |
| 4,079,901 A | * | 3/1978 | Mayhew | B64F 1/06 124/36 |
| 4,101,070 A | * | 7/1978 | Hoare | A47J 43/08 494/9 |
| 4,115,841 A | * | 9/1978 | Alexander | B64D 47/02 362/53 |
| 4,116,405 A | * | 9/1978 | Bacchi | B64C 39/12 D12/330 |
| 4,116,408 A | * | 9/1978 | Soloy | B64F 1/007 244/114 R |
| 4,123,020 A | * | 10/1978 | Korsak | B64F 1/125 244/116 |
| 4,136,845 A | * | 1/1979 | Eickmann | B64C 27/12 244/54 |
| 4,138,077 A | * | 2/1979 | Okumura | B63C 9/26 441/83 |
| 4,147,317 A | * | 4/1979 | Mayhew | B64F 1/02 244/116 |
| 4,161,843 A | * | 7/1979 | Hui | A63H 27/12 244/17.23 |
| 4,177,647 A | * | 12/1979 | Overbye | A23L 3/362 62/57 |
| 4,267,987 A | * | 5/1981 | McDonnell | B64D 39/00 244/6 |
| 4,311,290 A | * | 1/1982 | Koper | B64F 1/0299 244/115 |
| 4,370,824 A | * | 2/1983 | Resnicow | A63H 33/18 473/588 |
| 4,387,866 A | * | 6/1983 | Eickmann | B64C 29/00 244/7 C |
| 4,411,596 A | * | 10/1983 | Chilman | F03D 7/0224 416/51 |
| 4,417,708 A | * | 11/1983 | Negri | B64C 3/40 244/119 |
| 4,447,024 A | * | 5/1984 | Williams | B64C 39/026 244/4 A |
| 4,450,364 A | * | 5/1984 | Benoit | F03D 9/25 290/55 |
| 4,453,378 A | * | 6/1984 | Zagranski | G05D 1/0858 701/100 |
| 4,456,204 A | * | 6/1984 | Hapke | B64D 33/02 244/58 |
| 4,473,199 A | * | 9/1984 | Magill | B64C 27/06 244/17.11 |
| 4,477,228 A | * | 10/1984 | Duffy | B63H 23/34 416/223 R |
| 4,478,379 A | * | 10/1984 | Kerr | B64C 39/024 244/17.11 |
| 4,491,325 A | * | 1/1985 | Bersheim | A63F 13/24 74/471 XY |
| 4,492,353 A | * | 1/1985 | Phillips | B64C 29/0075 244/12.4 |
| 4,523,729 A | * | 6/1985 | Frick | B64F 1/04 244/135 A |
| 4,529,253 A | * | 7/1985 | Ho | B60B 1/041 301/58 |
| 4,575,026 A | * | 3/1986 | Brittain | F41J 13/00 188/371 |
| 4,591,112 A | * | 5/1986 | Piasecki | B64B 1/00 244/26 |
| 4,617,725 A | * | 10/1986 | Holter | H02K 3/18 310/194 |
| 4,665,993 A | * | 5/1987 | Balassa | A62D 1/0007 169/44 |
| 4,676,458 A | * | 6/1987 | Cohen | B64D 41/007 244/58 |
| 4,680,962 A | * | 7/1987 | Durbin | G01P 5/006 73/170.04 |
| 4,742,976 A | * | 5/1988 | Cohen | F03D 9/25 244/58 |
| 4,753,400 A | * | 6/1988 | Reuter | B64F 1/027 244/116 |
| 4,757,959 A | * | 7/1988 | Schroder | B64D 3/00 244/137.4 |
| 4,790,497 A | * | 12/1988 | Yoffe | B64F 1/029 244/116 |
| 4,795,111 A | * | 1/1989 | Moller | B64C 27/00 244/100 R |
| 4,818,990 A | * | 4/1989 | Fernandes | G05D 1/0038 340/310.17 |
| 4,827,753 A | * | 5/1989 | Moroney | B21D 11/14 72/299 |
| 4,834,321 A | * | 5/1989 | Granger | B64F 1/125 410/12 |
| 4,842,222 A | * | 6/1989 | Baird | A63H 27/087 244/155 A |
| 4,881,601 A | * | 11/1989 | Smith | B64D 1/16 169/53 |
| 4,908,705 A | * | 3/1990 | Wight | H04N 23/76 348/E5.079 |
| 4,955,560 A | * | 9/1990 | Nishina | B64D 27/24 244/58 |
| 4,963,108 A | * | 10/1990 | Koda | B63H 5/10 416/129 |
| 4,982,914 A | * | 1/1991 | Eickmann | B64C 11/28 244/54 |

(56) References Cited

U.S. PATENT DOCUMENTS

| | | | | |
|---|---|---|---|---|
| 4,991,796 A * | 2/1991 | Peters | ................... | F03D 9/35 244/119 |
| 5,000,398 A * | 3/1991 | Rashev | ................... | B64C 27/08 244/116 |
| 5,005,083 A * | 4/1991 | Grage | ................... | H04N 5/33 348/588 |
| 5,020,742 A * | 6/1991 | Haslim | ................... | B64D 1/22 441/83 |
| 5,039,034 A * | 8/1991 | Burgess | ................... | B64F 1/125 114/261 |
| 5,042,750 A * | 8/1991 | Winter | ................... | B64F 1/027 244/110 H |
| 5,054,717 A * | 10/1991 | Taylor | ................... | B64C 39/024 244/110 F |
| 5,064,143 A * | 11/1991 | Bucher | ................... | B64C 27/20 244/12.3 |
| 5,070,955 A * | 12/1991 | Lissaman | ................... | B64C 27/20 180/117 |
| 5,071,383 A * | 12/1991 | Kinoshita | ................... | B64U 30/24 244/30 |
| 5,077,609 A * | 12/1991 | Manelphe | ................... | H04N 5/33 348/E5.09 |
| 5,092,540 A * | 3/1992 | Burgess | ................... | B64F 1/125 114/261 |
| 5,092,738 A * | 3/1992 | Byrnes | ................... | B64C 27/51 416/134 A |
| 5,118,052 A * | 6/1992 | Alvarez | ................... | B64C 1/30 89/1.801 |
| 5,123,614 A * | 6/1992 | Whitehouse | ................... | B64D 41/007 416/14 |
| 5,135,055 A * | 8/1992 | Bisson | ................... | B64D 1/16 169/53 |
| 5,150,857 A * | 9/1992 | Moffitt | ................... | B64U 20/65 244/34 A |
| 5,152,478 A * | 10/1992 | Cycon | ................... | B64U 20/65 244/17.11 |
| 5,174,719 A * | 12/1992 | Walsh | ................... | B64D 41/007 416/174 |
| 5,201,679 A * | 4/1993 | Velte, Jr. | ................... | B63H 23/34 440/49 |
| 5,220,773 A * | 6/1993 | Klaeger | ................... | A01D 75/30 56/13.6 |
| 5,226,350 A * | 7/1993 | Cycon | ................... | F16D 3/06 416/129 |
| 5,247,856 A * | 9/1993 | Cuypers | ................... | F16H 1/222 74/665 F |
| 5,257,643 A * | 11/1993 | Merrett | ................... | E02B 13/02 137/236.1 |
| 5,277,380 A * | 1/1994 | Cycon | ................... | B64U 30/26 244/12.2 |
| 5,281,099 A * | 1/1994 | Hunter | ................... | B64U 20/65 416/204 R |
| 5,295,643 A * | 3/1994 | Ebbert | ................... | B64C 29/02 428/117 |
| 5,303,546 A * | 4/1994 | Farrell | ................... | F02B 53/02 123/18 A |
| 5,322,219 A * | 6/1994 | Esplin | ................... | B64D 1/16 244/33 |
| 5,340,279 A * | 8/1994 | Cycon | ................... | B64U 30/26 416/134 A |
| 5,351,913 A * | 10/1994 | Cycon | ................... | B64U 30/24 416/115 |
| 5,364,230 A * | 11/1994 | Krauss | ................... | B64C 27/33 416/138 |
| 5,370,341 A * | 12/1994 | Leon | ................... | B64C 31/028 244/17.11 |
| 5,419,513 A * | 5/1995 | Flemming, Jr. | ....... | B64C 39/024 244/45 R |
| 5,419,514 A * | 5/1995 | Ducan | ................... | B64C 29/0033 244/23 B |
| 5,421,538 A * | 6/1995 | Vassa (Suratano Thienphropa) | ......... | B64C 27/20 244/23 B |
| 5,484,120 A * | 1/1996 | Blakeley | ................... | B64D 41/007 244/54 |
| 5,505,407 A * | 4/1996 | chiappetta | ................... | B60F 5/02 244/50 |
| 5,507,453 A * | 4/1996 | Shapery | ................... | B64C 29/0025 244/73 C |
| 5,532,529 A * | 7/1996 | Codina | ................... | H03K 17/965 200/6 A |
| 5,559,432 A * | 9/1996 | Logue | ................... | B82Y 15/00 345/161 |
| 5,575,438 A * | 11/1996 | McGonigle | ................... | B64C 39/024 343/705 |
| 5,581,250 A * | 12/1996 | Khvilivitzky | ........ | G08G 5/0086 382/104 |
| 5,589,828 A * | 12/1996 | Armstrong | .......... | G06F 3/03548 341/20 |
| 5,593,199 A * | 1/1997 | Fandrich | ................... | B66C 1/585 294/118 |
| 5,593,265 A * | 1/1997 | Kizer | ................... | F16B 21/02 403/348 |
| 5,593,283 A * | 1/1997 | Scott | ................... | F04D 19/002 416/169 A |
| 5,601,257 A * | 2/1997 | McKann | ................... | B64C 27/52 416/169 R |
| 5,620,153 A * | 4/1997 | Ginsberg | ................... | B64D 17/72 244/902 |
| 5,653,421 A * | 8/1997 | Ellzey | ................... | F16K 31/0679 251/297 |
| 5,676,334 A * | 10/1997 | Cotton | ................... | G05D 1/0816 244/175 |
| 5,687,930 A * | 11/1997 | Wagner | ................... | B64F 1/125 340/948 |
| 5,746,390 A * | 5/1998 | Chiappetta | .......... | B64C 29/0025 244/12.6 |
| 5,758,844 A * | 6/1998 | Cummings | ......... | B64C 29/0033 244/66 |
| 5,790,101 A * | 8/1998 | Schoch | ................... | G05G 9/047 345/184 |
| 5,791,592 A * | 8/1998 | Nolan | ................... | B64C 27/14 416/129 |
| 5,799,900 A * | 9/1998 | McDonnell | ................... | B64F 1/02 244/17.11 |
| 5,806,795 A * | 9/1998 | Ortelli | ................... | B64F 1/125 244/50 |
| 5,810,453 A * | 9/1998 | O'Brien | ................... | B60B 21/025 301/59 |
| 5,839,691 A * | 11/1998 | Lariviere | ................... | B64C 27/605 244/17.23 |
| 5,854,622 A * | 12/1998 | Brannon | ................... | G05G 9/04737 345/161 |
| 5,873,545 A * | 2/1999 | Kapin | ................... | B64C 29/0025 244/12.3 |
| 5,884,222 A * | 3/1999 | Denoize | ................... | G01C 5/005 340/973 |
| 5,890,441 A * | 4/1999 | Swinson | ................... | B64C 39/024 244/12.3 |
| 5,897,079 A * | 4/1999 | Specht | ................... | B64C 1/067 244/119 |
| 5,915,649 A * | 6/1999 | Head | ................... | B64C 37/00 244/17.17 |
| 5,934,875 A * | 8/1999 | Head | ................... | B64C 27/12 416/246 |
| 5,971,325 A * | 10/1999 | Gold | ................... | G05D 1/0858 244/17.23 |
| D418,475 S * | 1/2000 | Milde, Jr. | ................... | D12/325 |
| 6,053,192 A * | 4/2000 | Ellzey | ................... | G05D 16/106 137/12 |
| 6,059,226 A * | 5/2000 | Cotton | ................... | G05D 1/0858 244/175 |
| 6,076,024 A * | 6/2000 | Thornberg | ......... | G05D 1/0858 701/4 |
| 6,084,549 A * | 7/2000 | Pensjo | ................... | H01Q 1/48 343/702 |

(56) References Cited

U.S. PATENT DOCUMENTS

| | | | | |
|---|---|---|---|---|
| 6,092,007 A * | 7/2000 | Cotton | G05D 1/0204 | 701/4 |
| D430,530 S * | 9/2000 | Milde, Jr. | D12/325 | |
| 6,119,976 A * | 9/2000 | Rogers | B64C 39/024 | 89/1.816 |
| 6,130,705 A * | 10/2000 | Lareau | H04N 23/6811 | 382/106 |
| 6,154,198 A * | 11/2000 | Rosenberg | A63F 13/235 | 345/157 |
| 6,160,537 A * | 12/2000 | Liu | G05G 9/047 | 250/221 |
| 6,164,590 A * | 12/2000 | Kusic | B64C 27/08 | 244/17.11 |
| 6,170,778 B1 * | 1/2001 | Cycon | B64C 27/20 | 244/6 |
| 6,231,005 B1 * | 5/2001 | Costes | B64C 27/605 | 416/115 |
| 6,232,959 B1 * | 5/2001 | Pedersen | G06F 1/169 | 345/161 |
| 6,249,957 B1 * | 6/2001 | Wiesler | H02K 15/028 | 29/598 |
| 6,260,796 B1 * | 7/2001 | Klingensmith | G05D 1/0858 | 244/17.11 |
| 6,260,797 B1 * | 7/2001 | Palmer | B64D 37/04 | 102/501 |
| 6,263,932 B1 * | 7/2001 | Chalifoux | A01G 23/08 | 144/34.1 |
| 6,264,140 B1 * | 7/2001 | McGeer | B64F 1/029 | 244/116 |
| 6,270,038 B1 * | 8/2001 | Cycon | B64U 30/294 | 244/12.3 |
| 6,286,783 B1 * | 9/2001 | Kuenkler | B63H 5/125 | 244/30 |
| 6,293,491 B1 * | 9/2001 | Wobben | B64D 27/24 | 244/17.23 |
| 6,293,492 B1 * | 9/2001 | Yanagisawa | B64C 27/52 | 244/17.23 |
| 6,297,486 B1 * | 10/2001 | Rom | F42B 10/44 | 102/490 |
| 6,302,229 B1 * | 10/2001 | Triebel | B64C 27/20 | 180/117 |
| 6,311,107 B1 * | 10/2001 | Curto | B64F 1/18 | 701/14 |
| 6,313,810 B1 * | 11/2001 | Andersson | H01Q 1/28 | 343/705 |
| 6,331,099 B1 * | 12/2001 | Eccles | B64D 41/007 | 416/142 |
| 6,342,015 B1 * | 1/2002 | Robertson | A63G 21/02 | 472/88 |
| 6,343,768 B1 * | 2/2002 | Muldoon | B64C 29/0033 | 244/7 R |
| 6,373,466 B2 * | 4/2002 | Salcudean | G06F 3/0421 | 345/161 |
| 6,382,556 B1 * | 5/2002 | Pham | B64C 29/0033 | 244/6 |
| 6,382,559 B1 * | 5/2002 | Sutterfield | B64C 15/02 | 244/12.4 |
| D459,286 S * | 6/2002 | Miralles | D12/319 | |
| 6,450,445 B1 * | 9/2002 | Moller | B64C 39/024 | 244/12.6 |
| 6,488,232 B2 * | 12/2002 | Moshier | B64C 39/026 | 244/4 A |
| 6,502,787 B1 * | 1/2003 | Barrett | A63H 27/12 | 244/7 B |
| 6,531,965 B1 * | 3/2003 | Kaiser | F42B 12/365 | 102/513 |
| 6,543,726 B2 * | 4/2003 | Illingworth | B64C 11/48 | 244/17.23 |
| 6,547,180 B1 * | 4/2003 | Cassidy | B64C 29/0025 | 244/23 C |
| 6,550,715 B1 * | 4/2003 | Reynolds | A63H 27/12 | 244/17.11 |
| 6,561,455 B2 * | 5/2003 | Capanna | B64C 29/02 | 244/7 B |
| 6,561,456 B1 * | 5/2003 | Devine | B64C 29/0025 | 244/12.3 |
| 6,581,872 B2 * | 6/2003 | Walmsley | B64C 39/024 | 244/12.4 |
| 6,592,071 B2 * | 7/2003 | Kinkead | G05D 1/102 | 244/7 R |
| 6,604,706 B1 * | 8/2003 | Bostan | B64C 29/02 | 244/6 |
| 6,604,711 B1 * | 8/2003 | Stevens | B64D 39/02 | 244/135 A |
| 6,615,165 B2 * | 9/2003 | Carroll | G05D 1/10 | 244/119 |
| 6,626,078 B2 * | 9/2003 | Thornton | F41H 11/12 | 89/1.13 |
| 6,626,398 B1 * | 9/2003 | Cox | B64C 39/068 | 244/45 R |
| 6,644,595 B2 * | 11/2003 | Ramage | A62C 3/0228 | 169/53 |
| 6,655,631 B2 * | 12/2003 | Austen-Brown | B64D 25/00 | 244/12.4 |
| 6,666,404 B1 * | 12/2003 | Wingert | B64U 50/18 | 244/23 C |
| 6,676,379 B2 * | 1/2004 | Eccles | F03D 15/10 | 416/142 |
| 6,685,140 B2 * | 2/2004 | Carroll | B64D 17/80 | 244/152 |
| 6,691,949 B2 * | 2/2004 | Plump | B64U 10/20 | 244/34 A |
| 6,711,477 B1 * | 3/2004 | Johnson | G05D 1/101 | 701/13 |
| 6,719,244 B1 * | 4/2004 | Gress | B64C 29/0033 | 244/7 R |
| 6,733,227 B2 * | 5/2004 | Fitzgerald | B60P 1/02 | 414/471 |
| 6,741,233 B1 * | 5/2004 | Swan | G06F 3/0362 | 345/161 |
| 6,745,977 B1 * | 6/2004 | Long | B60F 5/02 | 244/221 |
| 6,773,321 B1 * | 8/2004 | Urquiaga | A63H 17/28 | 446/457 |
| 6,808,140 B2 * | 10/2004 | Moller | B64C 3/56 | 244/12.5 |
| 6,843,699 B2 * | 1/2005 | Davis | A63H 33/18 | 446/37 |
| 6,845,942 B2 * | 1/2005 | Paul | B64C 11/001 | 244/17.11 |
| 6,874,729 B1 * | 3/2005 | McDonnell | B64F 1/02 | 244/63 |
| 6,883,748 B2 * | 4/2005 | Yoeli | B60V 3/02 | 244/12.3 |
| 6,886,776 B2 * | 5/2005 | Wagner | B64C 3/56 | 244/12.4 |
| 6,889,776 B2 * | 5/2005 | Cheung | B64D 1/18 | 169/53 |
| 6,889,821 B1 * | 5/2005 | Walser | B65G 47/244 | 193/46 |
| 6,892,980 B2 * | 5/2005 | Kawai | B64C 29/0033 | 244/12.4 |
| 6,896,221 B1 * | 5/2005 | Einarsson | B64C 5/08 | 244/12.4 |
| 6,903,466 B1 * | 6/2005 | Mercier | H02K 7/1838 | 290/55 |
| 6,918,723 B2 * | 7/2005 | Battig | F01D 5/025 | 411/378 |
| 6,923,404 B1 * | 8/2005 | Liu | B64C 39/024 | 244/46 |
| 6,961,018 B2 * | 11/2005 | Heppe | G01S 19/07 | 342/357.34 |
| 6,978,969 B1 * | 12/2005 | Neal | B64C 27/02 | 244/23 B |
| 6,978,970 B2 * | 12/2005 | Purcell, Jr. | B64C 3/56 | 244/49 |
| 6,991,362 B1 * | 1/2006 | Seaman | B01F 25/2124 | 366/342 |

(56) References Cited

U.S. PATENT DOCUMENTS

| | | | | |
|---|---|---|---|---|
| 7,000,883 B2* | 2/2006 | Mercadal | ............... | F16M 11/18 396/428 |
| 7,011,274 B1* | 3/2006 | Hardoin | ............... | B64D 35/00 244/17.23 |
| 7,014,141 B2* | 3/2006 | Cox | .................. | B64U 20/87 244/3.1 |
| 7,028,947 B2* | 4/2006 | Burns | .................. | F41J 2/02 244/1 TD |
| 7,035,856 B1* | 4/2006 | Morimoto | ............. | B65D 23/14 707/999.01 |
| 7,059,564 B2* | 6/2006 | Dennis | ................. | B64F 1/06 244/110 G |
| 7,077,358 B1* | 7/2006 | Quartarone | ............. | B64C 27/82 244/17.19 |
| 7,086,843 B2* | 8/2006 | Cheng | ................... | F04D 29/263 417/423.1 |
| 7,104,495 B2* | 9/2006 | McGeer | ................. | B64F 1/06 244/1 R |
| 7,114,680 B2* | 10/2006 | Dennis | ................. | B64U 70/50 244/110 E |
| 7,121,507 B2* | 10/2006 | Dennis | ................. | B64C 39/024 244/116 |
| 7,123,201 B2* | 10/2006 | Caudle | ................. | H01Q 1/185 343/882 |
| 7,127,348 B2* | 10/2006 | Smitherman | ........... | G01S 17/89 701/523 |
| 7,128,293 B2* | 10/2006 | Isley | ................... | B64C 27/52 244/17.27 |
| 7,143,976 B2* | 12/2006 | Snediker | .............. | B64F 1/029 244/110 G |
| 7,168,656 B2* | 1/2007 | Pai | ....................... | B64C 27/10 244/17.23 |
| 7,175,135 B2* | 2/2007 | Dennis | ................. | B64C 39/024 244/110 F |
| 7,183,663 B2* | 2/2007 | Roberts | .............. | F03D 9/25 290/55 |
| 7,194,397 B1* | 3/2007 | Bush | ................... | G05D 1/0088 703/22 |
| 7,200,982 B2* | 4/2007 | Vandyke | .............. | A01D 75/182 56/17.5 |
| 7,201,346 B2* | 4/2007 | Hansen | ................. | B64C 39/064 244/12.1 |
| 7,204,672 B2* | 4/2007 | Sewell | ............... | B64C 29/0025 180/125 |
| 7,210,651 B2* | 5/2007 | Scott | .................... | B64C 27/10 244/17.23 |
| 7,210,654 B1* | 5/2007 | Cox | ...................... | B64C 39/024 244/190 |
| 7,219,856 B2* | 5/2007 | Watts | ................... | B64F 1/02 244/110 F |
| 7,236,914 B1* | 6/2007 | Zyskowski | ............ | G06F 30/15 434/30 |
| 7,236,941 B2* | 6/2007 | Conkwright | ........ | G06Q 30/0255 705/7.29 |
| 7,255,623 B2* | 8/2007 | Davis | ................... | A63H 27/04 446/37 |
| 7,264,204 B1* | 9/2007 | Portmann | ............ | B63B 35/52 244/110 F |
| 7,273,195 B1* | 9/2007 | Golliher | ................ | A63H 27/12 244/17.11 |
| 7,302,316 B2* | 11/2007 | Beard | .................... | G05D 1/101 340/948 |
| 7,325,772 B1* | 2/2008 | Hanewinkel, III | .... | B64D 13/00 165/41 |
| 7,343,232 B2* | 3/2008 | Duggan | ................ | B64C 39/024 701/13 |
| 7,344,108 B2* | 3/2008 | Muylaert | .............. | B64C 25/68 244/119 |
| 7,364,115 B2* | 4/2008 | Parks | .................... | B64C 11/001 244/12.4 |
| 7,385,528 B2* | 6/2008 | Gomez | .................. | F04D 29/005 340/946 |
| 7,410,125 B2* | 8/2008 | Steele | ................... | B64F 1/0297 244/110 E |
| 7,429,997 B2* | 9/2008 | Givon | ................... | H04N 13/302 348/E13.064 |
| 7,432,923 B2* | 10/2008 | Fujiwara | ............... | G01S 19/48 342/357.31 |
| 7,441,724 B2* | 10/2008 | Parks | ..................... | B64C 3/385 244/3.28 |
| 7,453,409 B2* | 11/2008 | Zimmerman | ............ | H01Q 1/28 343/765 |
| 7,463,241 B2* | 12/2008 | Ushimaru | .......... | G05G 9/04796 345/157 |
| 7,464,650 B2* | 12/2008 | Steinkerchner | ........... | B64F 1/14 104/48 |
| 7,470,217 B2* | 12/2008 | Jones-Glaser | ......... | A63B 23/16 482/909 |
| 7,472,863 B2* | 1/2009 | Pak | ........................ | B64D 35/04 244/12.5 |
| 7,506,837 B2* | 3/2009 | Parks | .................... | G05D 1/0669 244/7 B |
| 7,510,142 B2* | 3/2009 | Johnson | ................ | B64C 39/024 244/175 |
| 7,510,145 B2* | 3/2009 | Snediker | ............... | B64F 1/0297 244/110 F |
| 7,516,689 B2* | 4/2009 | Herman | ................. | F41A 19/58 89/1.11 |
| 7,530,527 B2* | 5/2009 | Kelleher | ............... | B64C 39/024 244/63 |
| 7,543,780 B1* | 6/2009 | Marshall | ................ | B64U 50/37 244/175 |
| 7,545,121 B2* | 6/2009 | Bolduc | ................. | H02J 7/1423 320/136 |
| 7,548,488 B2* | 6/2009 | Horak | ................... | B64U 50/11 367/120 |
| 7,559,191 B2* | 7/2009 | Parks | ..................... | B64C 11/14 416/94 |
| 7,562,843 B2* | 7/2009 | Lipponen | .............. | F41F 3/0406 124/56 |
| 7,575,192 B1* | 8/2009 | Kish | ........................ | B64C 27/12 244/60 |
| 7,578,467 B2* | 8/2009 | Goodrich | .............. | B66C 23/18 73/862.392 |
| 7,581,608 B2* | 9/2009 | St. Louis | ................. | B60V 1/04 180/117 |
| 7,581,696 B2* | 9/2009 | Morgan | .................. | B64C 5/06 244/45 R |
| 7,581,702 B2* | 9/2009 | Olson | .................... | H04W 4/40 701/2 |
| 7,584,925 B2* | 9/2009 | Miller | ................... | B64U 70/50 244/3.28 |
| 7,585,153 B1* | 9/2009 | Schmaling | ............. | B64C 27/48 416/129 |
| 7,600,976 B2* | 10/2009 | Bagai | ..................... | B64C 27/10 416/223 R |
| 7,604,198 B2* | 10/2009 | Petersen | ............... | B64U 70/90 244/17.23 |
| 7,631,834 B1* | 12/2009 | Johnson | ................ | B64U 50/14 244/175 |
| 7,642,975 B2* | 1/2010 | Brunks | .................. | B64D 45/02 343/705 |
| 7,665,691 B2* | 2/2010 | Hanzlick | ................ | B64F 1/10 244/63 |
| 7,675,189 B2* | 3/2010 | Grenier | ................... | F03D 15/00 290/43 |
| 7,677,491 B2* | 3/2010 | Merems | .................. | B64D 1/02 244/8 |
| 7,681,832 B2* | 3/2010 | Colclough | ............. | B64C 29/02 244/49 |
| 7,693,617 B2* | 4/2010 | Dockter | ................. | G01C 5/005 701/28 |
| 7,712,701 B1* | 5/2010 | Ehrmantraut | ......... | B64C 39/024 244/17.23 |
| 7,725,258 B2* | 5/2010 | Smitherman | ........... | G01C 11/02 348/144 |
| 7,753,309 B2* | 7/2010 | Garreau | ................. | B64C 29/0033 244/12.4 |

(56) References Cited

U.S. PATENT DOCUMENTS

| | | | | |
|---|---|---|---|---|
| 7,757,684 B2* | 7/2010 | Baratta | B28D 1/045 | 451/344 |
| 7,762,776 B2* | 7/2010 | Siegel | B63H 1/08 | 440/93 |
| 7,789,341 B2* | 9/2010 | Arlton | B64U 30/21 | 244/6 |
| 7,798,445 B2* | 9/2010 | Heppe | B64F 1/025 | 244/110 E |
| 7,802,754 B2* | 9/2010 | Karem | B64C 29/0033 | 244/12.4 |
| 7,802,755 B2* | 9/2010 | Poltorak | B64C 27/10 | 244/17.27 |
| 7,825,554 B2* | 11/2010 | Bastian | B64C 27/20 | 310/90.5 |
| D628,658 S* | 12/2010 | Wurm | D21/442 | |
| 7,857,253 B2* | 12/2010 | Yoeli | B64C 3/40 | 244/12.3 |
| 7,866,610 B2* | 1/2011 | Bousfield | B64C 3/18 | 244/46 |
| 7,883,059 B2* | 2/2011 | Kunz | B64C 13/0421 | 318/560 |
| 7,911,796 B2* | 3/2011 | Vander Ploeg | H05K 7/20545 | 257/727 |
| 7,946,530 B1* | 5/2011 | Talmage, Jr. | B64D 25/12 | 244/140 |
| 7,959,105 B2* | 6/2011 | Marze | B64C 11/001 | 244/17.19 |
| 7,962,265 B2* | 6/2011 | Pinney | B64D 47/08 | 348/145 |
| 7,970,532 B2* | 6/2011 | Tehan | G05D 1/0646 | 701/423 |
| 7,997,526 B2* | 8/2011 | Greenley | A63H 27/02 | 446/37 |
| 8,001,764 B2* | 8/2011 | Parks | F02K 5/02 | 244/54 |
| 8,002,604 B2* | 8/2011 | Van de Rostyne | A63H 27/12 | 244/17.11 |
| 8,020,804 B2* | 9/2011 | Yoeli | B64C 15/02 | 180/117 |
| 8,070,092 B2* | 12/2011 | Bouldin | B64C 39/024 | 244/34 A |
| 8,070,103 B2* | 12/2011 | Collette | F02M 37/20 | 244/135 R |
| 8,082,102 B2* | 12/2011 | Ravenscroft | G08G 5/0069 | 701/2 |
| 8,087,315 B2* | 1/2012 | Goossen | F16M 11/041 | 74/5.22 |
| 8,089,034 B2* | 1/2012 | Hammerquist | F42B 10/14 | 244/3.28 |
| 8,091,833 B2* | 1/2012 | von Flotow | B64C 39/024 | 244/131 |
| 8,104,707 B1* | 1/2012 | Ohanian, III | B64U 10/30 | 244/23 C |
| 8,109,711 B2* | 2/2012 | Blumer | F03D 1/00 | 416/85 |
| 8,118,255 B1* | 2/2012 | Monson | B64F 1/027 | 244/110 F |
| 8,123,169 B2* | 2/2012 | Collette | B64C 27/20 | 137/574 |
| 8,123,460 B2* | 2/2012 | Collette | B64D 13/006 | 361/699 |
| 8,128,019 B2* | 3/2012 | Annati | B64C 39/024 | 244/12.3 |
| 8,147,289 B1* | 4/2012 | Lee | A63H 27/12 | 446/36 |
| 8,157,205 B2* | 4/2012 | McWhirk | B64B 1/06 | 244/30 |
| 8,167,233 B2* | 5/2012 | Brody | B64C 27/10 | 244/17.21 |
| 8,167,234 B1* | 5/2012 | Moore | B64U 10/80 | 244/17.23 |
| 8,170,728 B2* | 5/2012 | Roesch | B64C 27/22 | 701/4 |
| 8,172,173 B2* | 5/2012 | Carlson | G05D 1/106 | 244/17.11 |
| 8,181,903 B2* | 5/2012 | Posva | B64C 15/14 | 244/12.3 |
| 8,187,049 B2* | 5/2012 | Corsiglia | A63H 27/12 | 446/454 |
| 8,225,822 B2* | 7/2012 | Erben | B64F 1/28 | 244/135 R |
| 8,231,083 B2* | 7/2012 | Kutzmann | B65H 75/425 | 244/137.4 |
| 8,240,597 B2* | 8/2012 | Entsminger | B64U 20/70 | 244/23 C |
| 8,251,308 B2* | 8/2012 | Choi | B64C 39/028 | 244/6 |
| 8,256,704 B2* | 9/2012 | Lundgren | B64C 39/024 | 244/7 C |
| 8,256,715 B2* | 9/2012 | Ballard | B64U 30/10 | 244/123.1 |
| 8,262,016 B2* | 9/2012 | Gosling | B64U 50/18 | 244/12.6 |
| 8,272,593 B2* | 9/2012 | Choi | B64C 39/028 | 244/17.11 |
| 8,272,917 B2* | 9/2012 | Davis | A63H 33/18 | 446/37 |
| 8,302,902 B2* | 11/2012 | Lynas | B64C 25/44 | 244/102 R |
| 8,308,522 B2* | 11/2012 | Van de Rostyne | A63H 27/06 | 244/17.23 |
| 8,313,057 B2* | 11/2012 | Rednikov | B64F 1/029 | 244/110 C |
| 8,336,805 B1* | 12/2012 | Zapata | B63H 11/113 | 244/4 A |
| 8,342,442 B1* | 1/2013 | Dancila | B64B 1/30 | 244/128 |
| 8,348,190 B2* | 1/2013 | Fleming | B64U 30/297 | 244/23 D |
| 8,350,403 B2* | 1/2013 | Carroll | B64C 39/022 | 290/55 |
| 8,376,279 B2* | 2/2013 | Parks | B64C 39/024 | 244/49 |
| 8,378,881 B2* | 2/2013 | LeMire | G01S 13/87 | 342/63 |
| 8,382,029 B2* | 2/2013 | Roy | H05H 1/2439 | 244/23 C |
| 8,386,095 B2* | 2/2013 | Fitzpatrick | B64U 30/26 | 701/4 |
| 8,413,932 B2* | 4/2013 | De Roche | F04D 29/547 | 244/221 |
| 8,414,026 B1* | 4/2013 | Lou | B64D 25/06 | 296/68.1 |
| 8,430,709 B1* | 4/2013 | Wong | A63H 27/02 | 446/57 |
| 8,434,920 B2* | 5/2013 | Jones | G05D 1/0094 | 362/85 |
| 8,443,727 B2* | 5/2013 | Roemerman | F42C 15/005 | 244/3.17 |
| 8,451,165 B2* | 5/2013 | Puzella | G01S 7/032 | 342/13 |
| 8,464,511 B1* | 6/2013 | Ribarov | H02K 7/14 | 60/268 |
| 8,473,125 B2* | 6/2013 | Rischmuller | A63H 30/04 | 701/3 |
| 8,479,883 B2* | 7/2013 | Tkebuchava | B64D 1/22 | 182/4 |
| 8,485,464 B2* | 7/2013 | Kroo | B64C 29/00 | 244/6 |
| 8,492,692 B2* | 7/2013 | Fisher | B64C 39/024 | 244/175 |
| 8,496,200 B2* | 7/2013 | Yoeli | B64C 29/0025 | 244/23 B |
| 8,500,507 B2* | 8/2013 | Davis | A63H 27/12 | 244/23 C |
| 8,505,430 B2* | 8/2013 | Miralles | F41F 1/00 | 89/1.816 |

(56) References Cited

U.S. PATENT DOCUMENTS

| | | | | |
|---|---|---|---|---|
| 8,511,606 | B1* | 8/2013 | Lutke | B64U 70/93 320/109 |
| 8,521,339 | B2* | 8/2013 | Gariepy | G05D 1/0044 701/2 |
| 8,543,265 | B2* | 9/2013 | Ekhaguere | G08G 5/0021 701/423 |
| 8,561,937 | B2* | 10/2013 | Goodarzi | B64C 39/064 244/23 C |
| 8,564,148 | B1* | 10/2013 | Novak | F03D 80/70 290/55 |
| 8,573,536 | B2* | 11/2013 | McGeer | B64F 5/00 244/114 R |
| 8,576,064 | B1* | 11/2013 | Mitchell | B64D 11/00155 340/539.11 |
| 8,590,828 | B2* | 11/2013 | Marcus | B64U 50/19 244/23 B |
| 8,596,571 | B2* | 12/2013 | Goelet | B64B 1/00 244/30 |
| 8,602,348 | B2* | 12/2013 | Bryant | B64U 10/20 244/23 B |
| 8,602,349 | B2* | 12/2013 | Petrov | B64U 30/24 244/17.23 |
| 8,608,103 | B2* | 12/2013 | Martin | B64C 39/026 244/4 A |
| 8,620,464 | B1* | 12/2013 | Weiland | F41G 3/16 700/92 |
| 8,622,708 | B2* | 1/2014 | Kusters | F04D 29/542 416/220 R |
| 8,646,720 | B2* | 2/2014 | Shaw | B64C 27/20 244/17.23 |
| 8,646,721 | B2* | 2/2014 | Chapman | B64C 27/20 244/23 C |
| 8,661,980 | B1* | 3/2014 | Roemerman | F42B 33/001 102/489 |
| 8,695,916 | B2* | 4/2014 | Martin | B64C 39/026 244/4 A |
| 8,702,466 | B2* | 4/2014 | Cheng | A63H 27/12 244/17.23 |
| 8,708,285 | B1* | 4/2014 | Carreiro | B64C 39/028 244/190 |
| 8,720,814 | B2* | 5/2014 | Smith | B64D 17/34 244/12.4 |
| 8,723,793 | B2* | 5/2014 | Smith | G06F 3/017 345/157 |
| 8,727,266 | B2* | 5/2014 | Cardozo | B64C 27/20 244/23 C |
| 8,727,280 | B1* | 5/2014 | Lutke | B64C 39/024 244/123.11 |
| 8,740,134 | B2* | 6/2014 | Suzuki | B64C 39/024 244/75.1 |
| 8,753,155 | B2* | 6/2014 | Olm | B60B 15/00 280/5.2 |
| 8,760,494 | B1* | 6/2014 | Twede | G06V 10/143 250/370.11 |
| 8,764,397 | B1* | 7/2014 | Wittig | B64C 27/32 416/61 |
| 8,777,157 | B2* | 7/2014 | Barrett | B64C 39/028 244/115 |
| 8,800,605 | B2* | 8/2014 | Barlow | B29C 70/085 138/140 |
| 8,821,123 | B2* | 9/2014 | Camci | F04D 29/541 416/189 |
| 8,844,866 | B2* | 9/2014 | De Azevedo | B64C 1/36 343/705 |
| 8,855,952 | B2* | 10/2014 | Spierling | F01D 21/003 702/58 |
| 8,874,283 | B1* | 10/2014 | Cavote | B64D 31/06 701/28 |
| 8,888,035 | B2* | 11/2014 | Lind, Jr. | B60F 3/00 244/49 |
| 8,899,903 | B1* | 12/2014 | Saad | B64C 39/024 320/109 |
| 8,903,568 | B1* | 12/2014 | Wang | G05D 1/0038 701/2 |
| 8,908,573 | B1* | 12/2014 | Wang | H04L 5/003 370/280 |
| 8,909,391 | B1* | 12/2014 | Peeters | G08G 5/0013 709/201 |
| 8,910,905 | B2* | 12/2014 | DeVaul | B64C 39/024 244/31 |
| 8,919,691 | B2* | 12/2014 | Lindmark | B64C 27/52 244/101 |
| 8,925,665 | B2* | 1/2015 | Trojahn | B60V 1/15 180/117 |
| 8,931,732 | B2* | 1/2015 | Sirohi | B64C 39/024 244/17.21 |
| 8,939,056 | B1* | 1/2015 | Neal, III | F42B 15/22 89/1.51 |
| 8,944,373 | B2* | 2/2015 | Dickson | B64F 1/029 244/110 C |
| 8,950,698 | B1* | 2/2015 | Rossi | B64C 29/0033 244/63 |
| 8,955,800 | B2* | 2/2015 | McGeer | B64C 39/024 244/116 |
| 8,956,487 | B2* | 2/2015 | Gallet | F01D 5/282 464/181 |
| 8,960,591 | B2* | 2/2015 | Pancotti | B64C 29/0033 244/66 |
| 8,964,396 | B1* | 2/2015 | Dailey | H05K 7/1454 361/624 |
| 8,979,016 | B2* | 3/2015 | Hayden, III | B64C 27/46 244/17.11 |
| 8,983,682 | B1* | 3/2015 | Peeters | G16H 40/20 701/2 |
| 8,985,504 | B2* | 3/2015 | Tao | B64C 13/34 244/3.28 |
| 8,992,161 | B2* | 3/2015 | Hindle | F16F 15/023 415/119 |
| 9,004,396 | B1* | 4/2015 | Colin | B64U 20/87 244/17.23 |
| 9,010,683 | B2* | 4/2015 | Gundlach | B64C 39/024 244/110 F |
| 9,016,616 | B2* | 4/2015 | Kawaguchi | B64C 29/02 244/6 |
| 9,033,276 | B1* | 5/2015 | Calvert | B64C 25/10 244/102 R |
| 9,056,676 | B1* | 6/2015 | Wang | G01C 21/3697 |
| 9,056,679 | B1* | 6/2015 | Langston | B64C 39/024 |
| 9,061,763 | B1* | 6/2015 | Christensen | A63H 27/12 |
| 9,085,362 | B1* | 7/2015 | Kilian | B64U 30/21 |
| 9,085,370 | B2* | 7/2015 | Lopez | B64D 39/06 |
| 9,099,902 | B2* | 8/2015 | Chen | H02K 16/00 |
| 9,105,970 | B1* | 8/2015 | Heinrich | H01Q 5/22 |
| 9,120,560 | B1* | 9/2015 | Armer | B64C 27/26 |
| 9,126,693 | B1* | 9/2015 | Shi | G05D 1/0669 |
| 9,132,916 | B2* | 9/2015 | Hanna | B64U 80/40 |
| 9,139,310 | B1* | 9/2015 | Wang | B64F 1/007 |
| D741,751 | S * | 10/2015 | Klaptocz | D21/441 |
| 9,156,549 | B2* | 10/2015 | Vetters | B64C 29/0025 |
| 9,162,764 | B2* | 10/2015 | Babinsky | B64C 39/064 |
| 9,171,479 | B2* | 10/2015 | Martin | G09B 9/042 |
| 9,174,732 | B2* | 11/2015 | Jensen | G05D 1/0866 |
| 9,174,733 | B1* | 11/2015 | Burgess | B64C 39/024 |
| 9,195,950 | B2* | 11/2015 | Schenken | G06Q 30/0233 |
| 9,199,729 | B1* | 12/2015 | Uebori | G05D 1/0011 |
| 9,205,291 | B2* | 12/2015 | Hawass | A62C 3/0228 |
| 9,211,025 | B1* | 12/2015 | Elhawwashy | A47G 29/20 |
| 9,217,417 | B2* | 12/2015 | Taneja | F03D 80/70 |
| 9,218,316 | B2* | 12/2015 | Bernstein | G06F 17/00 |
| 9,244,147 | B1* | 1/2016 | Soundararajan | G01S 1/44 |
| 9,266,609 | B1* | 2/2016 | Kunz | B64C 29/0008 |
| D751,025 | S * | 3/2016 | Howell | D12/326 |
| D751,491 | S * | 3/2016 | Chen | D12/326 |
| 9,272,784 | B2* | 3/2016 | Nelson | B64C 39/024 |
| 9,284,062 | B2* | 3/2016 | Wang | G08G 5/0043 |
| 9,290,269 | B2* | 3/2016 | Walker | B64F 3/00 |
| 9,290,277 | B2* | 3/2016 | You | B64U 10/14 |
| 9,296,477 | B1* | 3/2016 | Coburn | B64C 27/08 |
| 9,305,317 | B2* | 4/2016 | Grokop | H04R 3/002 |

(56) References Cited

U.S. PATENT DOCUMENTS

| | | | |
|---|---|---|---|
| 9,321,529 B1* | 4/2016 | Jones | B64U 10/60 |
| 9,321,531 B1* | 4/2016 | Takayama | B64D 47/06 |
| D756,842 S * | 5/2016 | Ashjaee | D12/16.1 |
| 9,346,542 B2* | 5/2016 | Leng | B64C 29/0025 |
| 9,376,208 B1* | 6/2016 | Gentry | G05D 1/042 |
| 9,387,928 B1* | 7/2016 | Gentry | G08G 5/0039 |
| 9,388,794 B2* | 7/2016 | Weddendorf | B64U 50/19 |
| 9,400,338 B2* | 7/2016 | Coste | G01V 1/223 |
| 9,409,642 B1* | 8/2016 | Pingree | B64U 30/293 |
| 9,415,870 B1* | 8/2016 | Beckman | B64U 20/20 |
| 9,421,869 B1* | 8/2016 | Ananthanarayanan | B60L 53/38 |
| 9,434,471 B2* | 9/2016 | Arlton | B64C 27/14 |
| 9,434,481 B2* | 9/2016 | McGeer | B64F 1/0297 |
| 9,442,496 B1* | 9/2016 | Beckman | B64U 20/20 |
| 9,456,185 B2* | 9/2016 | Oakley | B64U 10/17 |
| 9,457,900 B1* | 10/2016 | Jones | B64C 27/08 |
| 9,457,901 B2* | 10/2016 | Bertrand | A63H 27/12 |
| 9,481,204 B1* | 11/2016 | Wiebe | A01G 25/092 |
| 9,481,457 B2* | 11/2016 | Alber | B64U 10/20 |
| 9,487,308 B2* | 11/2016 | Featherstone | B64G 1/14 |
| 9,513,635 B1* | 12/2016 | Bethke | G05D 1/0094 |
| 9,527,588 B1* | 12/2016 | Rollefstad | B64U 30/293 |
| 9,527,597 B1* | 12/2016 | Sada | B64D 37/04 |
| 9,527,600 B2* | 12/2016 | Russ | F01D 15/10 |
| 9,545,852 B2* | 1/2017 | Streett | G05D 1/0088 |
| 9,545,991 B1* | 1/2017 | Alley | B64C 3/54 |
| 9,550,567 B1* | 1/2017 | Erdozain, Jr. | B64C 1/30 |
| 9,551,989 B2* | 1/2017 | Scarlatti | B64U 50/39 |
| 9,555,886 B1* | 1/2017 | Hawass | A62C 3/0242 |
| 9,557,738 B2* | 1/2017 | Enke | G05D 1/0044 |
| 9,567,076 B2* | 2/2017 | Zhang | B64U 20/65 |
| 9,567,081 B1* | 2/2017 | Beckman | B64D 17/00 |
| 9,567,105 B2* | 2/2017 | Alber | B64C 39/024 |
| 9,580,173 B1* | 2/2017 | Burgess | G05D 1/102 |
| 9,580,191 B2* | 2/2017 | Featherstone | B64G 1/40 |
| D780,665 S * | 3/2017 | Blincow | D12/320 |
| 9,586,683 B1* | 3/2017 | Buchmueller | G05D 1/0858 |
| 9,589,448 B1* | 3/2017 | Schneider | F41H 11/00 |
| 9,606,028 B2* | 3/2017 | Detweiller | B64U 10/16 |
| 9,609,288 B1* | 3/2017 | Richman | G06F 18/214 |
| 9,611,032 B2* | 4/2017 | Briod | B64C 17/00 |
| 9,623,967 B2* | 4/2017 | Mallard | B64U 30/297 |
| 9,630,713 B1* | 4/2017 | Von Novak, III | B64U 20/70 |
| 9,643,722 B1* | 5/2017 | Myslinski | G05D 1/0094 |
| 9,663,236 B1* | 5/2017 | Shiosaki | B64C 39/024 |
| 9,671,791 B1* | 6/2017 | Paczan | G05D 1/0088 |
| 9,677,564 B1* | 6/2017 | Woodworth | B64C 39/024 |
| 9,682,772 B2* | 6/2017 | Yoon | B64U 10/16 |
| 9,685,091 B2* | 6/2017 | Hayes | G08G 5/0069 |
| 9,688,396 B2* | 6/2017 | Avery, III | B64C 1/0009 |
| 9,725,158 B2* | 8/2017 | Yan | B64U 10/20 |
| 9,731,820 B1* | 8/2017 | Godlasky | B64C 39/024 |
| 9,738,380 B2* | 8/2017 | Claridge | B64C 39/024 |
| 9,739,615 B2* | 8/2017 | Hildebrand | G05D 1/0214 |
| 9,740,200 B2* | 8/2017 | Bethke | G08G 5/0086 |
| D796,414 S * | 9/2017 | Fenny | D12/345 |
| 9,751,597 B1* | 9/2017 | Low | B64C 39/022 |
| 9,752,718 B1* | 9/2017 | Wittig | F16M 11/2042 |
| 9,760,072 B2* | 9/2017 | Hall | H04M 1/72415 |
| 9,764,829 B1* | 9/2017 | Beckman | B64U 50/30 |
| 9,764,836 B1* | 9/2017 | Elzinga | B64U 70/50 |
| 9,764,839 B2* | 9/2017 | Whitaker | B64F 3/02 |
| D798,794 S * | 10/2017 | Fenny | D21/441 |
| D798,795 S * | 10/2017 | Fenny | D21/441 |
| 9,778,660 B2* | 10/2017 | Von Novak | B64C 39/024 |
| D803,097 S * | 11/2017 | Wang | D12/16.1 |
| D803,328 S * | 11/2017 | Lee | D21/441 |
| 9,815,552 B1* | 11/2017 | Welsh | B64C 29/02 |
| 9,816,816 B2* | 11/2017 | Hayes | G08G 5/0082 |
| 9,823,664 B2* | 11/2017 | Krogh | B64C 39/024 |
| 9,828,090 B2* | 11/2017 | Morris | B64C 29/02 |
| 9,829,886 B2* | 11/2017 | Yang | B64D 47/08 |
| 9,832,910 B2* | 11/2017 | Pal | B64D 41/007 |
| 9,834,305 B2* | 12/2017 | Taylor | B64C 27/26 |
| 9,840,327 B1* | 12/2017 | Frank | B64C 29/00 |
| 9,840,339 B1* | 12/2017 | O'Brien | B64C 39/024 |
| D808,860 S * | 1/2018 | Tian | D12/16.1 |
| 9,863,276 B2* | 1/2018 | Prokup | F01D 25/24 |
| 9,878,787 B2* | 1/2018 | Chan | B60L 53/126 |
| 9,878,800 B2* | 1/2018 | Russ | H02K 7/183 |
| 9,894,158 B2* | 2/2018 | Ranasinghe | G07C 5/02 |
| 9,896,222 B2* | 2/2018 | Kunz | B64F 1/0297 |
| D813,315 S * | 3/2018 | Sweeney | D21/443 |
| 9,908,615 B2* | 3/2018 | Alber | B64C 13/16 |
| 9,908,616 B1* | 3/2018 | Horn | B64C 29/0033 |
| 9,908,618 B2* | 3/2018 | Vaughn | G05D 1/0011 |
| 9,908,619 B1* | 3/2018 | Beckman | B64U 40/20 |
| 9,908,632 B1* | 3/2018 | Kimchi | B64C 1/30 |
| D814,350 S * | 4/2018 | Joo | D12/16.1 |
| D814,971 S * | 4/2018 | Huang | D12/328 |
| D815,580 S * | 4/2018 | Kim | D12/325 |
| 9,932,110 B2* | 4/2018 | McNally | B64C 39/024 |
| 9,944,386 B1* | 4/2018 | Reichert | B64C 27/20 |
| 9,944,387 B2* | 4/2018 | Vander Lind | B64C 27/26 |
| 9,950,791 B2* | 4/2018 | Blomberg | B64C 39/024 |
| D817,251 S * | 5/2018 | Kim | D12/325 |
| D817,252 S * | 5/2018 | Kim | D12/325 |
| 9,957,045 B1* | 5/2018 | Daly | G05D 1/0027 |
| 9,969,493 B2* | 5/2018 | Schlunke | B60V 3/06 |
| 9,970,526 B1* | 5/2018 | Bortoli | F16H 57/038 |
| 9,975,442 B2* | 5/2018 | Lee | F21V 33/00 |
| 9,975,629 B2* | 5/2018 | Horn | B64C 27/467 |
| 9,975,633 B1* | 5/2018 | Johnson | B64C 11/001 |
| 9,975,651 B1* | 5/2018 | Eck | B65G 67/04 |
| 9,977,435 B2* | 5/2018 | Fisher | B60L 53/51 |
| 9,981,744 B2* | 5/2018 | Choo | B64C 27/50 |
| 9,984,672 B2* | 5/2018 | Fong | B64U 20/87 |
| D820,768 S * | 6/2018 | Wang | D12/328 |
| 9,988,159 B2* | 6/2018 | Russ | F02C 7/36 |
| 9,994,305 B1* | 6/2018 | Moldovan | B64C 31/024 |
| 9,994,312 B2* | 6/2018 | Tsunekawa | B64C 29/0033 |
| 9,997,079 B2* | 6/2018 | Paczan | G05D 1/106 |
| 10,011,353 B1* | 7/2018 | Beckman | B64C 39/024 |
| 10,013,886 B2* | 7/2018 | Blomberg | G08G 5/0013 |
| 10,017,237 B2* | 7/2018 | Hutson | B64C 39/024 |
| 10,028,606 B1* | 7/2018 | Ritchie | G07C 9/00912 |
| 10,035,581 B2* | 7/2018 | Wood | B64C 1/30 |
| 10,035,597 B2* | 7/2018 | Desrochers | B64C 39/024 |
| 10,046,853 B2* | 8/2018 | Vander Mey | B64C 27/02 |
| 10,059,436 B1* | 8/2018 | Robertson | B64D 17/80 |
| 10,062,048 B2* | 8/2018 | High | B65D 88/12 |
| 10,062,292 B2* | 8/2018 | Blomberg | B64C 39/024 |
| 10,065,726 B1* | 9/2018 | Phan | B64D 17/80 |
| 10,078,330 B2* | 9/2018 | Bhageria | G05D 1/104 |
| D830,228 S * | 10/2018 | Grassi | D12/16.1 |
| D830,281 S * | 10/2018 | Maqbool | D12/326 |
| D830,897 S * | 10/2018 | Choi | D12/16.1 |
| 10,093,416 B2* | 10/2018 | Alnafisah | B64U 30/20 |
| 10,093,417 B2* | 10/2018 | Meringer | B64U 70/10 |
| 10,093,430 B2* | 10/2018 | Russ | H02K 7/183 |
| 10,095,226 B1* | 10/2018 | Stuckman | G05D 1/0808 |
| 10,099,561 B1* | 10/2018 | Ananthanarayanan | B60L 53/126 |
| 10,099,783 B1* | 10/2018 | Nilson | B64U 20/70 |
| 10,099,785 B1* | 10/2018 | Gonzalez | B64D 7/00 |
| 10,102,757 B2* | 10/2018 | Manley | G08G 5/0091 |
| 10,104,300 B2* | 10/2018 | Guo | H04N 23/63 |
| 10,107,196 B2* | 10/2018 | Devine | F02K 3/077 |
| 10,113,568 B2* | 10/2018 | Bannon | F15B 15/14 |
| 10,118,696 B1* | 11/2018 | Hoffberg | B64C 39/001 |
| 10,118,697 B2* | 11/2018 | Weissenberg | B64C 39/024 |
| 10,144,504 B1* | 12/2018 | Selwa | G05D 1/0858 |
| 10,148,121 B2* | 12/2018 | Ehrmantraut | H02S 20/30 |
| 10,155,507 B2* | 12/2018 | Vescovi | B60V 1/15 |
| 10,246,187 B2* | 4/2019 | Cantrell | B64C 39/024 |
| 10,258,888 B2* | 4/2019 | Pedersen | A63H 27/12 |
| 10,272,999 B2* | 4/2019 | Engbersen | B64C 25/52 |
| 10,274,952 B2* | 4/2019 | Cantrell | G05D 1/0094 |
| 10,293,934 B2* | 5/2019 | Christensen | B64D 5/00 |
| 10,336,202 B2* | 7/2019 | Panopoulos | H05B 47/11 |
| 10,351,231 B2* | 7/2019 | Mercer | B64C 13/341 |
| 10,351,261 B1* | 7/2019 | Bryant | G07F 9/002 |
| 10,358,213 B2* | 7/2019 | Freeman | B64C 1/16 |

(56) References Cited

U.S. PATENT DOCUMENTS

| | | | | |
|---|---|---|---|---|
| 10,399,702 B2* | 9/2019 | McGeer | | B64C 39/024 |
| 10,414,517 B2* | 9/2019 | Wang | | B64C 39/024 |
| 10,423,169 B2* | 9/2019 | Cantrell | | B64D 1/22 |
| 10,423,831 B2* | 9/2019 | De Mers | | G01M 5/0008 |
| D862,361 S * | 10/2019 | Corning | | D12/330 |
| 10,464,668 B2* | 11/2019 | Evulet | | B64D 27/20 |
| 10,486,828 B2* | 11/2019 | Tsai | | B64D 47/08 |
| 10,486,835 B2* | 11/2019 | Crowe | | B64C 39/10 |
| D875,024 S * | 2/2020 | Zheng | | D12/345 |
| 10,556,680 B2* | 2/2020 | Fenny | | B64C 29/02 |
| 10,569,854 B2* | 2/2020 | Yan | | B64C 17/00 |
| 10,647,404 B2* | 5/2020 | Sugaki | | B64U 10/16 |
| 10,669,020 B2* | 6/2020 | Vuong | | B64C 27/10 |
| 10,766,615 B1* | 9/2020 | Quarrie | | B64U 20/10 |
| 10,769,568 B2* | 9/2020 | Lim | | G06Q 50/18 |
| 10,789,467 B1* | 9/2020 | Twede | | G01V 3/12 |
| 10,814,966 B2* | 10/2020 | Rowe | | B64C 27/20 |
| 10,814,979 B2* | 10/2020 | Crowder | | B64U 30/16 |
| 10,822,122 B2* | 11/2020 | Grose | | B64G 5/00 |
| 10,875,658 B2* | 12/2020 | Evulet | | B64U 50/15 |
| 10,880,465 B1* | 12/2020 | Svendsen | | H04N 23/60 |
| 10,896,468 B1* | 1/2021 | Hopkins, III | | G06Q 50/16 |
| 10,996,683 B2* | 5/2021 | O'Flaherty | | G06N 3/045 |
| 11,001,378 B2* | 5/2021 | Evulet | | B64C 3/16 |
| 11,029,352 B2* | 6/2021 | Blanc-Paques | | G08G 5/0069 |
| 11,097,828 B2* | 8/2021 | Rowe | | B64U 20/65 |
| 11,148,801 B2* | 10/2021 | Evulet | | B64C 3/10 |
| 11,174,019 B2* | 11/2021 | Moore | | B64C 15/02 |
| 11,204,508 B2* | 12/2021 | Twede | | H04N 5/33 |
| 11,209,573 B2* | 12/2021 | Fendell | | G01W 1/00 |
| 11,242,144 B2* | 2/2022 | Holtz | | G06V 10/225 |
| 11,267,570 B2* | 3/2022 | Villa | | B64C 27/10 |
| 11,292,591 B2* | 4/2022 | Fisher | | B64C 29/0033 |
| 11,514,799 B2* | 11/2022 | Ladurini | | G08G 5/006 |
| 11,649,047 B2* | 5/2023 | Stukas | | B64C 29/0025 |
| | | | | 244/23 A |
| 11,649,060 B2* | 5/2023 | Wiegman | | B64C 29/0025 |
| | | | | 701/2 |
| 11,673,648 B2* | 6/2023 | Carpenter, Jr. | | B64C 11/001 |
| | | | | 244/54 |
| 11,702,190 B2* | 7/2023 | Shi | | B64C 39/062 |
| | | | | 416/128 |
| 11,709,487 B2* | 7/2023 | Charlton | | B64C 39/024 |
| | | | | 244/189 |
| 11,712,637 B1* | 8/2023 | Hoffberg | | F42B 10/64 |
| | | | | 701/2 |
| 11,721,352 B2* | 8/2023 | Edlin | | G10K 11/346 |
| | | | | 381/92 |
| 11,724,804 B2* | 8/2023 | Mills | | B64C 37/02 |
| | | | | 244/3 |
| 11,738,876 B2* | 8/2023 | Saber | | B64D 27/24 |
| | | | | 310/114 |
| D999,108 S * | 9/2023 | Marcel | | D12/174 |
| 11,753,150 B2* | 9/2023 | Park | | B64U 10/13 |
| | | | | 244/17.11 |
| 11,760,496 B2* | 9/2023 | Marcel | | H02K 21/10 |
| | | | | 310/74 |
| 11,766,623 B1* | 9/2023 | Chen | | A63H 33/18 |
| | | | | 446/46 |
| 11,772,808 B2* | 10/2023 | Fan | | B64D 31/06 |
| | | | | 701/3 |
| 11,780,563 B2* | 10/2023 | Iarocci | | B64C 30/00 |
| | | | | 701/49 |
| 11,787,537 B2* | 10/2023 | Sinha | | B64C 29/0016 |
| | | | | 244/7 A |
| 11,807,356 B2* | 11/2023 | Arsentyev | | B64C 27/20 |
| 11,811,224 B2* | 11/2023 | Hanna | | H02J 1/10 |
| 11,820,505 B2* | 11/2023 | Shurie | | B64D 25/18 |
| 11,820,507 B2* | 11/2023 | Raptopoulos | | B64F 1/32 |
| 11,827,344 B2* | 11/2023 | Truong | | B64D 27/24 |
| 11,840,325 B2* | 12/2023 | Zapata | | B64D 27/026 |
| 11,845,188 B2* | 12/2023 | Kim | | B25J 13/086 |
| 11,851,178 B2* | 12/2023 | Beck | | B64D 27/08 |
| 11,883,345 B2* | 1/2024 | Marcel | | A61H 3/00 |
| 11,906,657 B2* | 2/2024 | Preece | | G01S 13/86 |
| 11,923,954 B1* | 3/2024 | Nagelberg | | H04N 7/185 |
| 11,926,413 B2* | 3/2024 | Tian | | B64C 25/06 |
| 11,939,057 B2* | 3/2024 | Hamm | | B64U 50/38 |
| 11,939,080 B2* | 3/2024 | Cowden | | B64U 80/30 |
| 11,945,610 B2* | 4/2024 | Perlo | | B64D 27/353 |
| 11,948,703 B2* | 4/2024 | Getman | | A61H 23/02 |
| 11,952,119 B2* | 4/2024 | Beiro | | B64U 60/00 |
| 2002/0030494 A1* | 3/2002 | Araki | | G01R 31/392 |
| | | | | 324/427 |
| 2002/0060267 A1* | 5/2002 | Yavnai | | G05D 1/0038 |
| | | | | 180/7.4 |
| 2002/0100835 A1* | 8/2002 | Kusic | | B64C 27/28 |
| | | | | 244/17.23 |
| 2002/0100838 A1* | 8/2002 | McGeer | | B64C 39/024 |
| | | | | 244/116 |
| 2002/0104919 A1* | 8/2002 | Geranio | | B64C 27/20 |
| | | | | 244/2 |
| 2002/0104921 A1* | 8/2002 | Louvel | | A63H 27/12 |
| | | | | 244/12.1 |
| 2002/0104922 A1* | 8/2002 | Nakamura | | B64U 30/20 |
| | | | | 244/17.25 |
| 2002/0104923 A1* | 8/2002 | Warsop | | B64C 39/062 |
| | | | | 244/34 A |
| 2002/0106966 A1* | 8/2002 | Jimenez | | A63H 27/004 |
| | | | | 446/454 |
| 2002/0109044 A1* | 8/2002 | Rock | | B64C 27/10 |
| | | | | 244/17.23 |
| 2002/0139894 A1* | 10/2002 | Sorensen | | B64C 39/066 |
| | | | | 244/2 |
| 2002/0142699 A1* | 10/2002 | Davis | | A63H 27/12 |
| | | | | 446/37 |
| 2002/0149257 A1* | 10/2002 | Miansian | | B60B 1/0261 |
| | | | | 301/74 |
| 2002/0163251 A1* | 11/2002 | Crombez | | B60K 6/46 |
| | | | | 903/947 |
| 2002/0190948 A1* | 12/2002 | Coutant | | G05G 23/02 |
| | | | | 345/161 |
| 2003/0050732 A1* | 3/2003 | Rivalto | | G07C 9/00912 |
| | | | | 700/237 |
| 2003/0066932 A1* | 4/2003 | Carroll | | B64U 10/80 |
| | | | | 244/120 |
| 2003/0085319 A1* | 5/2003 | Wagner | | B64C 29/0025 |
| | | | | 244/12.3 |
| 2003/0136873 A1* | 7/2003 | Churchman | | B64C 29/0025 |
| | | | | 244/10 |
| 2003/0212478 A1* | 11/2003 | Rios | | G05D 1/0094 |
| | | | | 701/13 |
| 2003/0218093 A1* | 11/2003 | Millea | | B64C 27/20 |
| | | | | 244/60 |
| 2003/0229428 A1* | 12/2003 | Seifert | | B64U 50/10 |
| | | | | 244/175 |
| 2003/0230928 A1* | 12/2003 | Schroepfer | | B60B 21/064 |
| | | | | 301/59 |
| 2004/0003985 A1* | 1/2004 | Nishimoto | | G05G 9/04792 |
| | | | | 200/6 A |
| 2004/0007644 A1* | 1/2004 | Phelps, III | | B64C 27/10 |
| | | | | 244/17.11 |
| 2004/0035347 A1* | 2/2004 | Grober | | B63B 29/12 |
| | | | | 114/191 |
| 2004/0059497 A1* | 3/2004 | Sankrithi | | G08G 5/0021 |
| | | | | 701/120 |
| 2004/0094662 A1* | 5/2004 | Sanders, Jr. | | B64C 27/20 |
| | | | | 244/12.5 |
| 2004/0129827 A1* | 7/2004 | Perlo | | B64C 29/02 |
| | | | | 244/7 B |
| 2004/0129833 A1* | 7/2004 | Perlo | | B64C 39/028 |
| | | | | 244/70 |
| 2004/0144890 A1* | 7/2004 | Mao | | B64C 29/0025 |
| | | | | 244/12.5 |
| 2004/0183917 A1* | 9/2004 | von Flotow | | H04N 23/682 |
| | | | | 348/208.99 |
| 2004/0195438 A1* | 10/2004 | Chamberlain | | A63H 30/04 |
| | | | | 244/65 |
| 2004/0200924 A1* | 10/2004 | Clark, Jr. | | A63H 27/12 |
| | | | | 244/7 B |

(56) References Cited

U.S. PATENT DOCUMENTS

| | | | | |
|---|---|---|---|---|
| 2004/0207727 A1* | 10/2004 | von Flotow | G01C 11/025 | 348/143 |
| 2004/0245374 A1* | 12/2004 | Morgan | B64C 29/0025 | 244/12.3 |
| 2004/0249519 A1* | 12/2004 | Frink | B64D 45/0059 | 701/9 |
| 2004/0256519 A1* | 12/2004 | Ellis | B64C 39/024 | 244/110 E |
| 2005/0040283 A1* | 2/2005 | Frazer | B63G 8/00 | 244/12.3 |
| 2005/0051667 A1* | 3/2005 | Arlton | B64U 70/83 | 244/17.11 |
| 2005/0061910 A1* | 3/2005 | Wobben | B64C 29/00 | 244/17.23 |
| 2005/0082421 A1* | 4/2005 | Perlo | B64C 39/028 | 244/12.2 |
| 2005/0092730 A1* | 5/2005 | Nothum | A23L 3/361 | 219/388 |
| 2005/0093507 A1* | 5/2005 | Sliwa | B64C 11/003 | 320/101 |
| 2005/0127238 A1* | 6/2005 | Ballew | B64C 27/28 | 244/10 |
| 2005/0151009 A1* | 7/2005 | Roeseler | B64C 39/024 | 244/63 |
| 2005/0162389 A1* | 7/2005 | Obermeyer | G06F 3/0338 | 345/161 |
| 2005/0178879 A1* | 8/2005 | Mao | B64C 29/02 | 244/7 B |
| 2005/0178882 A1* | 8/2005 | Akaro | B64C 39/006 | 244/17.11 |
| 2005/0178894 A1* | 8/2005 | McGeer | B64F 1/04 | 244/63 |
| 2005/0178895 A1* | 8/2005 | McGeer | B64F 1/06 | 244/63 |
| 2005/0189450 A1* | 9/2005 | Roeseler | B64C 39/024 | 244/63 |
| 2005/0230520 A1* | 10/2005 | Kusic | B64C 27/52 | 244/12.4 |
| 2005/0280412 A1* | 12/2005 | Roeseler | G01B 7/14 | 324/228 |
| 2005/0281075 A1* | 12/2005 | Chen | B82Y 10/00 | |
| 2006/0011780 A1* | 1/2006 | Brand | B64D 27/14 | 244/55 |
| 2006/0032972 A1* | 2/2006 | Vavra | B64C 27/20 | 244/12.2 |
| 2006/0049304 A1* | 3/2006 | Sanders | B64C 39/024 | 244/23 A |
| 2006/0054737 A1* | 3/2006 | Richardson | B64C 27/18 | 244/17.11 |
| 2006/0097111 A1* | 5/2006 | Wood | B64D 15/02 | 244/134 C |
| 2006/0102783 A1* | 5/2006 | Dennis | B64U 30/14 | 244/110 F |
| 2006/0123594 A1* | 6/2006 | You | A45B 19/10 | 16/326 |
| 2006/0137931 A1* | 6/2006 | Berg | B62D 1/22 | 180/333 |
| 2006/0138777 A1* | 6/2006 | Hofbauer | B64U 30/26 | 290/1 R |
| 2006/0144994 A1* | 7/2006 | Spirov | B64C 39/001 | 244/62 |
| 2006/0151666 A1* | 7/2006 | VanderMey | B64C 29/0016 | 244/12.3 |
| 2006/0151667 A1* | 7/2006 | Dennis | B64C 39/024 | 244/63 |
| 2006/0169042 A1* | 8/2006 | Hulsing | G01C 19/5719 | 73/510 |
| 2006/0175429 A1* | 8/2006 | Lanigan | B64D 1/16 | 169/53 |
| 2006/0192046 A1* | 8/2006 | Heath | B64C 15/14 | 244/12.3 |
| 2006/0192047 A1* | 8/2006 | Goossen | B64C 29/0016 | 244/17.23 |
| 2006/0226281 A1* | 10/2006 | Walton | B64C 27/20 | 244/17.23 |
| 2006/0231675 A1* | 10/2006 | Bostan | B64C 3/385 | 244/12.1 |
| 2006/0231677 A1* | 10/2006 | Zimet | B64U 30/24 | 244/17.23 |
| 2006/0257261 A1* | 11/2006 | Zientek | B64C 27/467 | 416/231 B |
| 2006/0263223 A1* | 11/2006 | Gustafson | F04D 29/384 | 416/236 R |
| 2006/0266879 A1* | 11/2006 | Svoboda | B64C 39/08 | 244/7 A |
| 2006/0266881 A1* | 11/2006 | Hughey | B64C 27/08 | 244/17.23 |
| 2006/0284003 A1* | 12/2006 | Chu | B64B 1/22 | 244/58 |
| 2007/0018033 A1* | 1/2007 | Fanucci | F42B 15/22 | 244/49 |
| 2007/0023581 A1* | 2/2007 | La | B64C 39/024 | 244/165 |
| 2007/0023582 A1* | 2/2007 | Steele | B64U 20/00 | 244/190 |
| 2007/0025809 A1* | 2/2007 | Lee | B64F 1/06 | 403/119 |
| 2007/0051848 A1* | 3/2007 | Mantych | B64C 39/028 | 244/100 R |
| 2007/0057113 A1* | 3/2007 | Parks | B64C 29/0041 | 244/12.5 |
| 2007/0068965 A1* | 3/2007 | Von Flotow | B65D 75/5805 | 383/905 |
| 2007/0089918 A1* | 4/2007 | Gonzalez | H02N 3/00 | 180/65.1 |
| 2007/0105475 A1* | 5/2007 | Gotou | A63H 27/12 | 446/37 |
| 2007/0152497 A1* | 7/2007 | Lin | B60B 1/0223 | 301/55 |
| 2007/0158494 A1* | 7/2007 | Burrage | B64C 39/04 | 244/7 R |
| 2007/0169616 A1* | 7/2007 | Vickroy | F41H 11/02 | 89/1.11 |
| 2007/0181742 A1* | 8/2007 | Van de Rostyne | A63H 27/12 | 244/17.23 |
| 2007/0200032 A1* | 8/2007 | Eadie | B66C 13/063 | 244/137.4 |
| 2007/0215750 A1* | 9/2007 | Shantz | A63H 27/12 | 244/17.23 |
| 2007/0261542 A1* | 11/2007 | Chang | F41H 11/02 | 89/1.11 |
| 2007/0262195 A1* | 11/2007 | Bulaga | B64C 27/20 | 244/12.4 |
| 2007/0271032 A1* | 11/2007 | Cheng | G01S 5/0294 | 701/2 |
| 2008/0033684 A1* | 2/2008 | Vian | F41G 7/303 | 701/1 |
| 2008/0048065 A1* | 2/2008 | Kuntz | A63H 33/003 | 244/17.23 |
| 2008/0054121 A1* | 3/2008 | Yoeli | B64C 27/08 | 244/12.1 |
| 2008/0086247 A1* | 4/2008 | Gu | H02J 7/1415 | 307/10.7 |
| 2008/0156932 A1* | 7/2008 | McGeer | B64C 39/024 | 244/110 F |
| 2008/0191544 A1* | 8/2008 | Schlanger | B60B 21/062 | 301/59 |
| 2008/0210809 A1* | 9/2008 | Arlton | H01M 10/48 | 244/17.11 |
| 2008/0245924 A1* | 10/2008 | Arlton | B64U 30/21 | 244/17.23 |
| 2008/0278448 A1* | 11/2008 | Nilsagard | G05G 9/053 | 345/161 |
| 2009/0000698 A1* | 1/2009 | Beresford | A01G 23/08 | 144/34.1 |
| 2009/0008499 A1* | 1/2009 | Shaw | B64C 27/52 | 244/17.23 |

(56) References Cited

U.S. PATENT DOCUMENTS

| | | | | |
|---|---|---|---|---|
| 2009/0050750 A1* | 2/2009 | Goossen | B64D 1/22 | 901/14 |
| 2009/0058202 A1* | 3/2009 | Jeung | H02K 1/30 | 310/156.28 |
| 2009/0076665 A1* | 3/2009 | Hoisington | G05D 1/0044 | 701/2 |
| 2009/0102413 A1* | 4/2009 | Hanlon | B64C 27/08 | 318/738 |
| 2009/0127984 A1* | 5/2009 | Lee | H02K 1/2791 | 310/67 R |
| 2009/0146010 A1* | 6/2009 | Cohen | B64D 1/22 | 701/3 |
| 2009/0196587 A1* | 8/2009 | Cheung | A61L 9/037 | 392/394 |
| 2009/0201380 A1* | 8/2009 | Peaslee | H04N 19/51 | 348/208.4 |
| 2009/0216392 A1* | 8/2009 | Piasecki | B64C 15/12 | 244/17.19 |
| 2009/0216394 A1* | 8/2009 | Heppe | B64U 10/25 | 701/16 |
| 2009/0224095 A1* | 9/2009 | Cox | B64C 39/024 | 244/17.23 |
| 2009/0224097 A1* | 9/2009 | Kariv | B64F 1/029 | 244/110 F |
| 2009/0227415 A1* | 9/2009 | Buelna | F16H 1/227 | 475/346 |
| 2009/0230235 A1* | 9/2009 | McNulty | B64C 27/12 | 244/17.23 |
| 2009/0236470 A1* | 9/2009 | Goossen | B64C 39/024 | 244/115 |
| 2009/0242690 A1* | 10/2009 | Sammy | B64C 29/0025 | 244/12.5 |
| 2009/0250549 A1* | 10/2009 | Wiggerich | B64U 30/24 | 244/17.11 |
| 2009/0283629 A1* | 11/2009 | Kroetsch | B64U 30/26 | 244/17.23 |
| 2009/0284644 A1* | 11/2009 | McKaughan | H04N 23/90 | 348/E5.045 |
| 2009/0294584 A1* | 12/2009 | Lovell | B64C 39/024 | 901/30 |
| 2009/0299551 A1* | 12/2009 | So | B64C 19/00 | 701/3 |
| 2009/0306840 A1* | 12/2009 | Blenkhorn | G05D 1/0676 | 701/16 |
| 2010/0012769 A1* | 1/2010 | Alber | B64C 39/024 | 244/17.23 |
| 2010/0014981 A1* | 1/2010 | McGeer | B64C 27/473 | 416/240 |
| 2010/0019098 A1* | 1/2010 | Collette | B64C 39/024 | 244/23 A |
| 2010/0025528 A1* | 2/2010 | Jackson | B64C 39/024 | 244/110 F |
| 2010/0032947 A1* | 2/2010 | Bevirt | F03D 1/065 | 290/55 |
| 2010/0044499 A1* | 2/2010 | Dragan | B64U 10/16 | 244/17.23 |
| 2010/0051740 A1* | 3/2010 | Yoeli | B64C 27/20 | 244/17.23 |
| 2010/0051741 A1* | 3/2010 | Ismailov | B64U 70/50 | 244/54 |
| 2010/0096493 A1* | 4/2010 | Khakimov | A62B 5/00 | 244/25 |
| 2010/0108801 A1* | 5/2010 | Olm | B64C 39/024 | 244/17.23 |
| 2010/0120273 A1* | 5/2010 | Lucero | H05K 1/02 | 439/79 |
| 2010/0140415 A1* | 6/2010 | Goossen | B64U 30/26 | 29/889.7 |
| 2010/0140416 A1* | 6/2010 | Ohanian, III | B64U 30/26 | 244/23 A |
| 2010/0166547 A1* | 7/2010 | Presz, Jr | F03D 1/04 | 415/200 |
| 2010/0181424 A1* | 7/2010 | Goossen | F41H 13/0006 | 244/110 F |
| 2010/0192764 A1* | 8/2010 | Ries | F02B 75/287 | 91/535 |
| 2010/0193626 A1* | 8/2010 | Goossen | B64C 37/00 | 244/2 |
| 2010/0224723 A1* | 9/2010 | Apkarian | B64U 30/24 | 244/65 |
| 2010/0237183 A1* | 9/2010 | Wilson | B64C 39/024 | 244/3 |
| 2010/0243794 A1* | 9/2010 | Jermyn | B64U 30/29 | 340/975 |
| 2010/0250022 A1* | 9/2010 | Hines | G05D 1/0094 | 701/2 |
| 2010/0276549 A1* | 11/2010 | Karem | B64C 29/0033 | 244/7 C |
| 2010/0283253 A1* | 11/2010 | Bevirt | F03D 9/32 | 290/55 |
| 2010/0301168 A1* | 12/2010 | Raposo | B64C 27/20 | 244/171.2 |
| 2010/0308174 A1* | 12/2010 | Calverley | B64U 10/60 | 244/155 A |
| 2010/0308180 A1* | 12/2010 | Helou, Jr. | B64C 1/22 | 244/113 |
| 2010/0320314 A1* | 12/2010 | Balaskovic | B64B 1/00 | 244/96 |
| 2010/0327123 A1* | 12/2010 | Smith | B64C 29/0033 | 244/7 C |
| 2011/0001016 A1* | 1/2011 | Skillen | B64C 39/024 | 244/218 |
| 2011/0001020 A1* | 1/2011 | Forgac | B64C 29/0033 | 244/7 A |
| 2011/0017865 A1* | 1/2011 | Achtelik | B64D 47/08 | 244/17.23 |
| 2011/0020110 A1* | 1/2011 | Presz, Jr. | F03D 1/04 | 415/121.3 |
| 2011/0024553 A1* | 2/2011 | Choi | B64U 30/21 | 244/17.11 |
| 2011/0024559 A1* | 2/2011 | McGeer | B64C 39/024 | 244/110 F |
| 2011/0031355 A1* | 2/2011 | Alvarez | B64C 29/0025 | 244/6 |
| 2011/0042508 A1* | 2/2011 | Bevirt | B64C 15/00 | 244/75.1 |
| 2011/0056183 A1* | 3/2011 | Sankrithi | B64D 27/12 | 60/226.1 |
| 2011/0068224 A1* | 3/2011 | Kang | B64U 80/25 | 244/116 |
| 2011/0084162 A1* | 4/2011 | Goossen | B64D 1/22 | 244/135 C |
| 2011/0101155 A1* | 5/2011 | Smith | B64C 39/064 | 244/12.1 |
| 2011/0127775 A1* | 6/2011 | Bevirt | B64C 39/022 | 290/55 |
| 2011/0137498 A1* | 6/2011 | Suzuki | B64U 20/80 | 701/4 |
| 2011/0163198 A1* | 7/2011 | Leaver | B64C 31/032 | 244/12.1 |
| 2011/0174920 A1* | 7/2011 | Yoeli | B64C 27/20 | 244/75.1 |
| 2011/0174925 A1* | 7/2011 | Ying | B64F 1/005 | 701/16 |
| 2011/0202206 A1* | 8/2011 | Karthikeyan | G01C 23/00 | 701/3 |
| 2011/0203812 A1* | 8/2011 | Doten | A62C 5/033 | 169/44 |
| 2011/0215585 A1* | 9/2011 | Caires | F03D 1/0675 | 416/241 A |
| 2011/0221692 A1* | 9/2011 | Seydoux | A63H 30/04 | 345/173 |
| 2011/0226174 A1* | 9/2011 | Parks | B64U 10/70 | 114/313 |
| 2011/0226892 A1* | 9/2011 | Crowther | B64C 15/02 | 244/17.23 |
| 2011/0240794 A1* | 10/2011 | Hariri | B64B 1/30 | 244/30 |

(56) References Cited

U.S. PATENT DOCUMENTS

| | | | |
|---|---|---|---|
| 2011/0264311 A1* | 10/2011 | Lee | H04N 7/183 348/E7.085 |
| 2011/0284684 A1* | 11/2011 | Amraly | B64D 35/04 244/12.4 |
| 2011/0285145 A1* | 11/2011 | Gonzalez | F03G 7/10 74/DIG. 9 |
| 2011/0315806 A1* | 12/2011 | Piasecki | B64C 39/02 244/17.11 |
| 2012/0012692 A1* | 1/2012 | Kroo | B64C 29/0025 244/6 |
| 2012/0018571 A1* | 1/2012 | Goelet | B64B 1/22 244/30 |
| 2012/0035788 A1* | 2/2012 | Trepagnier | B60W 30/095 701/25 |
| 2012/0056041 A1* | 3/2012 | Rhee | B64U 20/83 244/4 R |
| 2012/0083945 A1* | 4/2012 | Oakley | B64U 20/96 701/2 |
| 2012/0091258 A1* | 4/2012 | Keidar | B64C 39/024 244/17.11 |
| 2012/0091259 A1* | 4/2012 | Morris | B64C 27/02 244/17.11 |
| 2012/0097801 A1* | 4/2012 | Barrett | B64C 27/24 244/17.11 |
| 2012/0099983 A1* | 4/2012 | Medlock | B64U 30/26 415/208.1 |
| 2012/0152654 A1* | 6/2012 | Marcus | B64U 30/26 182/129 |
| 2012/0153087 A1* | 6/2012 | Collette | B64C 27/20 244/135 R |
| 2012/0155714 A1* | 6/2012 | Douglass | G06V 10/143 382/110 |
| 2012/0158215 A1* | 6/2012 | Sun | B64C 37/02 701/1 |
| 2012/0160962 A1* | 6/2012 | Holvoet | H02G 3/32 244/131 |
| 2012/0177497 A1* | 7/2012 | Huang | A63H 27/02 416/204 R |
| 2012/0187243 A1* | 7/2012 | Goldie | B64C 39/024 244/110 E |
| 2012/0199129 A1* | 8/2012 | Kenyon | F04D 29/441 128/205.25 |
| 2012/0200703 A1* | 8/2012 | Nadir | H04N 25/443 348/E7.085 |
| 2012/0223182 A1* | 9/2012 | Gilchrist, III | B64F 1/0297 244/110 F |
| 2012/0226394 A1* | 9/2012 | Marcus | A62B 5/00 701/2 |
| 2012/0231696 A1* | 9/2012 | Xu | A63H 27/12 446/37 |
| 2012/0234969 A1* | 9/2012 | Savoye | B64C 39/024 244/17.11 |
| 2012/0237083 A1* | 9/2012 | Lange | G06F 16/29 382/103 |
| 2012/0237341 A1* | 9/2012 | Simon | B64C 3/14 415/211.2 |
| 2012/0241553 A1* | 9/2012 | Wilke | B64C 27/08 244/17.23 |
| 2012/0241555 A1* | 9/2012 | Savoye | A63H 27/12 244/54 |
| 2012/0248259 A1* | 10/2012 | Page | B64C 39/024 244/7 B |
| 2012/0261523 A1* | 10/2012 | Shaw | B64C 29/0033 244/7 R |
| 2012/0267472 A1* | 10/2012 | Pratzovnick | H04K 3/825 244/119 |
| 2012/0271461 A1* | 10/2012 | Spata | G01W 1/08 706/45 |
| 2012/0273608 A1* | 11/2012 | Jess | B64B 1/34 244/26 |
| 2012/0277934 A1* | 11/2012 | Ohtomo | G05D 1/0676 701/15 |
| 2012/0280080 A1* | 11/2012 | Lubenow | B64C 39/024 244/49 |
| 2012/0280091 A1* | 11/2012 | Saiz | B64C 27/30 244/6 |
| 2012/0294719 A1* | 11/2012 | Payne | B64C 29/0025 416/170 R |
| 2012/0298790 A1* | 11/2012 | Bitar | B64C 39/026 244/17.11 |
| 2012/0298793 A1* | 11/2012 | Weddendorf | F03D 9/32 244/17.23 |
| 2012/0298796 A1* | 11/2012 | Carreker | B64G 1/22 244/100 R |
| 2012/0300070 A1* | 11/2012 | Ohtomo | G03B 15/006 348/E7.085 |
| 2012/0329593 A1* | 12/2012 | Larrabee | F16H 3/72 903/910 |
| 2013/0020429 A1* | 1/2013 | Kroo | B64C 3/16 244/6 |
| 2013/0068876 A1* | 3/2013 | Radu | B60F 5/02 244/2 |
| 2013/0068892 A1* | 3/2013 | Bin Desa | B64U 30/29 701/4 |
| 2013/0092799 A1* | 4/2013 | Tian | B64D 27/24 244/7 R |
| 2013/0105635 A1* | 5/2013 | Alzu'bi | B64U 30/297 244/23 A |
| 2013/0110325 A1* | 5/2013 | Sapp, II | G05D 1/0088 701/3 |
| 2013/0134254 A1* | 5/2013 | Moore | B64C 39/022 244/17.11 |
| 2013/0145404 A1* | 6/2013 | Ohayon | H04L 47/25 725/62 |
| 2013/0146716 A1* | 6/2013 | Gettinger | B64C 5/12 244/49 |
| 2013/0162008 A1* | 6/2013 | Li | B60B 1/046 301/58 |
| 2013/0190697 A1* | 7/2013 | Raab | A61M 5/31551 604/218 |
| 2013/0200207 A1* | 8/2013 | Pongratz | B64U 10/25 244/2 |
| 2013/0206915 A1* | 8/2013 | Desaulniers | B64U 10/20 244/165 |
| 2013/0214088 A1* | 8/2013 | Shachor | B64C 39/024 244/17.17 |
| 2013/0217439 A1* | 8/2013 | Ulman | G06T 7/0012 455/556.1 |
| 2013/0231208 A1* | 9/2013 | Buono | B64C 27/12 475/5 |
| 2013/0233964 A1* | 9/2013 | Woodworth | B64D 17/80 244/175 |
| 2013/0248656 A1* | 9/2013 | Mohamadi | H04W 72/046 244/190 |
| 2013/0251525 A1* | 9/2013 | Saiz | B64C 29/0083 416/23 |
| 2013/0256464 A1* | 10/2013 | Belik | B64D 9/00 244/4 R |
| 2013/0264412 A1* | 10/2013 | Dyrla | B64C 27/82 244/17.13 |
| 2013/0270394 A1* | 10/2013 | Downs | G05D 1/0027 283/67 |
| 2013/0277074 A1* | 10/2013 | Corujo Pardo | A62C 3/0242 169/53 |
| 2013/0287577 A1* | 10/2013 | Lin | B64U 20/40 416/210 R |
| 2013/0297102 A1* | 11/2013 | Hughes | G05D 1/0083 701/3 |
| 2013/0327890 A1* | 12/2013 | Lyons | B64C 25/56 244/107 |
| 2014/0008485 A1* | 1/2014 | Lundgren | B64U 20/50 244/17.23 |
| 2014/0012732 A1* | 1/2014 | Lindores | A01B 79/005 705/37 |
| 2014/0018976 A1* | 1/2014 | Goossen | G07C 5/008 701/2 |
| 2014/0023773 A1* | 1/2014 | Sadakane | C11B 7/0075 426/660 |

(56) References Cited

U.S. PATENT DOCUMENTS

| | | | | |
|---|---|---|---|---|
| 2014/0025229 | A1* | 1/2014 | Levien | G06Q 10/08 701/2 |
| 2014/0025234 | A1* | 1/2014 | Levien | G16H 40/67 701/3 |
| 2014/0032034 | A1* | 1/2014 | Raptopoulos | G05D 1/0088 701/25 |
| 2014/0034775 | A1* | 2/2014 | Hutson | F16M 13/02 244/17.23 |
| 2014/0034776 | A1* | 2/2014 | Hutson | F16M 11/18 244/17.17 |
| 2014/0037278 | A1* | 2/2014 | Wang | H04N 23/685 396/55 |
| 2014/0039733 | A1* | 2/2014 | Ren | B64D 45/00 701/14 |
| 2014/0055613 | A1* | 2/2014 | Ohtomo | G01C 11/06 348/144 |
| 2014/0061362 | A1* | 3/2014 | Olm | B64U 30/293 244/2 |
| 2014/0061376 | A1* | 3/2014 | Fisher | B64U 10/14 244/62 |
| 2014/0061392 | A1* | 3/2014 | Karem | B64C 11/26 244/7 R |
| 2014/0062754 | A1* | 3/2014 | Mohamadi | B64C 19/00 89/1.13 |
| 2014/0069666 | A1* | 3/2014 | Vetesnik | A62C 3/0235 169/53 |
| 2014/0099853 | A1* | 4/2014 | Condon | A63F 13/235 446/37 |
| 2014/0103158 | A1* | 4/2014 | Berry | B64C 29/0025 244/12.1 |
| 2014/0111332 | A1* | 4/2014 | Przybylko | G06Q 10/00 340/573.6 |
| 2014/0117149 | A1* | 5/2014 | Zhou | B64C 39/024 244/17.23 |
| 2014/0124621 | A1* | 5/2014 | Godzdanker | B64F 1/28 244/110 E |
| 2014/0129056 | A1* | 5/2014 | Criado | B64C 31/024 701/4 |
| 2014/0131507 | A1* | 5/2014 | Kalantari | B64C 39/028 244/2 |
| 2014/0131510 | A1* | 5/2014 | Wang | B64C 27/08 244/17.23 |
| 2014/0138476 | A1* | 5/2014 | Bystrom | B64C 29/0033 244/17.13 |
| 2014/0138477 | A1* | 5/2014 | Keennon | G05D 1/0038 244/17.23 |
| 2014/0151494 | A1* | 6/2014 | Cvrlje | B64C 27/20 244/6 |
| 2014/0151502 | A1* | 6/2014 | Kosheleff | B64F 1/007 244/114 R |
| 2014/0158816 | A1* | 6/2014 | DeLorean | B64C 39/12 244/12.4 |
| 2014/0175214 | A1* | 6/2014 | Lundgren | B64D 47/08 244/17.23 |
| 2014/0217230 | A1* | 8/2014 | Helou, Jr. | B64U 30/24 244/17.17 |
| 2014/0218239 | A1* | 8/2014 | Sharawi | G05D 1/0094 342/422 |
| 2014/0222246 | A1* | 8/2014 | Mohamadi | G01S 13/0209 701/2 |
| 2014/0231582 | A1* | 8/2014 | Headrick | B64C 27/08 244/54 |
| 2014/0240498 | A1* | 8/2014 | Ohtomo | G05D 1/0094 348/144 |
| 2014/0246213 | A1* | 9/2014 | Karagounis | A62C 99/0072 169/53 |
| 2014/0246545 | A1* | 9/2014 | Markov | B05C 19/04 244/190 |
| 2014/0254896 | A1* | 9/2014 | Zhou | G07F 17/13 705/16 |
| 2014/0263823 | A1* | 9/2014 | Wang | B64D 47/08 244/17.23 |
| 2014/0299708 | A1* | 10/2014 | Green | B64C 27/32 244/17.11 |
| 2014/0303814 | A1* | 10/2014 | Burema | B64U 50/39 901/1 |
| 2014/0316243 | A1* | 10/2014 | Niedermeyer | G06Q 10/083 600/407 |
| 2014/0316608 | A1* | 10/2014 | Alber | B64U 10/60 701/2 |
| 2014/0316616 | A1* | 10/2014 | Kugelmass | G06T 11/206 701/8 |
| 2014/0319266 | A1* | 10/2014 | Moschetta | B64C 39/028 244/13 |
| 2014/0319272 | A1* | 10/2014 | Casado | B64U 80/25 244/110 E |
| 2014/0339355 | A1* | 11/2014 | Olm | B64U 30/291 244/17.23 |
| 2014/0339371 | A1* | 11/2014 | Yates | B64D 27/24 244/53 R |
| 2014/0343752 | A1* | 11/2014 | Fisher | G05D 1/0676 701/2 |
| 2014/0353422 | A1* | 12/2014 | Westbrook, Sr. | B64D 7/00 244/17.21 |
| 2014/0356174 | A1* | 12/2014 | Wang | B64C 11/04 416/204 R |
| 2014/0374532 | A1* | 12/2014 | Duffy | B64C 37/02 244/2 |
| 2015/0006005 | A1* | 1/2015 | Yu | G06Q 10/08 701/22 |
| 2015/0012154 | A1* | 1/2015 | Senkel | B64D 17/80 701/4 |
| 2015/0020558 | A1* | 1/2015 | Williams | E05B 73/0011 70/18 |
| 2015/0041598 | A1* | 2/2015 | Nugent | H02J 7/0042 244/53 R |
| 2015/0057844 | A1* | 2/2015 | Callou | B64C 39/024 701/3 |
| 2015/0069968 | A1* | 3/2015 | Pounds | B60L 53/35 320/109 |
| 2015/0097079 | A1* | 4/2015 | Frolov | F03D 9/25 290/55 |
| 2015/0097950 | A1* | 4/2015 | Wang | H04N 23/54 348/208.11 |
| 2015/0120094 | A1* | 4/2015 | Kimchi | G06Q 10/083 701/3 |
| 2015/0120126 | A1* | 4/2015 | So | B64C 39/024 701/26 |
| 2015/0129716 | A1* | 5/2015 | Yoffe | B64F 1/029 244/110 C |
| 2015/0137523 | A1* | 5/2015 | Sia | B64U 50/12 290/55 |
| 2015/0158599 | A1* | 6/2015 | Sisko | B64F 1/20 244/114 R |
| 2015/0160658 | A1* | 6/2015 | Reedman | B64C 19/00 701/3 |
| 2015/0175258 | A1* | 6/2015 | Lee | B64C 27/473 244/17.23 |
| 2015/0175276 | A1* | 6/2015 | Koster | B64C 39/024 244/114 R |
| 2015/0179219 | A1* | 6/2015 | Gao | G06V 10/24 386/278 |
| 2015/0181819 | A1* | 7/2015 | Celebi | B64U 10/14 701/2 |
| 2015/0183528 | A1* | 7/2015 | Walsh | A47G 29/141 244/114 R |
| 2015/0184637 | A1* | 7/2015 | Vander Lind | B64C 39/022 290/44 |
| 2015/0205301 | A1* | 7/2015 | Gilmore | G05D 1/0094 701/11 |
| 2015/0225071 | A1* | 8/2015 | Tighe | B64C 29/02 244/12.4 |
| 2015/0254988 | A1* | 9/2015 | Wang | B64C 39/024 701/3 |
| 2015/0259066 | A1* | 9/2015 | Johannesson | B64C 1/30 244/17.27 |
| 2015/0266570 | A1* | 9/2015 | Metreveli | B64C 27/20 244/17.23 |

(56) References Cited

U.S. PATENT DOCUMENTS

| | | | |
|---|---|---|---|
| 2015/0274286 A1* | 10/2015 | Kereth | B64C 39/024 244/17.21 |
| 2015/0286216 A1* | 10/2015 | Miwa | G05D 1/0808 701/4 |
| 2015/0314864 A1* | 11/2015 | Cserfoi | B64U 30/20 416/129 |
| 2015/0314871 A1* | 11/2015 | von Flotow | B64C 39/024 244/137.4 |
| 2015/0321755 A1* | 11/2015 | Martin | B64C 27/08 244/17.23 |
| 2015/0321759 A1* | 11/2015 | Caubel | A63H 27/12 244/17.23 |
| 2015/0323930 A1* | 11/2015 | Downey | G08G 5/0056 701/14 |
| 2015/0331427 A1* | 11/2015 | Chaudary | B64U 10/14 701/4 |
| 2015/0332206 A1* | 11/2015 | Trew | G06Q 10/0836 705/330 |
| 2015/0344136 A1* | 12/2015 | Dahlstrom | G05D 1/0866 239/722 |
| 2015/0353192 A1* | 12/2015 | Morrison | B64D 27/24 244/17.23 |
| 2015/0360797 A1* | 12/2015 | Melish | B64F 1/02 244/110 C |
| 2015/0377405 A1* | 12/2015 | Down | B64C 39/024 244/76 R |
| 2016/0000003 A1* | 1/2016 | Wendte | A01M 7/006 239/159 |
| 2016/0001875 A1* | 1/2016 | Daler | B64C 17/00 244/17.11 |
| 2016/0001878 A1* | 1/2016 | Lee | B64C 3/38 244/7 A |
| 2016/0001879 A1* | 1/2016 | Johannesson | B64C 39/024 416/142 |
| 2016/0001883 A1* | 1/2016 | Sanz | H02J 7/0044 244/17.23 |
| 2016/0011592 A1* | 1/2016 | Zhang | B64C 39/024 244/114 R |
| 2016/0016652 A1* | 1/2016 | Barrett | B64C 25/06 244/15 |
| 2016/0023755 A1* | 1/2016 | Elshafei | B64C 39/024 244/17.23 |
| 2016/0023760 A1* | 1/2016 | Goodrich | B64C 11/48 244/76 R |
| 2016/0023773 A1* | 1/2016 | Himmelmann | H02M 5/458 903/903 |
| 2016/0028230 A1* | 1/2016 | Elfman | B60R 16/0231 318/504 |
| 2016/0031275 A1* | 2/2016 | Monroe | B60F 3/003 244/2 |
| 2016/0031554 A1* | 2/2016 | Eshkenazy | B64U 30/21 244/6 |
| 2016/0031564 A1* | 2/2016 | Yates | B64C 39/024 307/9.1 |
| 2016/0039300 A1* | 2/2016 | Wang | B64U 50/39 244/58 |
| 2016/0046369 A1* | 2/2016 | Watkins | B64C 27/24 244/7 A |
| 2016/0068261 A1* | 3/2016 | Niederberger | B64U 50/31 244/2 |
| 2016/0068264 A1* | 3/2016 | Ganesh | G05D 1/0676 701/4 |
| 2016/0069578 A1* | 3/2016 | O'Donnell | A62C 99/0072 454/341 |
| 2016/0070264 A1* | 3/2016 | Hu | G05D 1/042 701/2 |
| 2016/0070265 A1* | 3/2016 | Liu | B64C 39/024 701/25 |
| 2016/0101368 A1* | 4/2016 | Rehkemper | A63H 27/12 446/58 |
| 2016/0101856 A1* | 4/2016 | Kohstall | B64C 39/024 244/17.23 |
| 2016/0107751 A1* | 4/2016 | D'Andrea | B64C 39/024 701/4 |
| 2016/0114887 A1* | 4/2016 | Zhou | H04N 23/69 348/148 |
| 2016/0114906 A1* | 4/2016 | McGeer | B64U 80/10 244/114 R |
| 2016/0122015 A1* | 5/2016 | Hutson | B64C 39/024 244/17.23 |
| 2016/0122016 A1* | 5/2016 | Mintchev | B64U 30/293 244/17.23 |
| 2016/0122038 A1* | 5/2016 | Fleischman | B64F 1/20 244/114 R |
| 2016/0123182 A1* | 5/2016 | Samaritano | B64C 27/08 416/43 |
| 2016/0129998 A1* | 5/2016 | Welsh | B64C 27/20 244/12.3 |
| 2016/0130000 A1* | 5/2016 | Rimanelli | B64U 10/70 244/2 |
| 2016/0130015 A1* | 5/2016 | Caubel | B64U 20/83 244/120 |
| 2016/0137293 A1* | 5/2016 | Santangelo | B64U 60/60 244/50 |
| 2016/0137298 A1* | 5/2016 | Youngblood | B64U 20/70 244/17.23 |
| 2016/0137304 A1* | 5/2016 | Phan | B64F 3/02 244/17.23 |
| 2016/0144734 A1* | 5/2016 | Wang | B60L 53/124 701/17 |
| 2016/0144954 A1* | 5/2016 | Daigle | B64U 10/16 244/17.23 |
| 2016/0144982 A1* | 5/2016 | Sugumaran | B64F 1/12 244/108 |
| 2016/0152339 A1* | 6/2016 | von Flotow | B64F 1/0295 244/2 |
| 2016/0159471 A1* | 6/2016 | Chan | B64D 47/08 244/39 |
| 2016/0159472 A1* | 6/2016 | Chan | B64C 27/54 244/39 |
| 2016/0159496 A1* | 6/2016 | O'Toole | B60L 53/80 244/110 E |
| 2016/0167505 A1* | 6/2016 | Suzuki | F16C 33/585 180/65.51 |
| 2016/0171896 A1* | 6/2016 | Buchmueller | G08G 5/0008 701/3 |
| 2016/0176514 A1* | 6/2016 | Lavagen | B64C 37/00 244/50 |
| 2016/0176520 A1* | 6/2016 | Goldstein | B64U 30/293 244/17.23 |
| 2016/0185466 A1* | 6/2016 | Dreano, Jr. | A47G 29/141 705/26.81 |
| 2016/0191793 A1* | 6/2016 | Yang | H04N 23/635 348/207.11 |
| 2016/0194069 A1* | 7/2016 | Taylor | B64U 20/65 244/17.23 |
| 2016/0196756 A1* | 7/2016 | Prakash | G06Q 10/083 701/3 |
| 2016/0200415 A1* | 7/2016 | Cooper | B64C 39/024 244/17.15 |
| 2016/0200437 A1* | 7/2016 | Ryan | B64U 10/60 244/99.2 |
| 2016/0200438 A1* | 7/2016 | Bokeno | B64C 39/024 244/2 |
| 2016/0207619 A1* | 7/2016 | Darrow, Jr. | F16H 1/28 |
| 2016/0207625 A1* | 7/2016 | Judas | B64C 5/08 |
| 2016/0207627 A1* | 7/2016 | Hoareau | G06Q 10/0833 |
| 2016/0209839 A1* | 7/2016 | Hoareau | G05D 1/1062 |
| 2016/0214713 A1* | 7/2016 | Cragg | B64C 39/024 |
| 2016/0214727 A1* | 7/2016 | Hamel | B64D 27/24 |
| 2016/0221671 A1* | 8/2016 | Fisher | B64C 27/20 |
| 2016/0221683 A1* | 8/2016 | Roberts | B64D 27/02 |
| 2016/0229530 A1* | 8/2016 | Welsh | B64U 30/12 |
| 2016/0229534 A1* | 8/2016 | Hutson | B60F 5/02 |
| 2016/0236774 A1* | 8/2016 | Niedzballa | B64D 27/02 |
| 2016/0236775 A1* | 8/2016 | Eshkenazy | B64C 29/0025 |
| 2016/0236789 A1* | 8/2016 | Burns | B64D 27/02 |
| 2016/0239798 A1* | 8/2016 | Borley | G06Q 30/0185 |

(56) References Cited

U.S. PATENT DOCUMENTS

| | | | | |
|---|---|---|---|---|
| 2016/0243762 A1* | 8/2016 | Fleming | G06F 30/00 |
| 2016/0244146 A1* | 8/2016 | Harding | B64C 23/072 |
| 2016/0244157 A1* | 8/2016 | Welsh | B64C 11/46 |
| 2016/0244160 A1* | 8/2016 | Colten | B60F 5/02 |
| 2016/0244187 A1* | 8/2016 | Byers | G06Q 10/0832 |
| 2016/0251088 A1* | 9/2016 | Melish | B64F 1/0295 244/110 C |
| 2016/0257423 A1* | 9/2016 | Martin | A47G 29/14 |
| 2016/0257424 A1* | 9/2016 | Stabler | B64F 1/20 |
| 2016/0263775 A1* | 9/2016 | Boon | F03D 1/0675 |
| 2016/0264232 A1* | 9/2016 | Briancourt | B64C 23/072 |
| 2016/0272313 A1* | 9/2016 | Chan | B64C 11/48 |
| 2016/0272316 A1* | 9/2016 | Nelson | B64C 39/024 |
| 2016/0280359 A1* | 9/2016 | Semke | B64C 27/006 |
| 2016/0280369 A1* | 9/2016 | Pounds | B64C 27/82 |
| 2016/0284221 A1* | 9/2016 | Hinkle | B64D 1/02 |
| 2016/0286128 A1* | 9/2016 | Zhou | H04L 65/762 |
| 2016/0288901 A1* | 10/2016 | Fisher | B64C 39/024 |
| 2016/0291445 A1* | 10/2016 | Fisher, Sr | B64U 20/87 |
| 2016/0297545 A1* | 10/2016 | Yang | G05D 1/0044 |
| 2016/0304217 A1* | 10/2016 | Fisher | B64C 39/024 |
| 2016/0307448 A1* | 10/2016 | Salnikov | A01B 79/02 |
| 2016/0311526 A1* | 10/2016 | Geise | B64C 27/08 |
| 2016/0311528 A1* | 10/2016 | Nemovi | B64C 39/024 |
| 2016/0313742 A1* | 10/2016 | Wang | G05D 1/0676 |
| 2016/0318607 A1* | 11/2016 | Desai | B64D 1/16 |
| 2016/0318615 A1* | 11/2016 | Pick | B64D 17/54 |
| 2016/0325834 A1* | 11/2016 | Foster | B64C 39/024 |
| 2016/0327945 A1* | 11/2016 | Davidson | B64C 39/024 |
| 2016/0327956 A1* | 11/2016 | Zhang | B64C 39/024 |
| 2016/0332747 A1* | 11/2016 | Bradlow | G10L 21/0208 |
| 2016/0339981 A1* | 11/2016 | Vermeulen | B60B 27/023 |
| 2016/0340006 A1* | 11/2016 | Tang | G16H 40/67 |
| 2016/0340021 A1* | 11/2016 | Zhang | B64C 27/08 |
| 2016/0340028 A1* | 11/2016 | Datta | B64C 27/08 |
| 2016/0340049 A1* | 11/2016 | Ferreyra | H04L 67/12 |
| 2016/0355257 A1* | 12/2016 | Chappell | B64C 27/52 |
| 2016/0355258 A1* | 12/2016 | Williams | B05B 9/04 |
| 2016/0355261 A1* | 12/2016 | Chin | B64D 5/00 |
| 2016/0362173 A1* | 12/2016 | Marion | B64C 39/024 |
| 2016/0364989 A1* | 12/2016 | Speasl | G08G 5/0069 |
| 2016/0368610 A1* | 12/2016 | Erickson | B64D 17/72 |
| 2016/0376029 A1* | 12/2016 | Sekiya | B64F 1/0295 244/110 F |
| 2016/0376031 A1* | 12/2016 | Michalski | G08G 5/0013 701/15 |
| 2016/0378108 A1* | 12/2016 | Paczan | B64U 20/00 705/330 |
| 2016/0378120 A1* | 12/2016 | Creasman | B64F 1/007 701/2 |
| 2017/0010623 A1* | 1/2017 | Tang | G06V 20/17 |
| 2017/0011333 A1* | 1/2017 | Greiner | B64D 1/02 |
| 2017/0015412 A1* | 1/2017 | Matus | B64C 27/08 |
| 2017/0015417 A1* | 1/2017 | Bishop | B64C 29/04 |
| 2017/0023947 A1* | 1/2017 | McMillion | B64U 80/25 |
| 2017/0023949 A1* | 1/2017 | Fisher | B64D 47/08 |
| 2017/0029099 A1* | 2/2017 | Chen | B64U 30/29 |
| 2017/0030715 A1* | 2/2017 | Song | B64C 39/024 |
| 2017/0036762 A1* | 2/2017 | Gamble | B64U 50/13 |
| 2017/0036771 A1* | 2/2017 | Woodman | B64U 30/293 |
| 2017/0038778 A1* | 2/2017 | Wang | G05D 1/102 |
| 2017/0043869 A1* | 2/2017 | Howard | B64C 27/006 |
| 2017/0043870 A1* | 2/2017 | Wu | B64D 47/08 |
| 2017/0050726 A1* | 2/2017 | Yamada | B64C 27/20 |
| 2017/0050749 A1* | 2/2017 | Pilskalns | B64F 1/12 |
| 2017/0057630 A1* | 3/2017 | Schwaiger | B64C 27/026 |
| 2017/0057650 A1* | 3/2017 | Walter-Robinson | H02J 7/0068 |
| 2017/0069214 A1* | 3/2017 | Dupray | G08G 5/0008 |
| 2017/0072812 A1* | 3/2017 | Von Novak | B64U 30/20 |
| 2017/0073065 A1* | 3/2017 | Von Novak | B64C 39/024 |
| 2017/0081043 A1* | 3/2017 | Jones | B64U 10/14 |
| 2017/0091710 A1* | 3/2017 | Van Dyke | A47G 29/14 |
| 2017/0096222 A1* | 4/2017 | Spinelli | B64C 39/024 |
| 2017/0113787 A1* | 4/2017 | Hein | B64U 30/30 |
| 2017/0113789 A1* | 4/2017 | Ou | B64C 25/06 |
| 2017/0113800 A1* | 4/2017 | Freeman | B64U 20/70 |
| 2017/0117676 A1* | 4/2017 | James | B64F 1/222 |
| 2017/0121023 A1* | 5/2017 | High | B64C 39/024 |
| 2017/0121034 A1* | 5/2017 | Fisher | H04N 23/57 |
| 2017/0126935 A1* | 5/2017 | Tai | B64C 39/028 |
| 2017/0129464 A1* | 5/2017 | Wang | B64U 50/39 |
| 2017/0129580 A1* | 5/2017 | Mirzeabasov | B64B 1/06 |
| 2017/0129603 A1* | 5/2017 | Raptopoulos | B64C 39/024 |
| 2017/0136631 A1* | 5/2017 | Li | B60L 53/14 |
| 2017/0144753 A1* | 5/2017 | Yu | B64C 27/20 |
| 2017/0144754 A1* | 5/2017 | Limvorapun | B60L 53/18 |
| 2017/0144756 A1* | 5/2017 | Rastgaar Aagaah | B64D 3/00 |
| 2017/0154536 A1* | 6/2017 | Kreiner | G08G 5/0013 |
| 2017/0158328 A1* | 6/2017 | Foley | B64U 30/296 |
| 2017/0158329 A1* | 6/2017 | Liu | A47L 11/4011 |
| 2017/0158352 A1* | 6/2017 | von Flotow | B64C 25/10 |
| 2017/0166309 A1* | 6/2017 | Sekiya | B64D 17/00 |
| 2017/0174334 A1* | 6/2017 | Beckman | G10K 11/17875 |
| 2017/0174335 A1* | 6/2017 | Malloy | B64C 29/0025 |
| 2017/0174336 A1* | 6/2017 | Baba | B64U 80/25 |
| 2017/0174343 A1* | 6/2017 | Erickson | A61B 5/01 |
| 2017/0175413 A1* | 6/2017 | Curlander | B64U 80/25 |
| 2017/0183074 A1* | 6/2017 | Hutson | B64U 20/70 |
| 2017/0185084 A1* | 6/2017 | Wang | G05D 1/0016 |
| 2017/0192422 A1* | 7/2017 | Kim | B64D 47/08 |
| 2017/0197719 A1* | 7/2017 | Kwon | B64F 1/12 |
| 2017/0199044 A1* | 7/2017 | Hoareau | G01C 21/3691 |
| 2017/0208512 A1* | 7/2017 | Aydin | H04W 36/0055 |
| 2017/0210451 A1* | 7/2017 | Oh | B64D 1/12 |
| 2017/0217577 A1* | 8/2017 | Hattar | B64C 27/30 |
| 2017/0217584 A1* | 8/2017 | Elfeky | G05D 1/0858 |
| 2017/0217585 A1* | 8/2017 | Hulsman | B64C 29/02 |
| 2017/0217599 A1* | 8/2017 | Peng | B64D 27/40 |
| 2017/0225782 A1* | 8/2017 | Kohstall | B64U 30/293 |
| 2017/0225783 A1* | 8/2017 | Fisher | B64C 27/20 |
| 2017/0225784 A1* | 8/2017 | Hayes | B64U 10/14 |
| 2017/0225792 A1* | 8/2017 | Wang | B64C 39/024 |
| 2017/0233069 A1* | 8/2017 | Apkarian | B64F 5/10 244/7 R |
| 2017/0240714 A1* | 8/2017 | Ahmed | C08J 5/249 |
| 2017/0247107 A1* | 8/2017 | Hauer | B64D 35/06 |
| 2017/0247109 A1* | 8/2017 | Buchmueller | B64C 39/024 |
| 2017/0247120 A1* | 8/2017 | Miller | B64U 80/25 |
| 2017/0253322 A1* | 9/2017 | Krebs | B64C 39/04 |
| 2017/0253325 A1* | 9/2017 | Zou | B64U 60/50 |
| 2017/0253331 A1* | 9/2017 | Nakashima | B64U 10/10 |
| 2017/0253348 A1* | 9/2017 | Ashdown | F41H 13/0006 |
| 2017/0267345 A1* | 9/2017 | Marom | B64D 1/22 |
| 2017/0269594 A1* | 9/2017 | Sydnor | G05D 1/0077 |
| 2017/0271925 A1* | 9/2017 | Plekhanov | H02J 50/80 |
| 2017/0271926 A1* | 9/2017 | Plekhanov | H02J 50/402 |
| 2017/0274997 A1* | 9/2017 | von Flotow | B64U 70/20 |
| 2017/0275025 A1* | 9/2017 | Johnson | B60L 53/37 |
| 2017/0283090 A1* | 10/2017 | Miller | B64U 50/39 |
| 2017/0291697 A1* | 10/2017 | Kornatowski | B64C 39/024 |
| 2017/0297738 A1* | 10/2017 | von Flotow | B64D 1/12 |
| 2017/0305548 A1* | 10/2017 | Ozaki | B64D 27/24 |
| 2017/0305575 A1* | 10/2017 | Bash | B64F 1/32 |
| 2017/0313418 A1* | 11/2017 | Yoon | B64U 30/26 |
| 2017/0313433 A1* | 11/2017 | Ozaki | B64D 27/24 |
| 2017/0316283 A1* | 11/2017 | Fryshman | G06T 7/0008 |
| 2017/0316701 A1* | 11/2017 | Gil | B64C 39/024 |
| 2017/0318477 A1* | 11/2017 | Priest | H04L 12/413 |
| 2017/0320572 A1* | 11/2017 | High | G06Q 10/0832 |
| 2017/0328391 A1* | 11/2017 | Matsuda | F16B 2/22 |
| 2017/0329324 A1* | 11/2017 | Bachrach | G05D 1/0094 |
| 2017/0330478 A1* | 11/2017 | Zhang | G05D 1/0044 |
| 2017/0341776 A1* | 11/2017 | McClure | B64U 10/16 |
| 2017/0349283 A1* | 12/2017 | Paunicka | B64C 39/024 |
| 2017/0351254 A1* | 12/2017 | Listwin | G05D 1/0022 |
| 2017/0355460 A1* | 12/2017 | Shannon | B64D 17/383 |
| 2017/0355461 A1* | 12/2017 | Naito | F41H 13/00 |
| 2017/0359106 A1* | 12/2017 | John Wilson | H04B 7/0617 |
| 2017/0369166 A1* | 12/2017 | van den Heuvel | B64C 27/08 |
| 2017/0369252 A1* | 12/2017 | Balk | B65G 21/18 |
| 2018/0002030 A1* | 1/2018 | Klassen | B64C 1/1407 |
| 2018/0027772 A1* | 2/2018 | Gordon | A01K 15/023 |

(56) References Cited

U.S. PATENT DOCUMENTS

| | | | |
|---|---|---|---|
| 2018/0029703 A1* | 2/2018 | Simon | B64C 29/0025 |
| 2018/0035606 A1* | 2/2018 | Burdoucci | A01D 34/008 |
| 2018/0065735 A1* | 3/2018 | Ichihara | B64D 45/04 |
| 2018/0074523 A1* | 3/2018 | Cantrell | B60L 58/20 |
| 2018/0075417 A1* | 3/2018 | Gordon | B64D 1/22 |
| 2018/0088598 A1* | 3/2018 | Lection | B64C 39/024 |
| 2018/0089622 A1* | 3/2018 | Burch, V | G06Q 10/0833 |
| 2018/0092484 A1* | 4/2018 | Lewis | G08G 5/0026 |
| 2018/0118361 A1* | 5/2018 | Choi | F02D 41/14 |
| 2018/0134376 A1* | 5/2018 | Chen | B64U 60/30 |
| 2018/0141672 A1* | 5/2018 | Bevirt | B64C 29/0033 |
| 2018/0147429 A1* | 5/2018 | Won | B64C 25/405 |
| 2018/0155018 A1* | 6/2018 | Kovac | B64C 29/0033 |
| 2018/0162530 A1* | 6/2018 | Klein | B64D 1/02 |
| 2018/0194463 A1* | 7/2018 | Hasinski | B64U 30/26 |
| 2018/0194484 A1* | 7/2018 | Livieratos | B64D 27/04 |
| 2018/0208296 A1* | 7/2018 | Mores | B64C 29/0033 |
| 2018/0220826 A1* | 8/2018 | Sillings | G08G 5/0069 |
| 2018/0233055 A1* | 8/2018 | Damnjanovic | G01S 11/02 |
| 2018/0244367 A1* | 8/2018 | Kiesewetter | B64C 9/14 |
| 2018/0244383 A1* | 8/2018 | Valente | B64C 11/46 |
| 2018/0253979 A1* | 9/2018 | Rey | G08G 5/0069 |
| 2018/0255465 A1* | 9/2018 | Priest | H04W 16/18 |
| 2018/0260800 A1* | 9/2018 | Caution | G07G 1/0036 |
| 2018/0272856 A1* | 9/2018 | Manning | B63H 7/02 |
| 2018/0275654 A1* | 9/2018 | Merz | G05D 1/0033 |
| 2018/0312247 A1* | 11/2018 | Ichihara | B64C 39/02 |
| 2018/0312254 A1* | 11/2018 | Ni | B64C 1/063 |
| 2018/0319496 A1* | 11/2018 | Zhang | B64C 27/08 |
| 2018/0327091 A1* | 11/2018 | Burks | B64C 39/024 |
| 2018/0327092 A1* | 11/2018 | Deng | B64U 30/293 |
| 2018/0327093 A1* | 11/2018 | von Flotow | B64U 60/50 |
| 2018/0329431 A1* | 11/2018 | Cheng | G01S 19/42 |
| 2018/0346136 A1* | 12/2018 | Arkus | B64C 1/063 |
| 2018/0354620 A1* | 12/2018 | Baek | B64C 39/024 |
| 2018/0354622 A1* | 12/2018 | Raffler | B64U 50/19 |
| 2018/0354623 A1* | 12/2018 | Bhat | B64C 27/10 |
| 2018/0362158 A1* | 12/2018 | Zhang | G05D 1/0061 |
| 2019/0016435 A1* | 1/2019 | Nysæter | B64C 39/024 |
| 2019/0023374 A1* | 1/2019 | Kahlon | F42B 10/14 |
| 2019/0047715 A1* | 2/2019 | Hedrick | G08G 5/04 |
| 2019/0077503 A1* | 3/2019 | Reddy | B64U 30/29 |
| 2019/0078766 A1* | 3/2019 | Lippert | B64C 39/024 |
| 2019/0084673 A1* | 3/2019 | Chen | B64U 20/50 |
| 2019/0100308 A1* | 4/2019 | Simionescu | B64C 39/022 |
| 2019/0138030 A1* | 5/2019 | Wu | B64C 39/024 |
| 2019/0144115 A1* | 5/2019 | Chen | B64U 10/14 244/118.1 |
| 2019/0168866 A1* | 6/2019 | Tovkach | B64U 50/32 |
| 2019/0176986 A1* | 6/2019 | Addonisio | G05D 1/0027 |
| 2019/0185161 A1* | 6/2019 | Eleryan | B64U 30/26 |
| 2019/0233254 A1* | 8/2019 | Shin | H01F 7/06 |
| 2019/0248464 A1* | 8/2019 | Ye | B64U 30/14 |
| 2019/0256202 A1* | 8/2019 | Resnick | B64U 30/20 |
| 2019/0258139 A1* | 8/2019 | Overall | G03B 17/563 |
| 2020/0065590 A1* | 2/2020 | Carmichael | B64D 47/08 |
| 2020/0108924 A1* | 4/2020 | Smith | G05D 1/0094 |
| 2020/0115062 A1* | 4/2020 | Klonowski | B64U 20/80 |
| 2020/0207469 A1* | 7/2020 | Benedict | B64C 27/52 |
| 2020/0225684 A1* | 7/2020 | Anderson | B64C 39/024 |
| 2020/0262550 A1* | 8/2020 | Dailey | B64D 17/80 |
| 2021/0016880 A1* | 1/2021 | Ishikawa | F02B 75/282 |
| 2021/0107623 A1* | 4/2021 | Barrett | F01D 25/04 |
| 2022/0106039 A1* | 4/2022 | Müller | B64U 10/14 |
| 2022/0185489 A1* | 6/2022 | Thiriet | B64D 27/04 |
| 2022/0392672 A1* | 12/2022 | Getman | A61H 23/02 |
| 2023/0002046 A1* | 1/2023 | Pegg | B64U 20/40 |
| 2023/0037350 A1* | 2/2023 | Hanamitsu | B64U 10/16 |
| 2023/0113483 A1* | 4/2023 | Favis | B64U 20/87 244/54 |
| 2023/0337232 A1* | 10/2023 | Qian | H04W 72/1273 |

\* cited by examiner

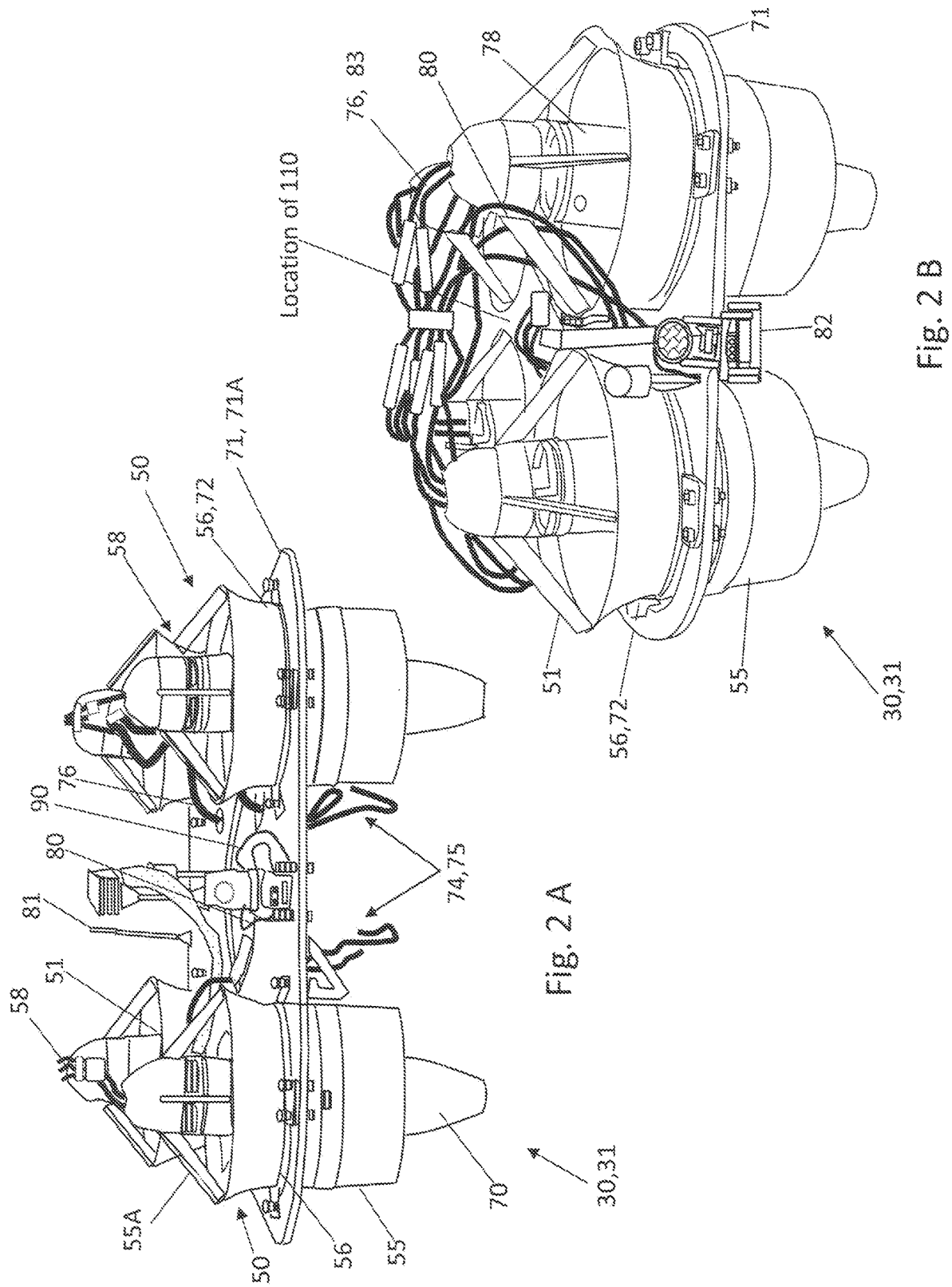

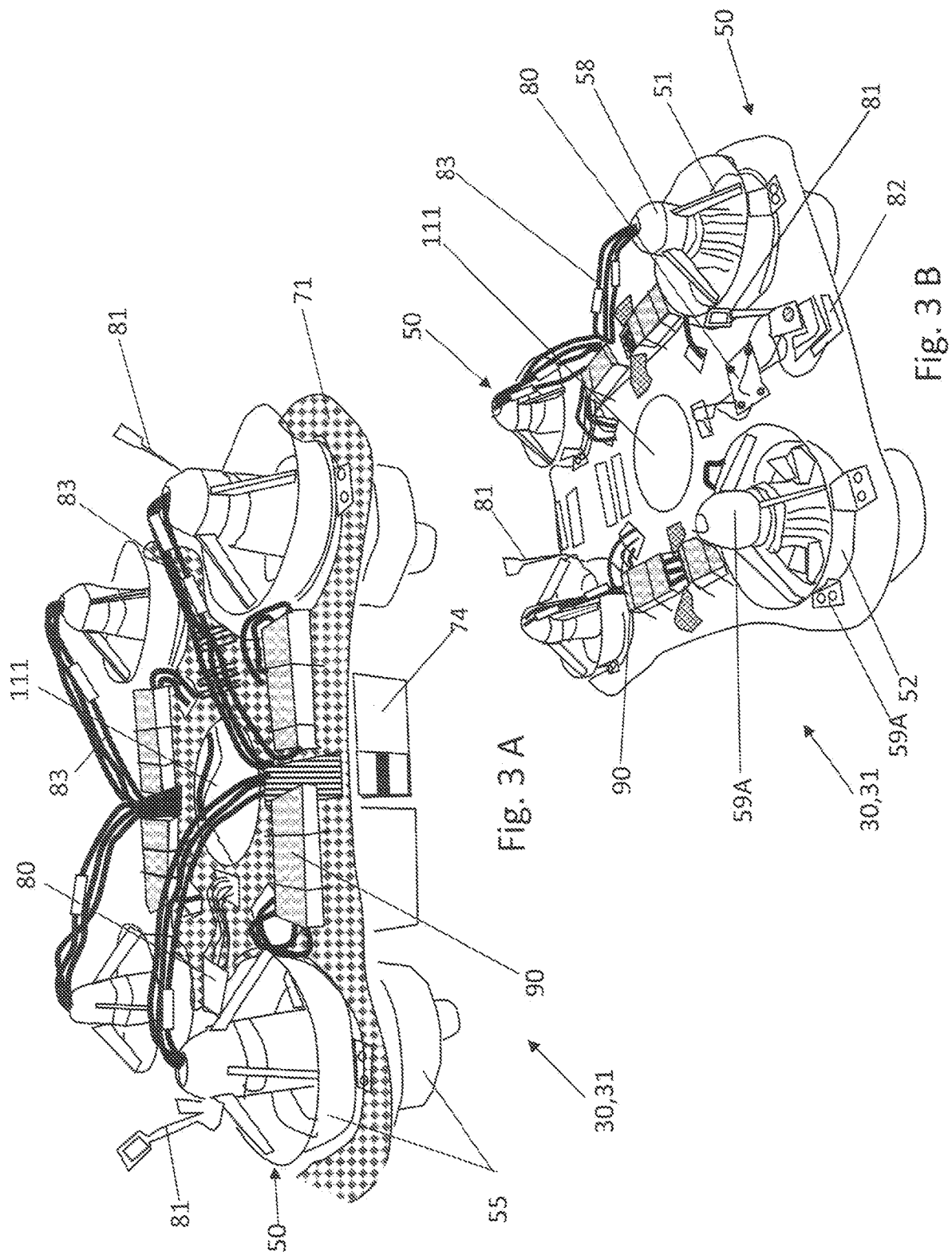

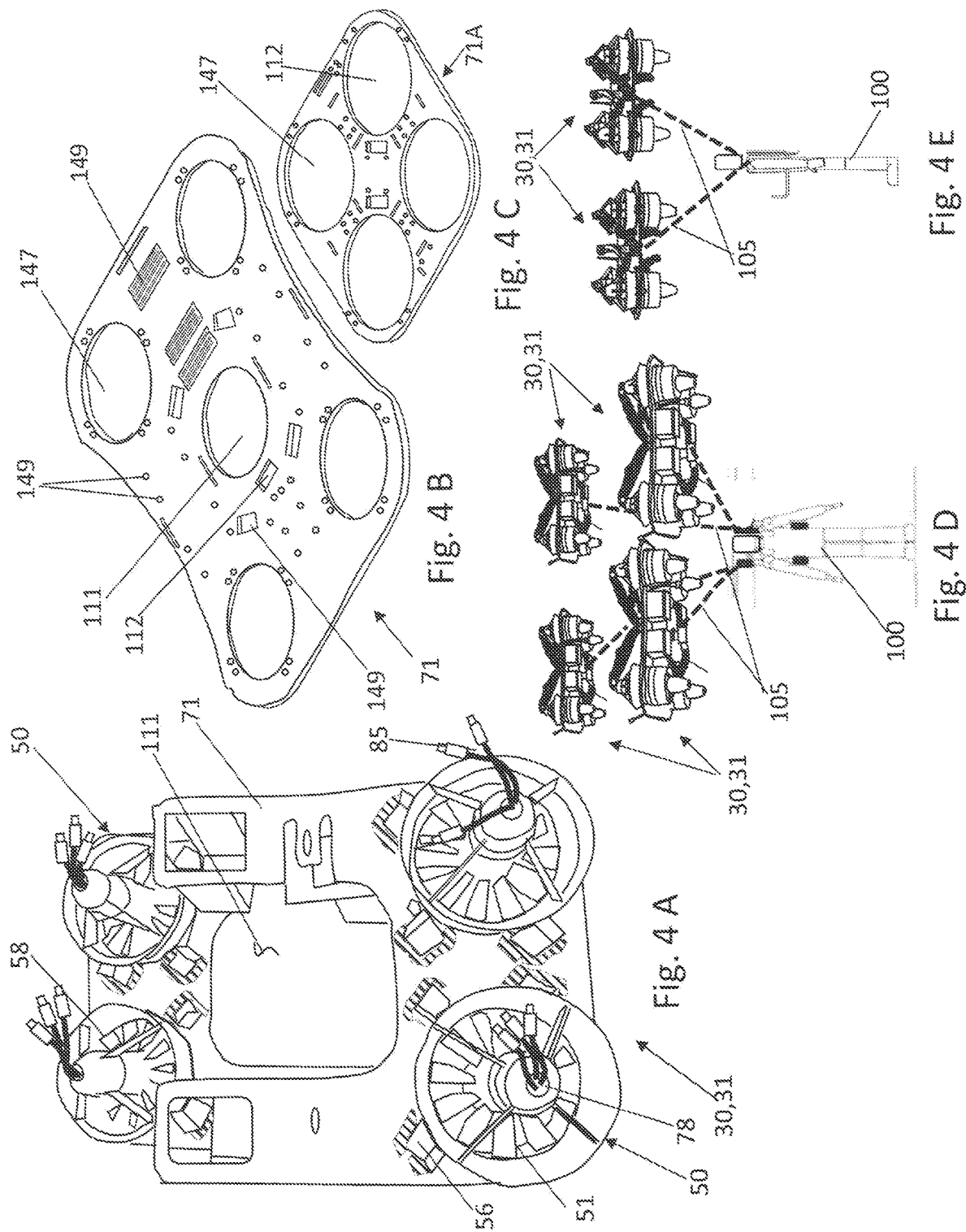

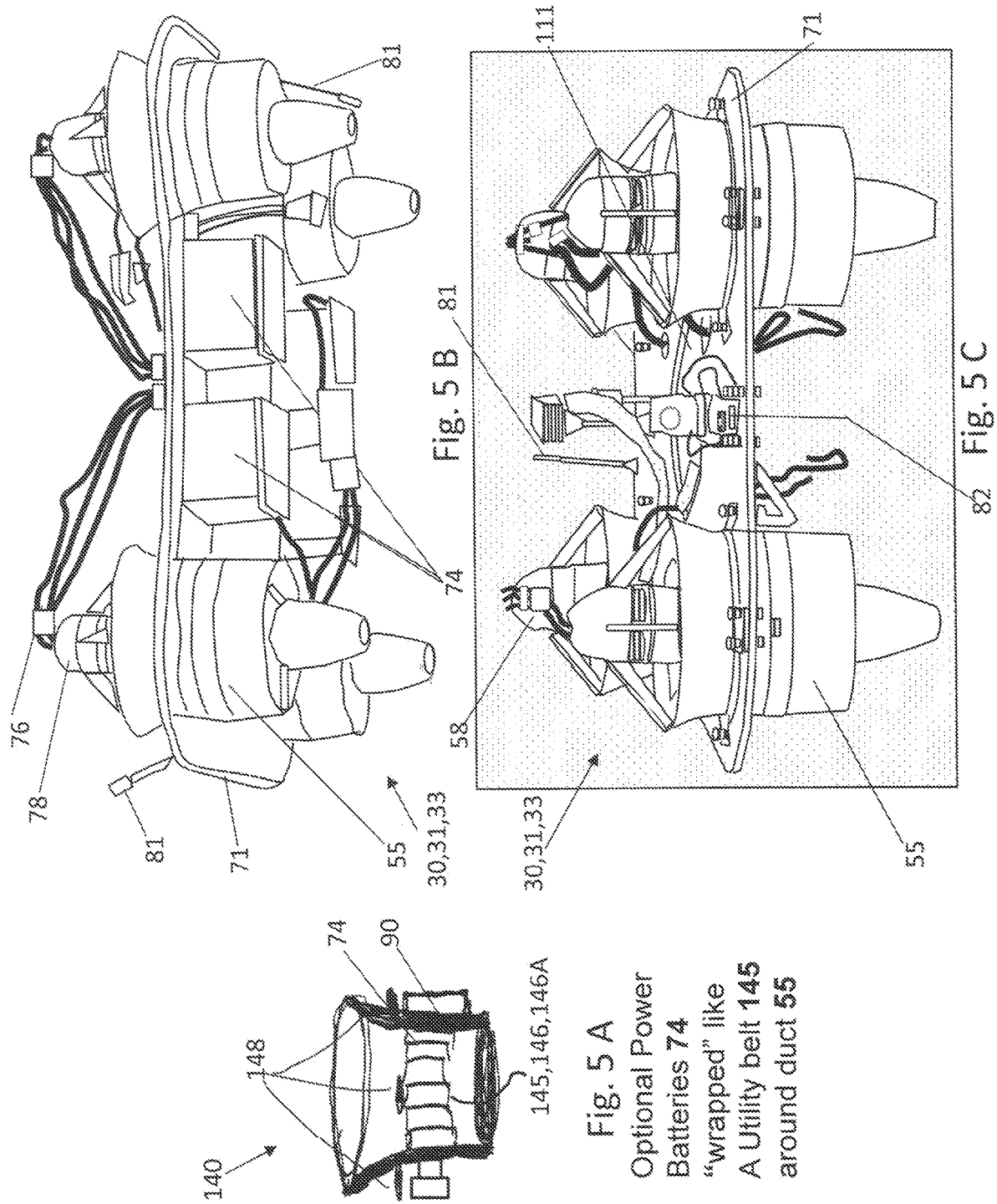

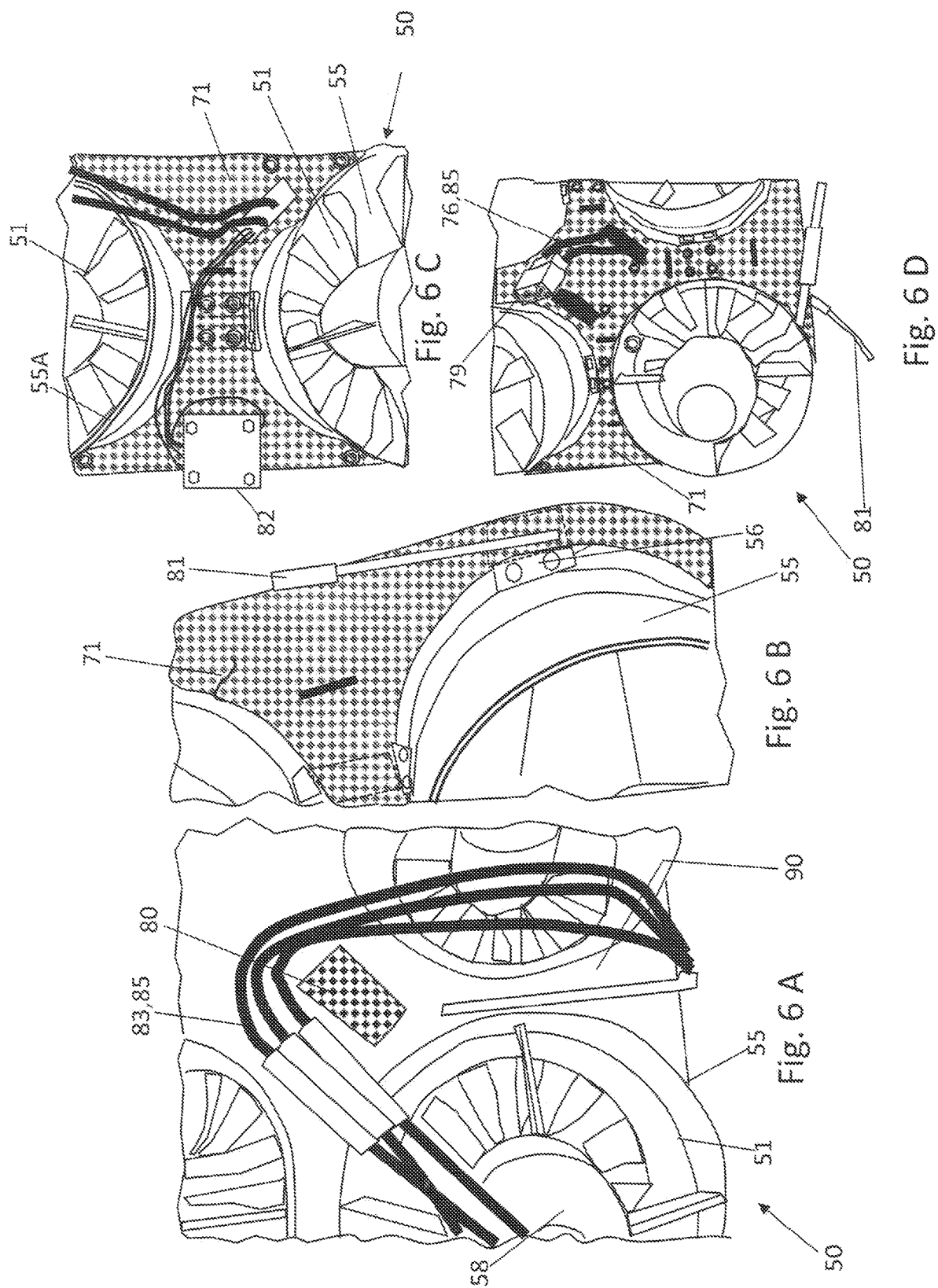

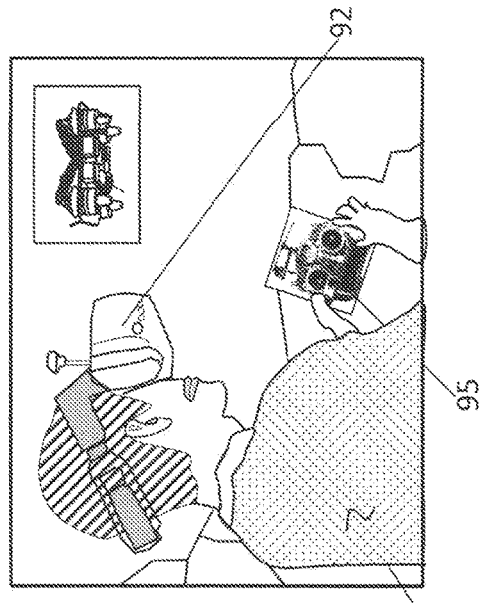
Fig. 7 B Operator 100 with Goggles 92 & Controller 95
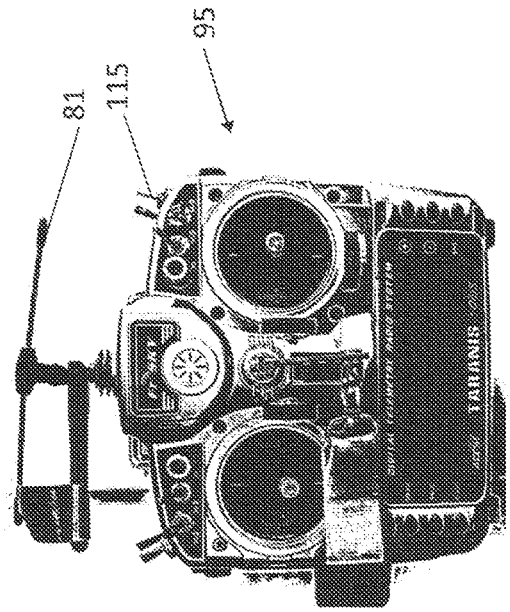
Fig. 7 C Typical Drone Controller 95
Fig. 7 A
Typical Wiring and Control 125
ESC – Electronic Speed Controller

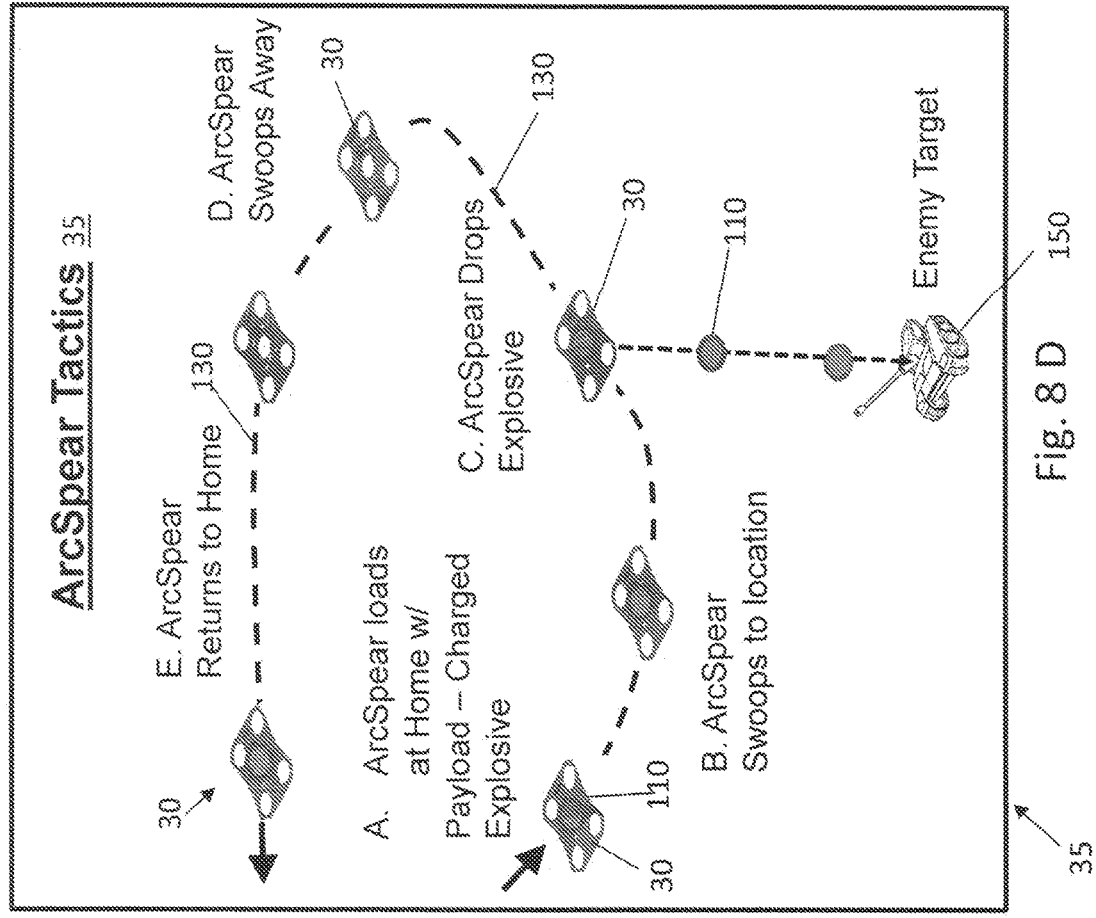
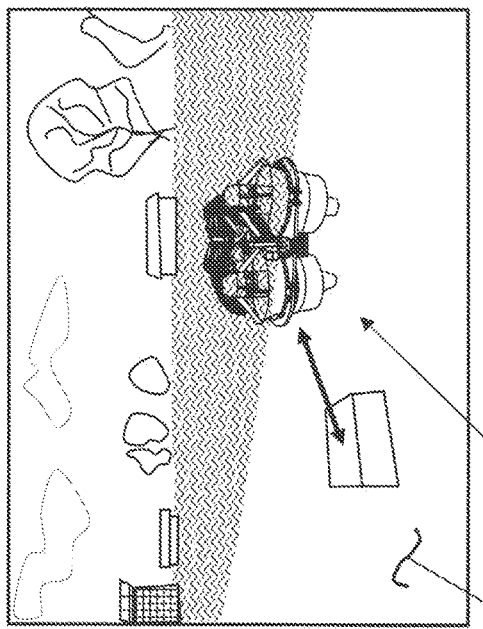
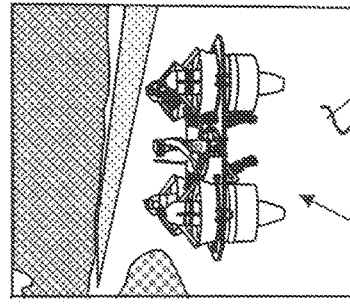
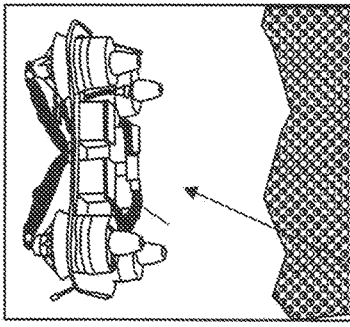

Drawings Shown are All Prior Art
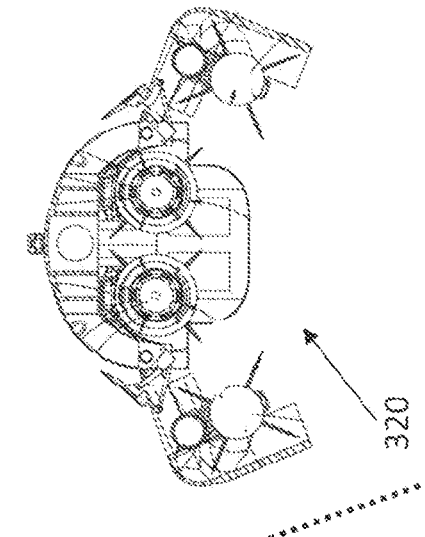
Fig. 9 C - Prior Art
US9180967B2
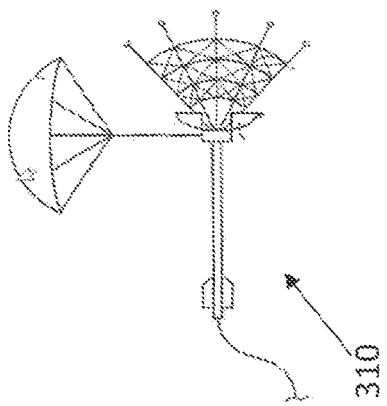
Fig. 9 B - Prior Art
CN106288963B
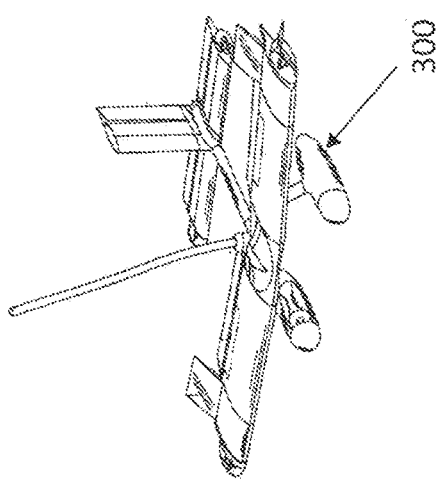
Fig. 9A - Prior Art
US20210053695A1
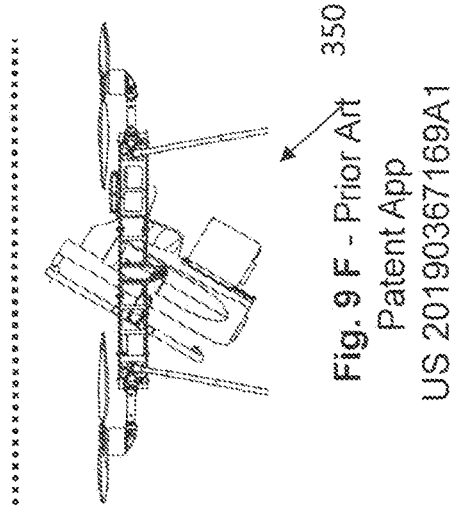
Fig. 9 F - Prior Art
Patent App
US 20190367169A1
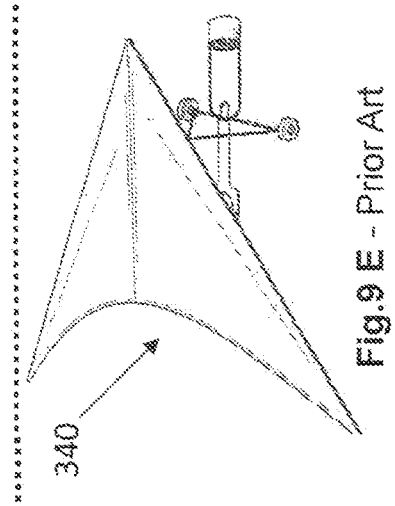
Fig. 9 E - Prior Art
US Patent App 2018/0272856
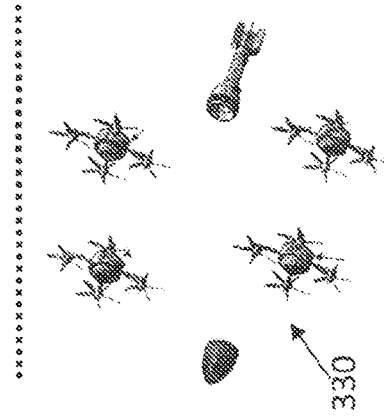
Fig. 9 D - Prior Art
US Patent US9939239B1

COMPACT AND LIGHTWEIGHT DRONE DELIVERY DEVICE CALLED AN ARCSPEAR ELECTRIC JET DRONE SYSTEM HAVING AN ELECTRIC DUCTED AIR PROPULSION SYSTEM AND BEING RELATIVELY DIFFICULT TO TRACK IN FLIGHT

CROSS-REFERENCE TO RELATED APPLICATIONS

This application claims the benefit of United States Provisional Patent Application with Ser. No. 63/396,253 filed Aug. 9, 2022, by Pete Bitar. The application is entitled "Special Small Drone Delivery Device called an ArcSpear Electric Jet Drone System Having an Electric Ducted Air Propulsion System and Being Relatively Difficult to Track in Flight".

FIELD OF INVENTION

This invention relates to a Compact and Lightweight Electric Jet Drone System having an electric ducted air propulsion system and being relatively difficult to track in flight. The invention relates generally to aircrafts, and more specifically, to an unmanned aerial vehicle (UAV) system and method of use. The present application relates to the field of unmanned aerial vehicle control technology, particularly, to an unmanned drone device capable of delivering payloads which can be secured to the device and has controllable flight powered by electrically powered ducted air as a propulsion arrangement. The invention relates generally to defense systems, and more specifically to an unmanned aerial vehicle with a weapons deployment or munitions carrier such as a grenade launcher.

FEDERALLY SPONSORED RESEARCH

None.

SEQUENCE LISTING OR PROGRAM

None.

BACKGROUND—FIELD OF INVENTION and PRIOR ART

As far as known, there are no Compact and Lightweight drone delivery devices or the like such as an ArcSpear Electric Jet Drone System. It is believed that this product is unique in its design and technologies.

The success of traditional human transported weapons to hit intended targets has been dependent upon an individual warfighter's ability and skill to aim and control the weapon. Much training and practice is required to enable a warfighter to be skilled at marksmanship. Historically, a human transported weapon's accuracy has been limited to the operator's skill, as well as environmental factors that may obscure or complicate the shot. Because skill is involved with hitting a target with a human transported weapon, many of the shots will miss the intended target, placing a requirement of having a large supply of munitions available in a firelight. This places a burden to resupply the warfighter in the field, as well as for the warfighter to carry more munitions into a battle, which is extra weight, as well as extra cost. Consequentially, an unmanned aerial device that can carry a weapon or any small payload into an unfriendly area or area that is controlled by an adversary is a welcomed alternative to the human transported weapons.

The technology, development and deployment of small, unmanned air vehicles UAVs is becoming pervasive. Small UAVs provide a desirable and strategic sensor platform for close support operations including those associated with surveillance, reconnaissance, targeting, and battle damage assessment. In the hands of a military adversary, these small UAVs become a threat. They can be used defensively and offensively against assets and infrastructure deployed in the air, on the ground and on water. For example, fixed locations as well as moving armored and naval vessels are particularly vulnerable to small scale attack when underway or even while at port. Their low cost and ease of deployment have the potential to make them ubiquitously present in large numbers and in simultaneous mission scenarios.

The use of conventional manned aircraft, missiles, and larger unmanned aircraft to interdict small scale air, water and ground threats is an inefficient use of resources. Such a strategy puts human life at risk as well as equipment whose value may exceed the tactical value associated with interdiction. In addition, the use of conventional available resources inhibits these same resources from being used for more appropriate engagements. Arguably, the relatively long persistence required to detect and effectively track and interdict exceedingly small threats from small devices, especially where detection is conducted from the interdiction platform itself, often precludes the use of missiles and higher performance aircraft in general. In addition, certain missions, especially when of a clandestine nature, inherently demand "low-observability" features of small and fast devices since these same features are not commonly provided by more conventional interdiction platforms.

In a 'fight fire with fire' approach, a conventional small UAV might be used as an interdiction platform against an adversary's small UAV. However, the normal decision-making hierarchy, its necessary asset base and associated latent response time provide a sub-optimum response to the small UAV threat potential. From a technical perspective, small UAV platforms can be highly maneuverable. They provide close proximity to surface and objects desired for delivery of a payload by the small UAV operation or interdiction. The smaller also can offer devices that provide an effective weapons system that can be forgiving of small aiming errors. Conventional small UAVs and small surface craft have sufficient speed and maneuverability and can incorporate little awareness of the small aerial device to make it subject to traditional countermeasures. Moreover, small devices have heretofore lacked significant weapons capability. Those skilled in the art understand that more is required than the mere ad hock adaptation to retrofit conventional small UAVs with maneuverability and capacity for significant payload. Some of the fundamental issues presented in an effective small UAV interceptor design include appropriate weapon integration, torque management from weapon discharge, high G-force airframe design, the selection of track sensor technologies and intelligent (autonomous) maneuverability of the small UAV platform.

Accordingly, there is a recognized need for a small interceptor UAV, an associated weapon platform, a UAV avionics system, and a control methodology that addresses the challenges outlined above. A UAV airframe, weapons system, avionics system and method should provide for effective, autonomous management and execution of different mission scenarios. A small UAV should be highly integrated, relatively compact, and modular for ease of retrofit and portability and should be designed and constructed in a manner that maximizes survivability under demanding and hostile conditions. Devices and systems also benefit from being cost effective for application in large numbers to achieve parity against multiple and simultaneous threats.

Problem Solved

The improvements and problems solved as to a Compact and Lightweight Electric Jet Drone System having an electric ducted air propulsion system and being relatively difficult to track in flight include: A. Is lighter weight due to lighter electric motors than gas-powered systems and lightweight, carbon fiber frame; B. Uses no combustible fuel—uses rechargeable batteries; C. Is quiet, no combustion noise, stealth; D. Is unmanned operation with remote controlled operation and Simple, servo-controller-based throttle to control Electronic Speed Controllers (ESCs) which drive electric motors; E. Capable of speed of up to 180 miles-per-hour {MPH}; F. Is a multi-copter with ducted fans, ducted turbines with protected intakes and more than one ducted fan/turbine arrayed with counter-rotating propellers/turbines; G. Has a small cross-section to deflect tracking signals and search beams. With such a small cross section and such a high speed, it would be able to fly low and between buildings and trees, making it nearly impossible to shoot down, unlike slower, comparable payload carrying drones that fly at less than 60 mph and have large propellers; H. Capable of rapid setup for launch and rapid start (no pull-starting, priming, or other pre-start actions needed to start the motor); I. Carries payloads of up to 20 pounds and 10 pounds of total aircraft weight; J. Operates with smooth, low-vibration operation; K. Uses commonly available drone stability using multiple gyroscopes with a standard multi-copter flight controller; L. Is relatively inexpensive so that it could be reused OR used just once, depending on mission requirements; M. Is safe to operate around with its ducted turbine blades; N. Can used be as a "poor man's Javelin missile", flying at long distances (over 20 miles is possible) at high speed, then finding its target would shoot or drop its munitions on target; O. Controls allow automatically return home; P. Can be re-fitted with payloads for re-use; Q. Can be used effectively as a military asset, capable of deploying munitions against targets in a manner that allows for extreme control in congested urban, forested, or other confined environments, at high speed, with a cross-section and speed that would make it extremely difficult to shoot down; and R. Utilizes electric jet turbine engines with 10:1 or greater thrust to weight ratio, such that for every one pound of engine plus ESC combined weight, the entire assembly produces at least 10 pounds of thrust. This would not include battery weight.

PRIOR ART

As far as known, there are no devices for compact and lightweight electric ducted air propulsion systems and being relatively difficult to track in flight as described by Pete Bitar. It is believed that this system or apparatus is unique in its design and technologies. A novelty search revealed:

A. US Patent Application US20210053695A1 by Marinus Bernard Bosma conceived in 2020 and called a Fire bomber delivery. Described here is a system for delivering fire retardant materials in fighting a surface fire is provided, having an aircraft carrying the fire-retardant material, a hose deployable from the aircraft, the delivery hose connected to the reservoir and having a controllable nozzle at a deployed end with a remotely operable valve, an end effector connected by a multi-axis gimbal at the deployed end of the delivery hose the end effector having fixed wings with ailerons and elevators, and a rudder, the ailerons, elevators and rudder moved by electrical actuators, and control apparatus and circuitry in the aircraft and the end effector enabling an operator in manipulating the ailerons, elevators and the rudder. An operative in the aircraft controls the end effector via the control apparatus to fly at a lower altitude and in a different path than the aircraft and opens the remotely operable valve to deliver the fire-retardant material from the delivery hose.

B. Chinese Patent CN106288963B which is assigned to Disco Corp and shown in 2016—entitles a Small-sized unmanned aerial vehicle driving and reversing device. Demonstrated and described is a compact unmanned aircraft retreating device is provided. When the small-sized unmanned aerial vehicle flies to an area that should be secured, the small-sized unmanned aerial vehicle is quickly knocked back (caught). The small unmanned aerial vehicle driving back device (1) comprises a capture body (2) for capturing an unmanned aerial vehicle as a capture object and a capture body transmitting device (3) for transmitting the capture body (2) towards the unmanned aerial vehicle, so that even if a suspicious unmanned aerial vehicle (6) flies to the area to be protected, the capture body (2) can be transmitted by the capture body transmitting device (3) to rapidly capture the unmanned aerial vehicle (6). Therefore, the benefit and safety of the benign nationality can be secured.

C. U.S. Pat. No. 9,180,967B2 was issued to Binkholder in 2012 called a Configurable pod structure and store stowage and deployment system and method. Taught here is an embodiment where there is provided a radar signature and induced aerodynamic drag minimizing, externally mountable, internally configurable pod structure optimized for internal placement of one or more deployable stores through configuration and optimal kinematic operation of a pod door assembly. The pod structure has an externally mountable pod housing, a predetermined pod housing cross-sectional configuration optimized to provide a configurable interior volume accommodating multiple different store configurations, and a predetermined pod housing configuration having a cross-sectional configuration optimized to minimize a radar signature and an induced aerodynamic drag. The pod structure further has a pod door assembly integral with the pod housing and having a plurality of pod doors and one or more seal door mechanism assemblies. The pod structure is optimized in kinematic operational combination of the pod doors and seal door mechanism assemblies controlling ejection launch envelopes.

D. U.S. Pat. No. 9,939,239B1 was issued to Manole in 2013 and titled a Stackable Collaborative engagement munition. This shows a stacked, collaborative engagement ammunition round is presented. The round includes plural stacked miniaturized projectiles where such projectiles separate after launch and then swarm as a group towards a target or targets. At launch, the projectiles may fly in a preselected formation, leader-follower towards the target. Or, the projectiles may deploy propellers, tri-copter or quad-copter vanes, and self-steer swarming to the target. Each projectile has its own miniaturized guidance, navigation and control components, autopilot, cameras, transmitter, receiver, antennae, power source, sensors, fuzes and/or flex circuits.

E. US Patent Appn. US 2018/0272856 made by Manning and named a Ducted Fan Propulsion System. Here is described an embodiment where a ducted fan propulsion system comprises an outer cowling, adapted to form a duct. The duct houses one or more fan blades rotating about a central axis. One or more motors are in communication with the fan blades and in communication with a power source. The duct is transversed by a plurality of spokes. In an embodiment, multiple ducts are housed within an outer cowling, with each duct comprising one or more rotatable fan blades, one or more central axes, and one or more motors. In each embodiment, one or more members are attached to the ducted or multi-ducted fan propulsion system and extend to a user or vehicle. The members terminate in a handle further comprising a throttle adjuster.

F. US Patent Application US 20190367169A1 published in 2019 by O'Leary and named an Unmanned flying grenade launcher. Provided in this application is an unmanned flying grenade launcher system is provided. The unmanned flying grenade launcher can include a portable unmanned aerial vehicle with an attachment apparatus configured to receive a standardized grenade launcher, and a servo coupled to adjust the angle of the grenade launcher relative to the portable unmanned aerial vehicle downward relative to the unmanned aerial vehicle. One or more telemetry systems can provide a visual indication of the unmanned aerial vehicle's surroundings to an operator and can receive flight commands and firing commands from the operator such that a firing mechanism fires the standardized grenade launcher in response to the firing command.

G. US Patent App. US 20070023582A1 by Steele made in 2005 and called an Unmanned air vehicle, integrated weapon platform, avionics system and control method. This shows a small, reusable interceptor unmanned air vehicle (UAV), an avionics control system for the UAV, a design method for the UAV and a method for controlling the UAV, for interdiction of small scale air, water and ground threats. The UAV includes a high performance airframe with integrated weapon and avionics platforms. Design of the UAV first involves the selection of a suitable weapon, then the design of the interceptor airframe to achieve weapon aiming via airframe maneuvering. The UAV utilizes an avionics control system that is vehicle-centric and, as such, provides for a high degree of autonomous control of the UAV. A situational awareness processor has access to a suite of disparate sensors that provide data for intelligently (autonomously) carrying out various mission scenarios. A flight control processor operationally integrated with the situational awareness processor includes a pilot controller and an autopilot controller for flying and maneuvering the UAV.

As can be observed, none of the prior art has anticipated or caused one skilled in the art of small, unmanned UAV drone devices to reason, consider, or conclude that this invention by Pete Bitar as obvious to a person having ordinary skill in the art of this industry. The device for a compact and lightweight drone delivery device having an electric ducted air propulsion system and being relatively difficult to track in flight provides an answer to the problems that are shown above. The Bitar solution addresses the shortfalls and solves them, unlike previous art in this industry.

SUMMARY OF THE INVENTION

This invention is a Compact and Lightweight Electric Jet Drone System having an electric ducted air propulsion system and being relatively difficult to track in flight. Contemplated here is an electric turbine propelled multicopter vertical takeoff and landing uncrewed aerial system.

The Compact and Lightweight Electric Jet Drone System having an electric ducted air propulsion system and being relatively difficult to track in flight has been described in the above embodiment. The manner of how the device operates is described below. One notes well that the description above and the operation described here must be taken together to fully illustrate the concept of the compact and lightweight Electric Jet Drone System. The preferred embodiment of the compact and lightweight, small Electric Jet Drone System comprised of: (a) a frame system; (b) a ducted turbine system comprising at least one and preferably four turbine with a set of blades or impellers of the fan/turbine, a shroud/exterior protection and frame of the turbine/fan, a cut protector on shroud, a means to secure shroud, and an electric motor with each fan the device with shaft connected to blades; (c) a payload with a deployment means on the structural frame; (d) a power system comprising a set of rechargeable batteries, a means to removably secure the batteries to the frame, a wiring harness from batteries to motors, a recharge plug to batteries from recharging power source, and a recharging power source; and (e) a flight controller for powering the ESC and controlling the motor plus a set of connectors from the set of batteries to the motor wherein the device having an electric ducted air propulsion system, being relatively difficult to track in flight (stealth), being relatively fast, able to maneuver quickly and able to re-use the device to repeat and carry payloads after recharging and replenishing the payload. The newly invented device can be manufactured at low volumes by quite simple means and in high volume production by more complex and controlled systems.

OBJECTS AND ADVANTAGES

There are several objects and advantages (as well as related characteristics) of the small, compact, and lightweight Electric Jet Drone System having an electric ducted air propulsion system and being relatively difficult to track in flight. There are currently no known electric propulsion drone devices or systems that are effective at providing the objects of this invention. The Electric Jet Drone System is one that allows for the following benefits over conventional human powered or large conventional gas-powered or jet powered weapons and payload carrying systems and devices:

| Item | Advantages |
|---|---|
| 1 | Is lighter weight due to lighter electric motors than gas-powered systems and lightweight, carbon fiber frame (is 5 to 15 pounds and less than 1½ cubic feet); |
| 2 | Uses no combustible fuel - uses rechargeable batteries; |
| 3 | Is quiet, no combustion noise, stealth; |

-continued

| Item | Advantages |
|---|---|
| 4 | Is unmanned operation with remote controlled operation and Simple, servo-controller-based throttle to control Electronic Speed Controllers (ESCs) which drive electric motors; |
| 5 | Capable of speed of up to 180 miles-per-hour (MPH); |
| 6 | Is a multi-copter with ducted fans, ducted turbines with protected intakes and more than one ducted fan/turbine arrayed with counter-rotating propellers/turbines; |
| 7 | Has a small cross-section to deflect tracking signals and search beams. With such a small cross section and such a high speed, it would be able to fly low and between buildings and trees, making it nearly impossible to shoot down, unlike slower, comparable payload carrying drones that fly at less than 60 mph and have large propellers; |
| 8 | Capable of rapid setup for launch and rapid start (no pull-starting, priming, or other pre-start actions needed to start the motor); |
| 9 | Carries payloads of up to 20 pounds payload per 10 pounds of total aircraft weight (typical device is 5 to 15 pounds and less than 1½ cubic feet); |
| 10 | Operates with smooth, low-vibration operation; |
| 11 | Uses commonly available drone stability using multiple gyroscopes with a standard multi-copter flight controller; |
| 12 | Is relatively inexpensive so that it could be reused OR used just once, depending on mission requirements; |
| 13 | Is safe to operate around with its ducted turbine blades; |
| 14 | Can be used as a "poor man's Javelin missile", flying at long distances (over 20 miles is possible) at high speed, then finding its target would shoot or drop its munitions on target; |
| 15 | Controls allow automatically return home; |
| 16 | Can be re-fitted with payloads for re-use; |
| 17 | Can be used effectively as a military asset, capable of deploying munitions against targets in a manner that allows for extreme control in congested urban, forested, or other confined environments, at high speed, with a cross-section and speed that would make it extremely difficult to shoot down; and |
| 18 | Utilizes electric jet turbine engines with 10:1 or greater thrust to weight ratio, such that for every one pound of engine plus ESC combined weight, the entire assembly produces at least 10 pounds of thrust. This would not include battery weight. |

Finally, other advantages and additional features of the present Compact and Lightweight Electric Jet Drone System having an electric ducted air propulsion system and being relatively difficult to track in flight will be more apparent from the accompanying drawings and from the full description of the device. For one skilled in the art of small, unmanned aircraft, drones, and the like (for carrying various payloads including but not limited to weapons and munitions) it is readily understood that the features shown in the examples with this device and system are readily adapted to other types of unmanned electrical propulsion systems and devices.

DESCRIPTION OF THE DRAWINGS—FIGURES

The accompanying drawings, which are incorporated in and constitute a part of this specification, illustrate an embodiment of the compact and lightweight Electric Jet Drone System having an electric ducted air propulsion system and being relatively difficult to track in flight that is preferred. The drawings together with the summary description given above and a detailed description given below explain the principles of the Electric Jet Drone system. It is understood, however, that the Electric Jet Drone system is not limited to only the precise arrangements and instrumentalities shown.

FIGS. 1 A through 1 C are sketches of the general compact and lightweight drone delivery device called an Electric Jet Drone System and the tactical process.

FIGS. 2 A and 2 B are sketches of the compact and lightweight drone delivery device called an Electric Jet Drone System from different views with components and features noted.

FIGS. 3 A and 3 B are more sketches of the compact and lightweight Electric Jet Drone System from different views with components and features noted.

FIGS. 4 A through 4 E are views of the compact and lightweight Electric Jet Drone System and top views of the frame of the device. Also shown are methods to group propulsion systems with multiple systems to propel an operator by harnessing several systems.

FIGS. 5 A through 5 C are sketches of the quick-change propulsion battery pack and the compact and lightweight Electric Jet Drone System in flight.

FIGS. 6 A through 6 D are up close drawings of the propulsion system fan systems and wiring harnesses of the control accessories.

FIGS. 7 A through 7 C are sketches of the control and wiring systems, the operator with goggles and controller, and the typical controller for the compact and lightweight Electric Jet Drone System.

FIGS. 8 A through 8 D are sketches of an ArcSpear device in operation and the tactical process.

FIGS. 9 A through 9 F are sketches of prior art for an Electric Jet Drone System.

DESCRIPTION OF THE DRAWINGS—REFERENCE NUMERALS

The following list refers to the drawings:

TABLE B

Reference numbers -

| Ref # | Description |
|---|---|
| 30 | compact and lightweight drone delivery device 30 for an Electric Jet Drone System having an electric ducted air propulsion system and being relatively difficult to track in flight |
| 31 | prototype 31 of compact and lightweight drone delivery device 30 for an Electric Jet Drone System |
| 33 | flight 33 of the prototype 31 of the Electric Jet Drone System 30 |
| 35 | tactical process 35 of the compact and lightweight drone delivery device 30 for an Electric Jet Drone System |
| 50 | turbine electric fan 50 of the drone delivery device for an Electric Jet Drone System 30 |
| 51 | blades or impellers 51 of fan/turbine 50 |
| 55 | shroud/exterior protection and frame 55 of the turbine/fan 50 |
| 55A | cut protector 55A on shroud 55 |
| 56 | means 56 to secure shroud 55 and support 59 to frame 71 |
| 58 | group of shafts, motor cone, and bearings 58 of turbine 50 |
| 59 | axial supports and motor support ring 59 |
| 59A | means to connect/ fasten 59A shroud 55 to turbine electric fan 50 and motor 78 |
| 59B | means to connect together 59B shroud 55, supports and ring 59 such as fasteners, molding, casting, welding, brazing, adhesives, or the like |

TABLE B-continued

Reference numbers -

| Ref # | Description |
|---|---|
| 71, 71A | frame 71 supporting the fans 50 and shrouds 55 and motors 78; supporting the payload 110; supporting the batteries 74; and supporting the wiring harnesses 76, flight controller 80, ESCs 90, and other accessories and controls; frame 71A is frame 71 with top mount of payload 110 - frames 71, 71A made of light weight and very strong and durable composite materials with carbon microfibers or like materials |
| 72 | a means for connecting 72 platform 70 and structure 71 - fasteners, clips, rings, cable ties, adhesives, weld, braze, or cold casting as one piece |
| 74 | set of rechargeable batteries 74 |
| 75 | battery boxes 75 |
| 75A | battery block 75A connecting set of batteries 74 to ESC 90 |
| 76 | wiring harnesses 76 from batteries 74 to block 75A to ESC 90 to motors 78 |
| 77 | means for removably connecting 77 battery box 75 and wiring harnesses 76 to frame 71 - fasteners, clips, rings, cable ties, adhesives |
| 78 | electric motor 78 of the compact and lightweight drone delivery device 30 with shaft 58 connected to blades 51 |
| 79 | recharge plug 79 to rechargeable batteries 74 from recharging power source 89 |
| 80 | flight controller 80 |
| 81 | antennas 81 for receiving and sending signals from flight controller 80 to and from control console 95 at operator 100 and to and from camera 82 to 3-D goggles 92 of operator 100 and for |
| 82 | camera 82 |
| 83 | wiring cable/conduction/harness 83 |
| 85 | connectors 85 from batteries 75 to motor 78 |
| 86 | means for connecting 86 cables 83 and connectors 85 to structure 71 - fasteners, clips, rings, cable ties, adhesives |
| 89 | recharging power source 89 to utility receptacle, solar panels on ground stand, or wired system generator |
| 90 | Electrical Speed Controller (ESC) 90 to control power from batteries 74 and block 75A sent to motors 78 of fan 50 |
| 91 | transceivers 91 and other electronic controllers 91A |
| 92 | 3-D goggles 92 of operator 100 with signals to/from camera 82 |
| 95 | control console 95 at operator 100 with signals to/from flight controller 80 which controls the ESCs 90 and the controls 115 of the payload 100 |
| 100 | user/operator 100 of the compact and lightweight Electric Jet Drone System 30 |
| 105 | Electric Jet Drone System 30 |
| 110 | payload 110 which can be various goods 110A like medicine, food, ammunition, field supplies; weapons and munitions 110B such as explosives, grenades, rockets, tube bombs, timed discharge devices, and electronic interference devices 110C and the like |
| 111 | aperture 111 for payload 110 |
| 112 | apertures and tabs 112 for payload 110 |
| 115 | controls 115 to remotely release payload 110 or operate payload devices |
| 120 | ground or terrain being flown above by Electric Jet Drone System 30 |
| 125 | wiring and general control sketches 125 |
| 130 | flight path 130 of the Electric Jet Drone System 30 in the tactical process 35 |
| 140 | quick change propulsion pack 140 with multiple batteries 74 secured around the fan shrouds 55 of fans 50 |
| 141 | tabs 141 to connect means to secure batteries 74 and belt 146 to shroud 55 |
| 145 | means 145 to secure and hold batteries 74 and belt 146 around shroud 55 such as a flexible belt 146 with pockets to hold batteries 74 and fastening buckle 146A such as a utility belt or equal |
| 146 | flexible belt 146 with pockets to hold batteries 74 and fastening buckle 146A |

TABLE B-continued

Reference numbers -

| Ref # | Description |
|---|---|
| 147 | aperture/opening 147 for fan 50 |
| 148 | mounting tabs and opening 148 for means to connect 56 shroud 55 to fans 50 |
| 149 | aperture/opening 149 for connecting ESC 90, controllers 80, camera 82, and accessories to frame 71 |
| 150 | target or destination 150 of the payload 110 of the device 30 |
| 300 | prior Art 300 US20210053695A1 - Marinus Bernard Bosma 2020 - Fire bomber delivery |
| 310 | prior Art 310 CN106288963B - Disco Corp - 2016 - Small-sized unmanned aerial vehicle driving and reversing device |
| 320 | prior Art 320 U.S. Pat. No. 9,180,967 B2 - Binkholder - 2012 - Configurable pod structure and store stowage and deployment system and method |
| 330 | prior Art 330 U.S. Pat. No. 9,939,239 B1 - Manole - 2013 - Stackable Collaborative engagement munition |
| 340 | prior Art 340 US Patent Appn. 2018/0272856 Manning - 2018 DUCTED FAN PROPULSION SYSTEM |
| 350 | prior Art 350 US Patent Appn. US 20190367169A1 2019 -O'Leary Unmanned flying grenade launcher |

DETAILED DESCRIPTION OF PREFERRED EMBODIMENT

This invention relates to compact and lightweight Electric Jet Drone System having an electric ducted air propulsion system and being relatively difficult to track in flight. The invention relates generally to aircraft, and more specifically, to an unmanned aerial vehicle (UAV) system and method of use. The present application relates to the field of unmanned aerial vehicle control technology, particularly, to an unmanned drone device capable of delivering payloads which can be secured to the device and has controllable flight powered by electrically powered ducted air as a propulsion arrangement. The invention relates generally to defense systems, and more specifically to an unmanned aerial vehicle with a weapons deployment or munitions carrier such as a grenade launcher.

The advantages and related characteristics for a compact and lightweight Electric Jet Drone System 30 are listed above in the introduction. Succinctly the benefits are that the device:

A. Is lighter weight due to lighter electric motors than gas-powered systems and lightweight, carbon fiber frame (is 5 to 15 pounds and less than 1½ cubic feet);
B. Uses no combustible fuel—uses rechargeable batteries;
C. Is quiet, no combustion noise, stealth;
D. Is unmanned operation with remote controlled operation and Simple, servo-controller-based throttle to control Electronic Speed Controllers (ESCs) which drive electric motors;
E. Capable of speed of up to 180 miles-per-hour {MPH};
F. Is a multi-copter with ducted fans, ducted turbines with protected intakes and more than one ducted fan/turbine arrayed with counter-rotating propellers/turbines;
G. Has a small cross-section to deflect tracking signals and search beams. With such a small cross section and such a high speed, it would be able to fly low and between buildings and trees, making it nearly impossible to shoot down, unlike slower, comparable payload carrying drones that fly at less than 60 mph and have large propellers;

H. Capable of rapid setup for launch and rapid start (no pull-starting, priming, or other pre-start actions needed to start the motor);

I. Carries payloads of up to 20 pounds payload per 10 of total aircraft weight (typical deice 30 is 5 to 15 pounds and less than 1½ cubic feet);

J. Operates with smooth, low-vibration operation;

K. Uses commonly available drone stability using multiple gyroscopes with a standard multi-copter flight controller;

L. Is relatively inexpensive so that it could be reused OR used just once, depending on mission requirements;

M. Is safe to operate around with its ducted turbine blades;

N. Can be used as a "poor man's Javelin missile", flying at long distances (over 20 miles is possible) at high speed, then finding its target would shoot or drop its munitions on target;

O. Controls allow automatically return home;

P. Can be re-fitted with payloads for re-use;

Q. Can be used effectively as a military asset, capable of deploying munitions against targets in a manner that allows for extreme control in congested urban, forested, or other confined environments, at high speed, with a cross-section and speed that would make it extremely difficult to shoot down; and R. Utilizes electric jet turbine engines with 10:1 or greater thrust to weight ratio, such that for every one pound of engine plus ESC combined weight, the entire assembly produces at least 10 pounds of thrust. This would not include battery weight.

The compact and lightweight Electric Jet Drone System 30 having an electric ducted air propulsion system and being relatively difficult to track in flight has been described in the above embodiment. The manner of how the device operates is described below. One notes well that the description above and the operation described here must be taken together to fully illustrate the concept of the compact and lightweight Electric Jet Drone System. The preferred embodiment of the compact and lightweight Electric Jet Drone System 30 comprised of: (a) a frame system 71; (b) a ducted turbine system comprising at least one and preferably four turbine 50 with a set of blades or impellers 51 of the fan/turbine 50, a shroud/exterior protection and frame 55 of the turbine/fan 50, a cut protector 55A on shroud 55, a means 56 to secure shroud 55, and an electric motor 78 with each fan 50 the device 30 with shaft 58 connected to blades 51; (c) a payload 110 with a deployment means 115 on the structural frame 71; (d) a power system comprising a set of rechargeable batteries 74, a means to removably secure the batteries 74 to the frame 71, a wiring harness from batteries 74 to motors 78, a recharge plug 79 to batteries 74 from recharging power source 89, and a recharging power source 89; and (e) a flight controller 80 for powering the ESC 90 and controlling the motor 78 plus a set of connectors 85 from the set of batteries 74 to the motor 78 wherein the device 30 having an electric ducted air propulsion system, being relatively difficult to track in flight (stealth), being relatively fast, able to maneuver quickly and able to refuse the device to repeat and carry payloads after recharging and replenishing the payload.

There is shown in FIGS. 1-9 a complete description and operative embodiment of the compact and lightweight Electric Jet Drone System 30 having an electric ducted air propulsion system and being relatively difficult to track in flight. In the drawings and illustrations, one notes well that the FIGS. 1-9 demonstrate the general configuration and use of this product. The various example uses are in the operation and use section, below.

The accompanying drawings, which are incorporated in and constitute a part of this specification, illustrate an embodiment of the compact and lightweight Electric Jet Drone System 30 that is preferred. The drawings together with the summary description given above and a detailed description given below explain the principles of the device 30. It is understood, however, that the Electric Jet Drone System having an electric ducted air propulsion system is not limited to only the precise arrangements and instrumentalities shown. Other examples of propulsion systems for small aircraft are still understood by one skilled in the art of this industry to be within the scope and spirit shown here.

Figure 1B:
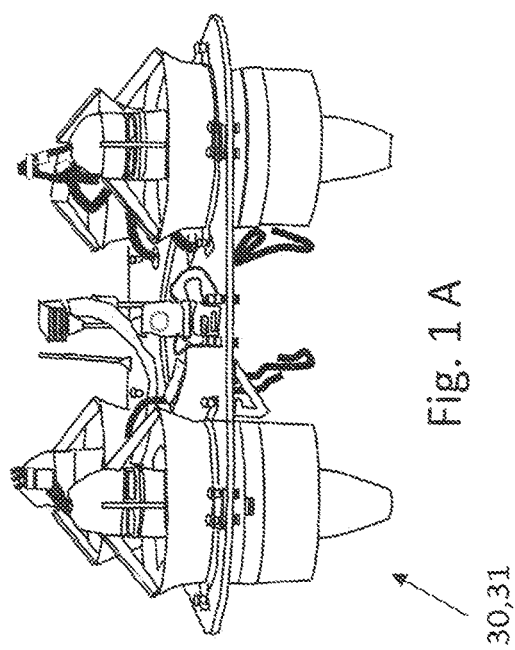
Figure 1C:
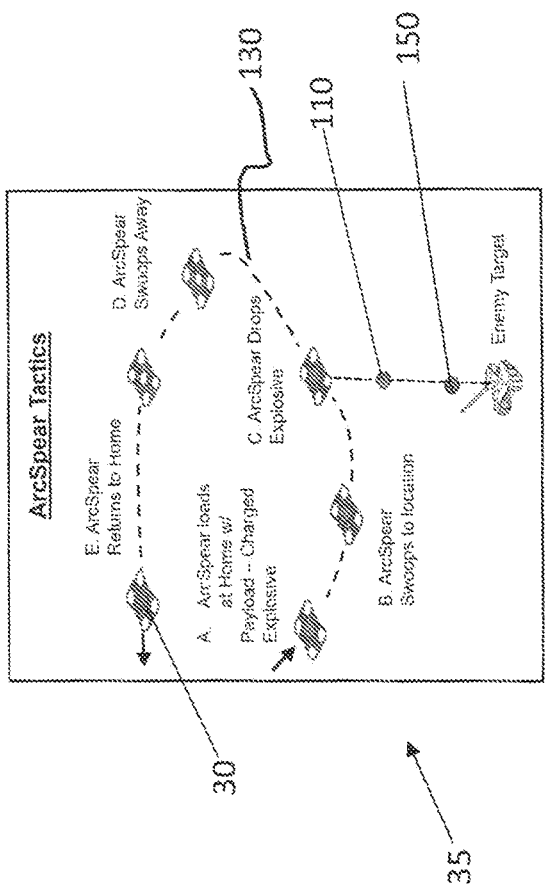

FIGS. 1A through 1C are sketches of the general compact and lightweight Electric Jet Drone System 30 and the tactical process 35. Shown in these sketches and drawings are: a compact and lightweight Electric Jet Drone System 30 having an electric ducted air propulsion system and being relatively difficult to track in flight; a prototype 31 of compact and lightweight Electric Jet Drone System 30; a flight 33 of the prototype 31 of the Electric Jet Drone System 30; a tactical process 35 of the compact and lightweight drone delivery device 30 called an Arc Spear; a payload 110 which can be various goods 110A like medicine, food, ammunition, field supplies; weapons and munitions 110B such as explosives, grenades, rockets, tube bombs, timed discharge devices, and electronic interference devices 110C and the like; the ground or terrain 120 being flown above by an Electric Jet Drone System 30; a flightpath 130 of the device 30 in the tactical process 35; and a target or destination 150 of the payload 110 of the device 30.

FIGS. 2A and 2B are sketches of the compact and lightweight Electric Jet Drone System 30 from different views with components and features noted. Provided in these drawings are: a compact and lightweight Electric Jet Drone System 30 having an electric ducted air propulsion system and being relatively difficult to track in flight; a prototype 31 of compact and lightweight Electric Jet Drone System 30; a set of blades or impellers 51 of fan/turbine 50; a shroud/exterior protection and frame 55 of the turbine/fan 50; a cut protector 55A on shroud 55; a means 56 to secure shroud 55 and support 59 to frame 71; a group of shafts, motor cone, and bearings 58 of turbine 50; an axial supports and motor support ring 59; a means to connect/fasten 59A shroud 55 to a turbine electric fan 50 and motor 78; a means to connect together 59B shroud 55, supports and ring 59 such as fasteners, molding, casting, welding, brazing, adhesives, or the like; a frame 71 supporting the fans 50 and shrouds 55 and motors 78; supporting the payload 110; supporting the batteries 74; and supporting the wiring harnesses 76, flight controller 80, ESCs 90, and other accessories and controls-frames 71 made of light weight and very strong and durable composite materials with carbon micro fibers or like materials; a means for connecting 72 platform 70 and structure 71—fasteners, clips, rings, cable ties, adhesives, weld, braze, or cold/casting as one piece; a set of rechargeable batteries 74; a set of battery boxes 75; a wiring harnesses 76 from batteries 74 to block 75A to ESC 90 to motors 78; a means for removably connecting 77 battery box 75 and wiring harnesses 76 to frame 71—fasteners, clips, rings, cable ties, adhesives; an electric motor 78 of the compact and lightweight drone delivery device 30 with shaft 58 connected to blades 51; a flight controller 80; a set of antennas 81 for receiving and sending signals from flight controller 80 to and from control console 95 at operator 100 and to and from camera 82 to 3-D goggles 92 of operator 100; a camera 82; a wiring cable/conduction/harness 83; a set of connectors 85 from batteries 75 to motor 78; a means for connecting 86 cables 83 and connectors 85 to structure 71—fasteners, clips, rings, cable ties, adhesives; a set of Electrical Speed Controller (ESC) 90 to control power from batteries 74 and block 75A sent to motors 78 of fan 50; and a payload 110 which can be various goods 110A like medicine, food, ammunition, field supplies; weapons and munitions 110B such as explosives, grenades, rockets, tube bombs, timed discharge devices, and electronic interference devices 110C and the like.

FIGS. 3 A and 3 B are more sketches of the compact and lightweight Electric Jet Drone System 30 from different views with components and features noted. Demonstrated here are: a compact and lightweight Electric Jet Drone System 30 having an electric ducted air propulsion system and being relatively difficult to track in flight; a prototype 31 of compact and lightweight Electric Jet Drone System 30; a set of blades or impellers 51 of fan/turbine 50; a shroud/exterior protection and frame 55 of the turbine/fan 50; a cut protector 55A on shroud 55; a means 56 to secure shroud 55 and support 59 to frame 71; a group of shafts, motor cone, and bearings 58 of turbine 50; an axial supports and motor support ring 59; a means to connect/fasten 59A shroud 55 to a turbine electric fan 50 and motor 78; a means to connect together 59B shroud 55, supports and ring 59 such as fasteners, molding, casting, welding, brazing, adhesives, or the like; a frame 71 supporting the fans 50 and shrouds 55 and motors 78; supporting the payload 110; supporting the batteries 74; and supporting the wiring harnesses 76, flight controller 80, ESCs 90, and other accessories and controls-frames 71 made of light weight and very strong and durable composite materials with carbon micro fibers or like materials; a means for connecting 72 platform 70 and structure 71—fasteners, clips, rings, cable ties, adhesives, weld, braze, or cold/casting as one piece; a set of rechargeable batteries 74; a set of battery boxes 75; a wiring harnesses 76 from batteries 74 to block 75A to ESC 90 to motors 78; a means for removably connecting 77 battery box 75 and wiring harnesses 76 to frame 71—fasteners, clips, rings, cable ties, adhesives; an electric motor 78 of the drone delivery device 30 with shaft 58 connected to blades 51; a recharge plug 79 to rechargeable batteries 74 from recharging power source 89; a flight controller 80; a set of antennas 81 for receiving and sending signals from flight controller 80 to and from control console 95 at operator 100 and to and from camera 82 to 3-D goggles 92 of operator 100; a camera 82; a wiring cable/conduction/harness 83; a set of connectors 85 from batteries 75 to motor 78; a means for connecting 86 cables 83 and connectors 85 to structure 71—fasteners, clips, rings, cable ties, adhesives; a set of Electrical Speed Controller (ESC) 90 to control power from batteries 74 and block 75A sent to motors 78 of fan 50; and a payload 110 which can be various goods 110A like medicine, food, ammunition, field supplies; weapons and munitions 110B such as explosives, grenades, rockets, tube bombs, timed discharge devices, and electronic interference devices 110C and the like.

FIGS. 4 A through 4 E are top of the compact and lightweight Electric Jet Drone System 30 and top views of the frame 71 of the device. Also shown are methods to group propulsion systems with multiple systems to propel an operator by harnessing several systems. Shown in these views are the following: a compact and lightweight Electric Jet Drone System 30 having an electric ducted air propulsion system and being relatively difficult to track in flight; a prototype 31 of compact and lightweight Electric Jet Drone System 30; a turbine electric fan 50 of the special compact and lightweight delivery device 30; a set of blades or impellers 51 of fan/turbine 50; a shroud/exterior protection and frame 55 of the turbine/fan 50; a means 56 to secure shroud 55 and support 59 to frame 71; a group of shafts, motor cone, and bearings 58 of turbine 50; an axial supports and motor support ring 59; a means to connect/fasten 59A shroud 55 to turbine electric fan 50 and motor 78; a frame 71 supporting the fans 50 and shrouds 55 and motors 78; frame 71 with top mount of payload 110—frames 71, 71A made of light weight and very strong and durable composite materials with carbon micro fibers or like materials; an aperture 111 for payload 110; an set of apertures and tabs 112 for payload 110; an aperture/opening 147 for fan 50; a set of tabs and opening 148 for means to connect 56 shroud 55 to fans 50; and an aperture/opening 149 for connecting ESC 90, controllers 80, camera 82, and accessories to frame 71.

FIGS. 4 D and E depict a connection of a harness 105 to several clusters of the Electric Jet Drone System 30. An Electric Jet Drone System 30 can be used for personal, human transportation in swarms that connect to specially crafted harnesses with frames that allow multiple 4, 6, 8 or more-engined Electric Jet Drone Systems 30 to link together on a harness-mounted frame, and lift an individual into the air, as a single, controllable, on-demand, personal Jetpack or other configuration, including that of something resembling a flying car that could carry more than one person. It is effectively utilizing the unexposed nature of an Electric Jet Drone System's 30 Propulsion to closely couple swarms of them to provide effective, human transport. Many drone swarms are used today in light shows and other displays, but they must maintain several body lengths of distance from each other because most are open-propeller driven. Because an Electric Jet Drone System 30 encapsulates its propulsion, swarming can allow close coupling of multiple 6 aircraft together to provide clustered Propulsion for human or even heavy payload transport.

FIGS. 5 A through 5 C are sketches of the quick-change propulsion battery pack 140 and the compact and lightweight Electric Jet Drone System 30 in flight 33. Provided here are: a compact and lightweight Electric Jet Drone System 30 having an electric ducted air propulsion system and being relatively difficult to track in flight; a prototype 31 of compact and lightweight Electric Jet Drone System 30; a flight 33 of the prototype 31 of the Electric Jet Drone System 30; a turbine electric fan 50 of the Electric Jet Drone System 30; a set of blades or impellers 51 of fan/turbine 50; a shroud/exterior protection and frame 55 of the turbine/fan 50; a frame 71 supporting the fans 50 and shrouds 55 and motors 78; supporting the payload 110; supporting the batteries 74; and supporting the wiring harnesses 76, flight controller 80, ESCs 90, and other accessories and controls; frames 71 made of light weight and very strong and durable composite materials with carbon micro fibers or like materials; a set of rechargeable batteries 74; a wiring harnesses 76 from batteries 74 to block 75A to ESC 90 to motors 78; a flight controller 80; a set of antennas 81 for receiving and sending signals from flight controller 80 to and from control console 95 at operator 100 and to and from camera 82 to 3-D goggles 92 of operator 100; a camera 82; a wiring cable/conduction/harness 83; a set of Electrical Speed Controller (ESC) 90 to control power from batteries 74 and block 75A sent to motors 78 of fan 50; a quick-change propulsion pack 140 with multiple batteries 74 secured around the fan shrouds 55 of fans 50; a set of tabs 141 to connect means to secure batteries 145 and the batteries 74 to the shroud 55 such as a utility belt or equal; a means 145 to secure and hold batteries 74 around shroud 55 such as a flexible belt 146 with pockets to hold batteries 74 and fastening buckle 146A; and a flexible belt 146 with pockets to hold batteries 74 and fastening buckle 146A.

FIGS. 6 A through 6 D are up close drawings of the propulsion system fan systems and wiring harnesses of the control accessories. Demonstrated are: a turbine electric fan 50 of the compact and lightweight Electric Jet Drone System 30; a set of blades or impellers 51 of fan/turbine 50; a shroud/exterior protection and frame 55 of the turbine/fan 50; a means 56 to secure shroud 55 and support 59 to frame 71; a group of shafts, motor cone, and bearings 58 of turbine 50; an axial supports and motor support ring 59; a means to connect/fasten 59A shroud 55 to turbine electric fan 50 and motor 78; a means to connect together 59B shroud 55, supports and ring 59 such as fasteners, molding, casting, welding, brazing, adhesives, or the like; a frame 71 supporting the fans 50 and shrouds 55 and motors 78; a recharge plug 79 to rechargeable batteries 74 from recharging power source 89; a flight controller 80; a set of antennas 81 for receiving and sending signals from flight controller 80 to and from control console 95 at operator 100 and to and from camera 82 to 3-D goggles 92 of operator 100; a camera 82; a wiring cable/conduction/harness 83; a set of connectors 85 from batteries 75 to motor 78; a means for connecting 86 cables 83 and connectors 85 to structure 71—fasteners, clips, rings, cable ties, adhesives; and a set of Electrical Speed Controller (ESC) 90 to control power from batteries 74 and block 75A sent to motors 78 of fan 50.

FIGS. 7 A through 7 C are sketches of the control and wiring systems 125, the operator 100 with goggles 92 and controller 95, and the typical controller 95 for the compact and lightweight Electric Jet Drone System 30. In these drawings on sees: a set of rechargeable batteries 74; a battery block 75A connecting set of batteries 74 to ESC 90; a wiring harnesses 76 from batteries 74 to block 75A to ESC 90 to motors 78; a flight controller 80; a set of antennas 81 for receiving and sending signals from flight controller 80 to and from control console 95 at operator 100 and to and from camera 82 to 3-D goggles 92 of operator 100; a camera 82; a wiring cable/conduction/harness 83; a set of connectors 85 from batteries 75 to motor 78; a set of Electrical Speed Controller (ESC) 90 to control power from batteries 74 and block 75A sent to motors 78 of fan 50; a transceiver 91 and other electronic controllers 91A; a pair of 3-D goggles 92 of operator 100 with signals to/from camera 82; control console 95 at operator 100 with signals to/from flight controller 80 which controls the ESCs 90 and the controls 115 of the payload 100; an user/operator 100 of the compact and lightweight Electric Jet Drone System 30; a set of controls 115 to remotely release payload 110 or operate payload devices; and a group of wiring and general control sketches 125.

FIGS. 8 A through 8 D are sketches of an Electric Jet Drone System 30 in operation and the tactical process. These drawings are discussed in the Operations section, below.

FIGS. 9 A through 9 F are sketches of prior art for Electric Jet Drone System 30. These include: prior Art 300 US20210053695A1 by Marinus Bernard Bosma in 2020 called a Fire bomber delivery; prior Art 310 CN106288963B assigned to Disco Corp in 2016 called a Small-sized unmanned aerial vehicle driving and reversing device; prior Art 320 U.S. Pat. No. 9,180,967B2 by Binkholder issued in 2012 and entitled a Configurable pod structure and store stowage and deployment system and method; prior Art 330 U.S. Pat. No. 9,939,239B1 issued to Manole in 2013 named a Stackable Collaborative engagement munition; prior Art 340 US Patent Application 2018/0272856 by Manning done in 2018 and called a DUCTED FAN PROPULSION SYSTEM; and prior Art 350 US Patent Application US 20190367169A1 completed around 2019 by O'Leary and named an Unmanned flying grenade launcher. As can be seen, the compact and lightweight Electric Jet Drone System 30 having an electric ducted air propulsion system and being relatively difficult to track in flight is both a unique combination and use as described herein.

The anticipated materials for the compact and lightweight Electric Jet Drone System 30 includes: a group of fabric material for the flexible belt 146 can be nylon, rayon, cotton, polyester, leathers, vinyl, and synthetic or non-synthetic composite materials. The characteristics preferred are a fabric which is flexible, comfortable, strong, cut-resistant, lightweight, and easy to clean. The method to attach the belt and harnesses to the frame 71 or to each other may be sewing, clips, rivets, or various fasteners. The propellers 51 may be a metal such as steel, steel alloy, aluminum, titanium; a composite material; a wood laminate, or other durable, light weight yet sufficiently sturdy material. Propellers are well known in the art of aircraft and may be selected from a plethora of styles and materials. The other components are likewise expected to be of lightweight, strong, and durable materials shaped to appropriate configurations. However, these are exemplary and lot limitations to other means which are well within the spirit and scope of the full embodiment of the compact and lightweight Electric Jet Drone System 30. The entire propeller driven system, as just described, rotates around the fixed shaft which can have an aperture (hollow opening) throughout its center. The various control wiring is often guided along and through the structure as is well known in the art of lightweight aircraft. Additionally, a mount for the motor(s) 78 are normally retained by a collar to the shaft. The battery(ies) 74 are connected through cables and wire harnesses to the motor (s). The electric power from the battery powers the motor which transforms the stored electrical energy into kinetic energy and rotational power. This power is further transferred to the propellers and the system shown or a functional equivalent. The motors 78 have relatively simple Electric Speed Controllers (ESC) and controls 90 as one skilled in the art of electromechanical power systems well appreciates. The remote-control system and controller 95 for operation of the drone can be one of many well-known to the drone industry and aircraft operations. These are used in combination with readily available 3-D goggles 92 of operator 100 with signals to/from camera 82. As stated, this means of using a remote system is also well known to those skilled in the art of electrical and electronic remote-control systems. The remaining shrouds and mechanical structures can be of various materials—steel, steel alloys, titanium, aluminum, and composite metals, etc. The general components were identified above.

The frame structures 71, 71A may be of a variety of configurations but the preferred is a flat plate-like shape. The materials for example and not limitation may be a metal like steel, a steel alloy, aluminum, titanium, a composite plastic, plastic filled with carbon fibers, or any other light weight, durable material. However, these materials mentioned are exemplary and lot limitations to other means which are well within the spirit and scope of the full embodiment of the device 30. The batteries 74 are connected generally through cables and harnesses and generally to a central battery block then through the ESCs 80 and to the motor(s) 78. The electric power from the battery powers the motor which transforms the stored electrical energy into kinetic energy and rotational power. This power is further transferred to the propellers and the system shown or a functional equivalent. The motors 78 and battery 74 system have relatively simple electronic speed controllers (ESC) 90 flight controllers 80 as one skilled in the art of electromechanical power systems well appreciates.

This system anticipates several types of rechargeable battery 74 back including but not limited to: Nickle Cadmium batteries, Nickle Metal Hydride batteries, Lithium-Ion batteries, Small and sealed lead acid batteries. These may be Absorbed glass mat (AGM) battery or gel battery ("gel cell"). Other experimental types include Lithium sulfur, Sodium-ion, Thin film lithium, Zinc-bromide, Zinc-cerium, Vanadium redox, Sodium-sulfur, Molten salt, and Silver-zinc. One skilled in the art of rechargeable batteries also anticipates and fully expects other battery types to be developed which will function well and be within the scope and breadth of this invention. Voltages of the system may also vary.

The details mentioned here are exemplary and not limiting. Other specific components and manners specific to describing a compact and lightweight Electric Jet Drone System 30 may be added as a person having ordinary skill in the field of the art of propulsion systems for small aircraft well appreciates.

Operation of the Preferred Embodiment

The compact and lightweight Electric Jet Drone System 30 having an electric ducted air propulsion system and being relatively difficult to track in flight has been described in the above embodiment. The manner of how the device operates is described below. One notes well that the description above and the operation described here must be taken together to fully illustrate the concept of the compact and lightweight Electric Jet Drone System. The preferred embodiment of the compact and lightweight Electric Jet Drone System 30 comprised of: (a) a frame system 71; (b) a ducted turbine system comprising at least one and preferably four turbine 50 with a set of blades or impellers 51 of the fan/turbine 50, a shroud/exterior protection and frame 55 of the turbine/fan 50, a cut protector 55A on shroud 55, a means 56 to secure shroud 55, and an electric motor 78 with each fan 50 the device 30 with shaft 58 connected to blades 51; (c) a payload 110 with a deployment means 115 on the structural frame 71; (d) a power system comprising a set of rechargeable batteries 74, a means to removably secure the batteries 74 to the frame 71, a wiring harness from batteries 74 to motors 78, a recharge plug 79 to batteries 74 from recharging power source 89, and a recharging power source 89; and (e) a flight controller 80 for powering the ESC 90 and controlling the motor 78 plus a set of connectors 85 from the set of batteries 74 to the motor 78 wherein the device 30 having an electric ducted air propulsion system, being relatively difficult to track in flight (stealth), being relatively fast, able to maneuver quickly and able to refuse the device to repeat and carry payloads after recharging and replenishing the payload.

The compact and lightweight Electric Jet Drone System 30 functions as follows: The electric fans and motors devices 50, 78 are compact, lightweight and may be ducted with carbon-fiber or other lightweight material ducts. Motors are connected to electronic speed controllers and powered by the batteries and then managed through a throttle 80, which is managed by a user/operator 100 through the controller 95 which are connected and control the flight controller 80. The operator 100 monitors visually through the goggles 92 that are connected by antenna 81 to the camera 82. The power from the batteries 74 are controlled by the flight controller 80 and operate the ESC 90 to each of the motors 78 and coupled ducted fans 50 to balance thrust to each fan 50 and thus control the speed and thrust of each fan motor 78 and limits roll from side to side. By increasing and decreasing the fan motors speed by controlling the electrical power, the thrust of each fan is controlled and the drone 30 can be moved and guided by the resultant thrust of each fan. The drone 30 is guided to a target 150 by the operator 100 and then the payload 110 is activated/dropped/deployed by the payload controller 115 activated by the operator 100 on the controller 95.

FIGS. 8 A through 8 D are sketches of an Electric Jet Drone System 30 30,31,33 in operation and the tactical process 35. In these use drawings are:

| Step | Tactics 35 |
|---|---|
| A | Electric Jet Drone System 30 loads at Home w/Payload - Charged Explosive |
| B | Electric Jet Drone System 30 Swoops to location |
| C | Electric Jet Drone System 30 Drops Explosive |
| D | Electric Jet Drone System 30 Swoops Away |
| E | Electric Jet Drone System 30 Returns to Home Reload and Repeat |

Shown in these figures are: a compact and lightweight Electric Jet Drone System 30 having an electric ducted air propulsion system and being relatively difficult to track in flight; a prototype 31 of compact and lightweight Electric Jet Drone System 30; a flight 33 of the prototype 31 of the Electric Jet Drone System 30; a tactical process 35 of the compact and lightweight Electric Jet Drone System 30; a payload 110 which can be various goods 110A like medicine, food, ammunition, field supplies; weapons and munitions 110B such as explosives, grenades, rockets, tube bombs, timed discharge devices, and electronic interference devices 110C and the like; the ground or terrain 120 being flown above by an Electric Jet Drone System 30; a flightpath 130 of the Electric Jet Drone System 30 in the tactical process 35; and a target or destination 150 of the payload 110 of the Electric Jet Drone System 30.

Many uses are anticipated for the compact and lightweight Electric Jet Drone System 30 having an electric ducted air propulsion system and being relatively difficult to track in flight. Some examples, and not limitations, are shown in the following Table.

| ITEM | DESCRIPTION |
|---|---|
| 1 | Can deliver medicine and blood for first aid activities |
| 2 | Can deliver payloads of food and water for survival |
| 3 | Can deliver payloads of electrical and mechanical replacement parts for field repair to military and construction teams |
| 4 | Can deliver payloads of replacement munitions |
| 5 | Can be used as a military asset, capable of deploying munitions against targets |
| 6 | Can be used effectively in a manner that allows for extreme control in congested urban, forested, or other confined environments |
| 7 | Can be used at high speed, with a cross-section and speed that would make it extremely difficult to shoot down |

With this description it is to be understood that the compact and lightweight Electric Jet Drone System 30 having an electric ducted air propulsion system and being relatively difficult to track in flight is not to be limited to only the disclosed embodiment of product. The features of the System 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms.

Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A multi-copter, uncrewed aerial vehicle [UAV] (30) utilizing electric jet propulsion with a thrust to weight ratio comprised of:
    (a) a frame system (71);
    (b) a ducted turbine system comprising at least four electric turbines (50);
    (c) a payload (110) with a control means (115) for deployment of the payload and with said means located on the structural frame (71);
    (d) a power system comprising a set of rechargeable batteries (74), a means to removably secure the batteries (74) to the frame (71), a wiring harness from batteries (74) to motors (78), a recharge plug (79) to a set of batteries (74) for connection to a recharging power source (89);
    (e) a flight controller (80) for controlling an Electric Speed Controller (ESC) (90) and controlling the motor (78) with a set of connectors (85) from the set of batteries (74) to the motor (78);
    (f) a camera (82) and antennas (81) for receiving and sending signals from the flight controller (80) to and from an operator (100) wherein the device UAV (30) utilizes a set of four or more electric jet turbine engines with at least 10:1 or greater thrust to weight ratio, such that for every one pound of engine weight, the entire UAV, without a weight for batteries, produces at least 10 pounds of thrust wherein the UAV (30) having an electric ducted air propulsion system of electric jet turbine engines, is relatively stealth, as compared to gas-powered systems, and capable of speeds up to or above 180 mph, is able to maneuver due to approximately 1½ cubic feet size, and is able for repeated use to carry payloads after the power source is recharged and the payload is replenished.

2. The multi-copter, uncrewed aerial vehicle [UAV] (30) utilizing electric jet propulsion with a thrust to weight ratio as described in claim 1 wherein each turbine further comprises a set of blades or impellers (51) of the fan/turbine (50), a shroud/exterior protection and frame (55) of the turbine/fan (50), a cut protector (55A) on shroud (55), a means (56) to secure shroud (55), and an electric motor (78) with each fan (50) the device (30) with shaft (58) connected to blades (51).

3. The multi-copter, uncrewed aerial vehicle [UAV] (30) as described in claim 2 wherein the UAV (30) will carry up to 20 lbs. of the payload at speeds of up to or above 180 mph per 10 lbs. of a total aircraft weight.

4. The multi-copter, uncrewed aerial vehicle [UAV] (30) as described in claim 2 wherein the UAV (30) will have commonly available drone and UAV stability through a use of multiple gyroscopes on a standard multi-copter flight controller.

5. The multi-copter, uncrewed aerial vehicle [UAV] (30) as described in claim 2 wherein the UAV is used as a military asset, is capable of deploying munitions against numerous targets which allows for control in congested urban, forested, or other confined environments, deploys a payload at-speeds up to or above 180 mph, and has a cross-section which when coupled with said speed of the UAV provides a UAV that inherently features low observability.

6. The multi-copter, uncrewed aerial vehicle [UAV] (30) as described in claim 1 wherein the UAV (30), including a transmission and control system, will fit in a backpack/suitcase, is portable, and is carried by a single person.

7. The multi-copter, uncrewed aerial vehicle [UAV] (30) as described in claim 2 wherein the UAV (30) is safer to operate because of the protected, ducted turbine blades.

8. The multi-copter, uncrewed aerial vehicle [UAV] (30) as described in claim 1 wherein the UAV (30) is supplemented for power with a changeable propulsion pack (140) with multiple batteries (74) and a belt that secures around the fan shrouds (55) of the fans (50).

9. The multi-copter, uncrewed aerial vehicle [UAV] (30) as described in claim 1 wherein the frame system (71) is comprised of a durable material that is selected from the group consisting of steel, a steel alloy, aluminum, titanium, a composite plastic, plastic filled with carbon fibers.

10. The multi-copter, uncrewed aerial vehicle [UAV] (30) as described in claim 1 wherein the means (56) to secure the shroud (55) is selected from the group consisting of fasteners, molding, casting, welding, brazing, and adhesives.

11. The multi-copter, uncrewed aerial vehicle [UAV] (30) as described in claim 1 wherein the set of rechargeable batteries (74) is selected from the group consisting of Nickle Cadmium batteries, Nickle Metal Hydride batteries, Lithium-Ion batteries, sealed lead acid batteries, Lithium sulfur batteries, Sodium-ion batteries, Thin film lithium batteries, Zinc-bromide batteries, Zinc-cerium batteries, Vanadium redox batteries, Sodium-sulfur batteries, Molten salt batteries, and Silver-zinc.

12. A multi-copter, uncrewed aerial vehicle [UAV] (30) utilizing electric jet propulsion with a thrust to weight ratio comprised of:

(a) a frame system (71);
(b) a ducted turbine system comprising more than four turbines (50), each turbine with a set of blades or impellers (51) of the fan/turbine (50), a shroud/exterior protection and frame (55) of the turbine/fan (50), a cut protector (55A) on shroud (55), a means (56) to secure shroud (55), and an electric motor (78) with each fan (50) the device (30) with shaft (58) connected to blades (51);
(c) a payload (110) with a control means (115) for deployment of the payload and with said control means located on the structural frame (71);
(d) a power system comprising a set of rechargeable Lithium-Ion batteries (74), a means to removably secure the batteries (74) to the frame (71), a wiring harness from the Lithium-Ion batteries (74) to motors (78), and a recharge plug (79) to the Lithium-Ion batteries (74) for connection to from a recharging power source (89);
(e) a flight controller (80) for powering an Electric Speed Controllers (ESC) (90) and controlling the motor (78) with a set of connectors (85) from the set of batteries (74) to the motor (78); and
(f) a camera (82) and antennas (81) for receiving and sending signals from the flight controller (80) to and from an operator (100) wherein the device UAV (30) having an electric ducted air propulsion system of electric jet turbine engines is stealth as compare to gas-powered systems, and capable of speeds over 180 MPH, is able to maneuver due to approximately 1½ cubic feet size, and is able for repeated use to carry payloads after the power source is recharged and the payload is replenished;
(g) the ducted turbine system comprising more than four turbines electric jet turbine engines with at least 10:1 or greater thrust to weight ratio, such that for every one pound of engine weight, the entire UAV, without a weight for batteries, produces at least 10 pounds of thrust.

13. The multi-copter, uncrewed aerial vehicle [UAV] (30) as described in claim 12 wherein the frame system (71) is comprised of a durable material that is selected from the group consisting of steel, a steel alloy, aluminum, titanium, a composite plastic, plastic filled with carbon fibers.

14. The multi-copter, uncrewed aerial vehicle [UAV] (30) as described in claim 12 wherein the means (56) to secure shroud (55) is selected from the group consisting of fasteners, molding, casting, welding, brazing, and adhesives.

15. The multi-copter, uncrewed aerial vehicle [UAV] (30) as described in claim 12 wherein the set of rechargeable batteries (74) is selected from the group consisting of Nickle Cadmium batteries, Nickle Metal Hydride batteries, Lithium-Ion batteries, sealed lead acid batteries, Lithium sulfur batteries, Sodium-ion batteries, Thin film lithium batteries, Zinc-bromide batteries, Zinc-cerium batteries, Vanadium redox batteries, Sodium-sulfur batteries, Molten salt batteries, and Silver-zinc.

* * * * *